(12) United States Patent
Agarwal

(10) Patent No.: US 11,468,173 B2
(45) Date of Patent: Oct. 11, 2022

(54) SYSTEMS AND METHODS FOR AUTOMATED THREAT MODEL GENERATION FROM DIAGRAM FILES

(71) Applicant: ThreatModeler Software Inc., Jersey City, NJ (US)

(72) Inventor: Anurag Agarwal, Jersey City, NJ (US)

(73) Assignee: ThreatModeler Software Inc., Jersey City, NJ (US)

( * ) Notice: Subject to any disclaimer, the term of this patent is extended or adjusted under 35 U.S.C. 154(b) by 212 days.

(21) Appl. No.: 16/946,853

(22) Filed: Jul. 9, 2020

(65) Prior Publication Data

US 2020/0342116 A1 Oct. 29, 2020

Related U.S. Application Data

(63) Continuation-in-part of application No. 16/542,263, filed on Aug. 15, 2019, now Pat. No. 10,713,366, (Continued)

(51) Int. Cl.
*G06F 21/57* (2013.01)
*G06F 17/15* (2006.01)
*G06N 20/00* (2019.01)

(52) U.S. Cl.
CPC ............ *G06F 21/577* (2013.01); *G06F 17/15* (2013.01); *G06N 20/00* (2019.01)

(58) Field of Classification Search
CPC .. G06F 21/577; G06F 16/2282; G06F 16/248; G06F 9/451; G06F 16/212;
(Continued)

(56) References Cited

U.S. PATENT DOCUMENTS 4,959,015 A 9/1990 Rasinski et al.
6,952,779 B1 10/2005 Cohen et al.
(Continued)

OTHER PUBLICATIONS

Threat Risk Modeling, published online at least as early as Feb. 3, 2018 by OWASP, available at https://www.owasp.org/index.php/Threat_Risk_Modeling.
(Continued)

*Primary Examiner* — Theodore C Parsons
(74) *Attorney, Agent, or Firm* — Law Office of Paul B. Johnson; Paul B. Johnson

(57) ABSTRACT

Threat modeling systems include one or more computing device(s) coupled with one or more data store(s), the computing device(s) including a first software application. The data store(s) associate threats with threat model components. One or more mapping files may couple with the data store(s) to correlate the threat model components with visual diagram components of a second software application ("second software diagram components"). A machine learning (ML) algorithm may alternatively or additionally be configured to select, for each second software diagram component, a corresponding threat model component. An import interface initiates reading of a data file generated by the second software application, the data file including a subset of the second software diagram components and defining relationships therebetween. The systems determine, using the ML algorithm and/or the mapping file(s), which threat model components correspond with the subset, and display the corresponding threat model components on one or more user interfaces.

20 Claims, 31 Drawing Sheets

Related U.S. Application Data which is a continuation-in-part of application No. 16/228,738, filed on Dec. 20, 2018, now Pat. No. 10,699,008, which is a continuation-in-part of application No. 15/922,856, filed on Mar. 15, 2018, now Pat. No. 10,200,399, which is a continuation-in-part of application No. 15/888,021, filed on Feb. 3, 2018, now Pat. No. 10,255,439.

(60) Provisional application No. 62/530,295, filed on Jul. 10, 2017, provisional application No. 62/527,671, filed on Jun. 30, 2017, provisional application No. 62/520,954, filed on Jun. 16, 2017, provisional application No. 62/507,691, filed on May 17, 2017.

(58) Field of Classification Search
CPC ............... G06F 2221/033; G06F 17/15; G06F 2221/034; G06N 20/00
See application file for complete search history.

(56) References Cited

U.S. PATENT DOCUMENTS

| | | | |
|---|---|---|---|
| 7,096,502 B1 | 8/2006 | Fox et al. | |
| 7,260,844 B1 | 8/2007 | Tidwell et al. | |
| 7,433,829 B2 | 10/2008 | Borgia et al. | |
| 7,624,448 B2 | 11/2009 | Coffman | |
| 7,891,003 B2 | 2/2011 | Mir | |
| 7,900,259 B2 | 3/2011 | Jeschke et al. | |
| 8,191,139 B2 | 5/2012 | Heimerdinger et al. | |
| 8,255,995 B2 | 8/2012 | Kraemer et al. | |
| 8,272,061 B1 | 9/2012 | Lotem et al. | |
| 8,312,549 B2 | 11/2012 | Goldberg et al. | |
| 8,407,801 B2 | 3/2013 | Ikegami et al. | |
| 8,413,237 B2 | 4/2013 | O'Rourke et al. | |
| 8,413,249 B1 | 4/2013 | Chou | |
| 8,607,351 B1 | 12/2013 | Wang et al. | |
| 8,893,273 B2 | 11/2014 | Honig et al. | |
| 9,043,924 B2 | 5/2015 | Maor et al. | |
| 9,497,203 B2 | 11/2016 | Honig et al. | |
| 9,774,613 B2 | 9/2017 | Thomas et al. | |
| 10,200,399 B2 | 2/2019 | Agarwal | |
| 10,255,439 B2 | 4/2019 | Agarwal | |
| 10,262,132 B2 | 4/2019 | Reinecke et al. | |
| 10,699,008 B2 | 6/2020 | Agarwal | |
| 10,747,876 B2 | 8/2020 | Agarwal | |
| 2001/0027388 A1 | 10/2001 | Beverina et al. | |
| 2006/0015941 A1 | 1/2006 | McKenna | |
| 2006/0241991 A1 | 10/2006 | Pudhukottai et al. | |
| 2011/0126111 A1 | 5/2011 | Gill et al. | |
| 2011/0178942 A1 | 6/2011 | Watters et al. | |
| 2014/0137257 A1 | 5/2014 | Martinez et al. | |
| 2016/0162690 A1 | 6/2016 | Reith et al. | |
| 2017/0169230 A1* | 6/2017 | Zheng | G06N 20/00 |
| 2017/0213037 A1 | 7/2017 | Toledano et al. | |
| 2018/0255084 A1 | 9/2018 | Kotinas et al. | |
| 2018/0324207 A1 | 11/2018 | Reybok, Jr. et al. | |

OTHER PUBLICATIONS

Threat Model, Wikipedia, published online at least as early as Feb. 3, 2018, available at https://en.wikipedia.org/wiki/Threat_model (note that some of the material in this Wikipedia article appears to be posted by one or more inventors of the present application or its parent provisional applications—some of the material appears to be posted by Brian Beyst, for example, who is an inventor on two of the parent provisional applications).

Comparisons of Threat Model Modeling Methodologies, published online by ThreatModeler at least as early as Apr. 15, 2016, available at http://threatmodeler.com/comparison-threat-modeling-methodologies/ (note that this article appears to be affiliated with a business organization of, and may have been published under the direction of, one or more inventors of the present application or its parent provisional applications).

Microsoft Threat Modeling Tool, published online by Microsoft, different sections published at different times from Aug. 22, 2017 to Jan. 24, 2018, available online at https://docs.microsoft.com/en-us/azure/opbuildpdf/security/TOC.pdf? branch=live.

A description of an on-sale version of systems and methods, on sale in the U.S by applicants at least as early as Dec. 31, 2011, which on-sale version disclosed some of the elements disclosed in the present application. The description includes a detailed discussion of which claim elements of the claims as originally filed in the present application were disclosed in the 2011 version and which were not, and includes screenshots of user interfaces used in the system/methods of the 2011 version.

Lockheed Martin Corporation, "Seven Ways to Apply the Cyber Kill Chain with a Threat Intelligence Platform," published at least as early as 2015.

Roy, Maurer. "Top Database Security Threats and How to Mitigate Them." Jul. 30, 2015. Retrieved from "https://www.shrm.org/resouresandtools/hr-topics/risk-management/pages/top-database-security-threats.aspx" (Year: 2015).

X. Amini, N. Jamil, A.R. Ahmad and M.R. Z'aba, 2015. Threat Modeling Approaches for Securing Cloud Computing. Journal of Applied Sciences, 15: 953-967. Retrieved from "https://scialert.net/fulltextmobile/?doi=jas.2015.953.967" (Year: 2015).

* cited by examiner

FIG. 6

THREATS

SELECT LIBRARY | THREAT MODELER ▶

| NAME | RISK | LABELS |
|---|---|---|
| BUFFER OVERFLW | VERY HIGH | BUFFER |
| SESSION HIJACK | VERY HIGH | JAVA,CAPEC,... |
| PHYSICAL THEFT | VERY HIGH | CAPEC-507,... |
| HTTP SPLITTING | HIGH | |
| BRUTE FORCE | HIGH | CAPEC-112,... |
| DBL ENCODING | MEDIUM | CAPEC-120,... |
| SENS DATA EXP | VERY HIGH | OWASP-A6... |
| INTEGER ATTACKS | MEDIUM | CAPEC-128,... |
| POINTER ATTACK | MEDIUM | CAPEC-129,... |
| SYMLINK ATTACK | MEDIUM | CAPEC-132,... |
| EMAIL INJECT. | MEDIUM | CAPEC-134,... |
| FORMAT STR. INJ. | HIGH | CAPEC-135,... |
| AUTOMATION ATK | VERY HIGH | |
| SPAM | VERY HIGH | |

SENSITIVE DATA EXPOSURE

RISK: VERY HIGH

OWASP-A6

CAPEC-610

OWASP-A5-SECURITY MIS-CONFIGURATION

DESCRIPTION

WWW.OWASP.ORG

PROPERTIES

- THREAT AGENTS +
- TEST CASES
  - TEST CASE 01 ×
  - TEST CASE 02 ×
  - TEST CASE 03 ×
- SECURITY REQUIREMENTS +
  - CLICKJACK CHEAT SHEET ×
  - TEST COMP CONTROL ×
  - SS-COMPENS. CONTROL ×

| SECURITY REQUIREMENTS | | | PROPERTIES |
|---|---|---|---|
| | | THREAT MODELER ▶ | CODE SNIPPETS |
| NAME | LABELS | NAME | CODE REVIEWS |
| ENCRYPTION: USE ONLY STR... | AZURE LIB... | | |
| ENCRYPTION: ENSURE RAND... | DOM,... | DESCRIPTION | |
| INPUT VALIDATION WITH... | HARDWARE,... | | |
| TM - INPUT VALIDATION | JAVA,INL... | | |
| USING SSL | CERTS,... | IS COMPENSATING CONTROL ☐ | |
| KEY MANAGEMENT: ENSU... | OWASP,... | | |
| TLS: PREVENT CACHING OF... | | LABELS | |
| CERTIFICATES: USE AN APP... | CERTS,... | | |
| ADD FIREWALL RULES | EVENT,TO,... | | |
| HOST INTEGRITY CHECKING | TO,SSE,... | | |
| SECURE BROWSERS | SCRIPT,LOG,... | | |
| OUTPUT ENCODING | | | |
| APPLY PATCHES | XSS,REL,... | SAVE   CANCEL | |
| DISABLE HTTP TRACE | INI,HTTP,... | | |

FIG. 9

MITIGATIONS

DRAG A COLUMN HEADER AND DROP IT HERE TO GROUP BY THAT COLUMN

| THREAT | SOURCE | RISK | STATUS |
|---|---|---|---|
| FILE MANIPULATION | FILE SYSTEM | MEDIUM | OPEN |
| ACCESSING EXECUTABLE FILES | FILE SYSTEM | VERY HIGH | OPEN |
| CREATE FILES SAME NAME AS... | FILE SYSTEM | VERY HIGH | OPEN |
| MAN IN THE BROWSER | IE 11 | VERY HIGH | OPEN |
| MANIPULATING CONFIG FILE | FILE SYSTEM | VERY HIGH | OPEN |
| FORCE USE OF CORRUPT FILE | FILE SYSTEM | VERY HIGH | OPEN |
| MANIPULATING INPUT TO CALL | FILE SYSTEM | HIGH | OPEN |
| FILE MANIPULATION | FILE SYSTEM | MEDIUM | OPEN |
| ACCOUNT FOOTPRINTING | IE 11 | VERY HIGH | OPEN |
| AUTOMATION ATTACK | IE 11 | VERY HIGH | OPEN |
| PHYSICAL THEFT | LAPTOP | VERY HIGH | OPEN |
| PHYSICAL THEFT | LAPTOP | VERY HIGH | OPEN |
| BLUEJACKING | BLUETOOTH PORT | VERY HIGH | OPEN |
| PHISHING | OUTLOOK 2010 | VERY HIGH | OPEN |
| SPAM | OUTLOOK 2010 | VERY HIGH | OPEN |
| DNS CACHE POISONING | EMAIL SERVER | VERY HIGH | OPEN |

[MITIGATE] [CLOSE]

COMPENSATING CONTROLS

DRAG A COLUMN HEADER AND DROP IT HERE TO GROUP BY THAT COLUMN

| CONTROL | THREAT | SOURCE | RISK | STATUS |
|---|---|---|---|---|
| FIREWALL | TCP WINDOW SCAN | WINDOWS 7 | LOW | MITIGATED |
| FIREWALL | TCY SYN SCAN | TCP | LOW | OPEN |
| FIREWALL | TCP ISN CTR RATE PROBE | TCP | LOW | OPEN |
| FIREEYE | MAN IN THE BROWSER | IE 11 | VERY HIGH | MITIGATED |
| CYLANCE | MALWARE PROP VIA USB | USB PORT | VERY HIGH | MITIGATED |
| AV DLP | FORCE USE CORRUPT FILE | FILE SYSTEM | VERY HIGH | MITIGATED |
| MCAFEE DLP | MAN IN THE MIDDLE ATK | WIFI PORT | VERY HIGH | MITIGATED |
| BIT9 | FILE MANIPULATION | FILE SYSTEM | MEDIUM | MITIGATED |
| BIT9 | ACCOUNT FOOTPRINTING | IE 11 | VERY HIGH | OPEN |
| BIT9 | AUTOMATION ATTACK | IE 11 | VERY HIGH | MITIGATED |
| AV HIPS | PHYSICAL THEFT | LAPTOP | VERY HIGH | MITIGATED |
| BITLOCKER | PHYSICAL THEFT | LAPTOP | VERY HIGH | MITIGATED |
| IPC | BLUEJACKING | BLUETOOTH PORT | VERY HIGH | OPEN |
| IRONPORT | PHISHING | OUTLOOK 2010 | VERY HIGH | MITIGATED |
| IRONPORT | SPAM | OUTLOOK 2010 | VERY HIGH | MITIGATED |
| AKAMAI DNS | DNS CACHE POISONING | EMAIL SERVER | VERY HIGH | OPEN |

| NEW | EDIT | DELETE | DIAGRAM | REPORT | THREAT TREE |
|---|---|---|---|---|---|

| THREAT MODELS PDF « | | ENDPOINT SECURITY V.1 | | | | |
|---|---|---|---|---|---|---|
| NAME ▶ | V. ▶ | THREATS 358 | SECURITY REQ'TS 82 | TEST CASES 5 | CODE RVW 3 | |
| AIR VEHIC SYS | 1.0 | CHANGE RISK ▶ | CHANGE RISK STATUS ▶ | | | |
| AWS - EC2 | 1.0 | DRAG HEADER HERE TO GROUP BY THAT COLUMN | | | | |
| BANKING APP | 1.2 | THREAT ▶ | RISK ▶ | STATUS ▶ | SOURCE ▶ | ACTION ▶ |
| IOT ENVIR. | 1 | ACCT HIJACK | VERY HIGH | OPEN | AWS ELB | D NOTE |
| WRK COMMUTE | 1 | INSEC. COMM. | VERY HIGH | OPEN | AWS ELB | D NOTE |
| CRM APP | 2.0 | PWD BRUTE F... | HIGH | OPEN | APP | D NOTE |
| ECOMM POC | 2.5 | SENS DATA EXP | VERY HIGH | OPEN | APP | D NOTE |
| END POINT SEC. | 1 | SQL INJECTION | HIGH | MITIGATED | APP | D NOTE |
| IOT SERVER | 1 | BLIND SQL INJ | HIGH | MITIGATED | APP | D NOTE |
| MICROWEB SVC | 1.0 | IDENT SPOOF | MEDIUM | OPEN | WEB BR | D NOTE |
| MOBILE BAKE... | 1 | TARGETED MAL | VERY HIGH | OPEN | WEB BR | D NOTE |
| SQL DB | 12 | CLICKJACKING | VERY HIGH | OPEN | APP | D NOTE |
| HEALTH THREAT | 1.0 | X SITE TRACING | VERY HIGH | OPEN | WEB SVR | D NOTE |
| ONLINE BANK | 1 | IIS SNIFFING | VERY HIGH | OPEN | WCF SVC | D NOTE |
| FINAN. THREAT | 1 | XML SVC DEN | VERY HIGH | OPEN | WEB SVC | D NOTE |
| | | BUFFER OVFLW | VERY HIGH | OPEN | MS WORD | D NOTE |
| | | FILE MANIP | MEDIUM | MITIGATED | FILE SYS | D NOTE |
| | | PHYS THEFT | VERY HIGH | MITIGATED | LAPTOP | D NOTE |
| | | BLUEJACKING | VERY HIGH | OPEN | BT PORT | D NOTE |

1300, 1302

```
AWS.CSV - NOTEPAD                                                    — [ ] X
FILE  EDIT  FORMAT  VIEW  HELP

NAME,VALUE,COMMENT,GUID
AWS DELIVERY,AWS DELIVERY,,A1CC4B7F-C488-4E08-B679-CFEB66FA0367
INTERNET GATEWAY,AWS API GATEWAY,,CCE1471D-4268-411C-BD0D-F7BF53F6AD06
CUSTOMER GATEWAY,AWS API GATEWAY,,CCE1471D-4268-411C-BD0D-F7BF53F6AD06
AWS API GATEWAY,AWS API GATEWAY,,CCE1471D-4268-411C-BD0D-F7BF53F6AD06
AWS CLOUDFRONT,AWS CLOUDFRONT,5C6BDE7B-B177-44B7-822B-71E2DF9D7A50
WEB/APP EC2,AWS EC2,,91F90108-6DCE-4E2A-9C90-5842666DFD4F
AWS EC2,AWS EC2,,91F90108-6DCE-4E2A-9C90-5842666DFD4F
AWS EFS,,AWS EFS,,A0CA642A-2BBD-4550-8C2B-0655C220DE3D
AWS EBS,AWS EBS,,C1D279EF-FE1F-48BD-B74F-791F468C25E8
AWS ELASTICACHE,AWS ELASTICACHE,,8CDD3FB3-4733-44B8-82A6-05E5E50020CE
AWS RDS,AWS RDS,,A05F4A57-AE83-4700-85B0-6F620DF7E50F
AWS ROUTE 53,AWS ROUTE 53,,2AE7B471-3D99-48F6-BDC6-16D90B3E2963
AWS 53,AWS53,,F8089DEE-EC85-459B-AA10-5F804401330B
AWS SES,AWS SES,,DF8966B5-A891-40E2-A7D9-23C5CA5A40A4
AWS AMI,AWS AMI,,F039D6C5-E8E6-45E2-AC8E-5BEEEB283726
AWS ANDROID,AWS ANDROID,,908E92E4-9A62-435B-969A-9EA44A0874FE
AWS IAM,AWS IAM,,41D40A72-0644-4996-81BD-54AABC145BC6
AWS LAMBDA,AWS LAMBDA,,2AA1339C-F70F-4B4F-821C-81698B057695
AWS WAF,AWS WAF,,82403343D-B72F-4CDB-8CD2-942039B45028
AWS COGNITO,AWS COGNITO,,F0CC8C22-04E5-4B0C-811F-B74B2E80FC0C
```

RESOURCE_MAPPING1.CSV - NOTEPAD — ☐ ✕
FILE EDIT FORMAT VIEW HELP

```
NAME,VALUE,COMMENT,GUID
2G,2G,,3B913906-B137-4F4B-9804-6D444CF9A8D0
3G,3G,,8AF0BE9D-72E5-4F0E-B499-CED4066E9037
4G,4G,,EF006128-2D94-4746-AE71-BB14D3316257
5G,5G,,8D5ADBA4-019E-472A-9D5F-1D9B47621615
ABOUT US,ABOUT US,,A86DA704-50C5-4736-9239-18165E9E5590
ACARS,ACARS,,02E8E816-09D5-4AB7-B867-65058A5B2B39
ACCESSSERVER,WEB SERVER,,A1CC4B7F-C488-4E08-B679-CFEB66FA0367
ACCOUNT,ACCOUNT,,8AC77992-5F2F-4BF4-9754-1C0CDD93CFC5
ACH TRANSFER,ACH TRANSFER,,5A58D953-1E2D-4AF4-BFDB-B79CB0E887A0
ADD,ADD,,633A7306-6A6E-4AEE-99C6-76442E9D9C07
ADDRESS BOOK,ADDRESS BOOK,,B7A6A3B8-15BD-4756-86B8-47BC425B4F9E
ADMIN,ADMIN,,E0E03794-B1A4-43FB-B389-AE443C8E4D97
ADS-B,ADS-B,,2F3492A0-5C80-4B07-AF47-26AA08F44735
AIRPLANE,AIRPLANE,,3DD8F8D8-EF6C-4648-A338-DECE836547A0
AJAX,AJAX,,5899E781-942E-49FC-8A80-A2D51137DFD6
ALERT,ALERT,,C27F2518-AEFE-4A94-9732-289E05B514A8
ALPC,ALPC,,56008F64-E498-497F-9DAE-6CA3DC8FB163
ANGULAR.JS,ANGULAR.JS,,5846980C-710C-4708-9FB5-5625AFC74E6A
ANTENNA,ANTENNA,,29B91666-533D-4ADC-B674-E8D685539C68
ATM,ATM,C3B05451-21D6-4ADC-8A30-5084993DF205
```

SYSTEMS AND METHODS FOR AUTOMATED THREAT MODEL GENERATION FROM DIAGRAM FILES

CROSS REFERENCE TO RELATED APPLICATIONS

This document is a continuation-in-part application of U.S. patent application Ser. No. 16/542,263 titled "Systems & Methods for Automated Threat Model Generation from Third Party Diagram Files," naming as first inventor Anurag Agarwal, filed Aug. 15, 2019, which in turn is a continuation-in-part application of U.S. patent application Ser. No. 16/228,738 titled "Threat Model Chaining and Attack Simulation Systems and Related Methods," naming as first inventor Anurag Agarwal, filed Dec. 20, 2018, which in turn is a continuation-in-part application of U.S. patent application Ser. No. 15/922,856 titled "Threat Model Chaining and Attack Simulation Systems and Methods," naming as first inventor Anurag Agarwal, filed Mar. 15, 2018, issued as U.S. Pat. No. 10,200,399 on Feb. 5, 2019, which in turn is a continuation-in-part application of U.S. patent application Ser. No. 15/888,021 titled "Threat Modeling Systems and Related Methods Including Compensating Controls," naming as first inventor Anurag Agarwal, filed Feb. 3, 2018, issued as U.S. Pat. No. 10,255,439 (hereinafter "the '021 Application") on Apr. 9, 2019, which '021 Application in turn claims the benefit of the filing date of U.S. Provisional Pat. App. Ser. No. 62/507,691 titled "System and Method of Including Compensating Controls in a Threat Modeling Process," naming as first inventor Anurag Agarwal, filed May 17, 2017, and which '021 Application also claims the benefit of the filing date of U.S. Provisional Pat. App. Ser. No. 62/527,671 titled "System and Method for Identifying and Analyzing the Potential Attack Surface of a Complex System," naming as first inventor Anurag Agarwal, filed Jun. 30, 2017, and which '021 Application also claims the benefit of the filing date of U.S. Provisional Pat. App. Ser. No. 62/530,295 titled "Method and Apparatus for Early Implementation of Enterprise DevSecOps," naming as first inventor Anurag Agarwal, filed Jul. 10, 2017, and which '021 Application also claims the benefit of the filing date of U.S. Provisional Pat. App. Ser. No. 62/520,954 titled "System and Method for Identifying Potential Threats to a Complex System," naming as first inventor Anurag Agarwal, filed Jun. 16, 2017, the disclosures of each of which are hereby incorporated entirely herein by reference.

BACKGROUND

1. Technical Field

Aspects of this document relate generally to threat modeling processes and systems.

2. Background Art

Threat modeling is a process by which vulnerabilities of a system or process may be detailed and prioritized. One example of an existing threat modeler is a modeler marketed under the name THREAT MODELING TOOL by Microsoft Corporation of Redmond, Wash. Threat modeling allows a user to analyze potential attack vectors and prioritize vulnerabilities. While some threat modeling involves threats related to computing networks and systems, threat modeling in general encompasses a broader scope and may involve modeling threats in non-computer-related systems and processes. Some commercial threat modeling tools utilize a dynamic question and answer user interface which generally relies on an underlying data flow diagram (DFD) or process flow diagram (PFD) conceptual basis.

With regards to modeling computing networks, traditional threat modeling systems and methods exist for assessing risk from potential cyber threats at an individual application level without fully accounting for application-application interactions, thereby miscalculating organizational risk. Other systems and methods exist for discovering vulnerabilities to applications deployed in cyber environments by surveying applications. These rely on recognizing previously identified and cataloged vulnerability signatures and are not designed to survey non-application items included in an organization's cyber environment, nor can these systems recognize which threats newly introduced to a cyber system are relevant to security, nor can these systems perform "what-if" scenarios as part of an organization's risk management analysis. Existing methodologies also do not provide for communicating the risks associated with identified threats in a way that non-security experts easily appreciate or understand.

Accordingly, traditional threat modeling methodologies have the following weaknesses: (1) they are effective in analyzing only single applications operating in isolation on a predetermined infrastructure; (2) they require security subject-matter experts for their creation, use, and maintenance; (3) they are resource-intensive to build and maintain, and; (4) they cannot be effectively used to scale a threat modeling practice to meet the needs of enterprises generating tens of software applications per year. Traditional threat modeling methodologies also cannot be easily integrated into existing agile software development approaches or with DevOps practices, and so are often rejected by agile developers and operational teams as non-productive.

Existing threat modeling methodologies also do not help organizations understand: (1) the nature of application interactions; (2) the user of shared components; (3) the effect of including third party elements within the IT ecosystem; (4) the downstream impact should potential threats be realized; (5) the nature of the organization's comprehensive attack surface; (6) the explicit nature of the organization's attacker population; (7) the effectiveness of deployed or contemplated compensating controls; or (8) a means to communicate the potential impact should threats be realized without communicating confidential information or security details which could further expose the organization to risk from potential threats.

Software exists for converting a diagram file of one type to another type of diagram file, though not into a threat model. For example, LUCIDCHART, SMARTDRAW, and EDRAWSOFT are programs which will convert a MICROSOFT VISIO file into another file type (for example importing the visual elements and retaining some diagram features of the original VISIO file) but without creating an associated threat model.

SUMMARY

Threat modeling methods may include: providing, using one or more servers, a first software application; providing one or more data stores, the one or more data stores being accessible using the first software application, the one or more data stores including: a plurality of threat model components stored therein; and a plurality of threats stored therein, wherein each of the threats is associated with at least one of the threat model components through the one or more data stores; providing one of: one or more mapping files correlating the threat model components with visual diagram components of a second software application ("hereinafter second software diagram components"), and; a machine learning (ML) algorithm configured to select, for each second software diagram component, a corresponding threat model component; in response to receiving one or more user inputs, using one or more user interfaces displayed on one or more computing devices communicatively coupled with the one or more data stores: using the one or more computing devices, reading a data file generated by the second software application, the data file including a subset of the second software diagram components, the data file defining one or more relationships between the subset of second software diagram components; determining using one of the ML algorithm and the one or more mapping files, for the subset of second software diagram components, corresponding threat model components; displaying on the one or more user interfaces a relational diagram of one of a system, an application, and a process, using visual representations of the threat model components corresponding with the subset of second software diagram components, the relational diagram defining a threat model; and generating, using the one or more computing devices, and displaying, on the one or more user interfaces, a threat report displaying each threat that is associated through the one or more data stores with one of the threat model components included in the threat model.

Threat modeling methods may include one or more or all of the following:

The method may include displaying, on the one or more user interfaces, a list of suggested threat model components determined to be potential matches for one of the second software diagram components.

The method may include displaying, for each suggested threat model component, one of a weight and a percentage representatively indicating a confidence in a match between the suggested threat model component and the second software diagram component.

The data file may be one of a VSD file, a VSDX file, a TMT file, an XML file, a JSON file, a PNG file, a JPEG file or any other file type which can represent a diagram.

The step of determining, for the subset of second software diagram components, corresponding threat model components, may include first determining whether a user-defined name for one of the subset of second software diagram components has a match in the one or more mapping files and, if no match is found, then determining whether a default title for the second software diagram component, as defined by the second software application, has a match in the one or more mapping files.

The method may include, if no match is found for the default title, matching the second software diagram component with a placeholder component and displaying the placeholder component on the relational diagram to indicate that no match was found.

The method may include determining, for the one or more relationships defined by the data file, corresponding threat model components as defined in the one or more mapping files.

Threat modeling systems may include: one or more computing devices communicatively coupled with one or more data stores, the one or more computing devices including a first software application providing access to the one or more data stores, the one or more data stores including: a plurality of threats stored therein; and a plurality of threat model components stored therein, wherein each of the threats is associated with at least one of the threat model components through the one or more data stores; one of: one or more mapping files communicatively coupled with the one or more data stores, the one or more mapping files correlating the threat model components with visual diagram components of a second software application (hereinafter "second software diagram components"), and; a machine learning (ML) algorithm configured to select, for each second software diagram component, a corresponding threat model component; an import interface displayed on one of the one or more computing devices, the import interface configured to, in response to receiving user input, initiate reading of a data file by the one or more computing devices, the data file generated by the second software application, the data file including a subset of the second software diagram components, the data file defining one or more relationships between the subset of second software diagram components; an interface configured to, in response to receiving user input, initiate, using one of the ML algorithm and the one or more mapping files, a determination of which threat model components correspond with the subset of second software diagram components; a diagram interface, displayed on the one or more computing devices, displaying a relational diagram of one of a system, an application, and a process, using visual representations of the threat model components corresponding with the subset of second software diagram components, the relational diagram defining a threat model; and a threat report interface, displayed on the one or more computing devices, including a threat report displaying each threat that is associated through the one or more data stores with one of the threat model components included in the threat model.

Threat modeling systems may include one or more or all of the following:

A suggestions interface may display a list of suggested threat model components determined to be potential matches for one of the second software diagram components.

The suggestions interface may display, for each suggested threat model component, one of a weight and a percentage representatively indicating a confidence in a match between the suggested threat model component and the second software diagram component.

The data file may be one of a VSD file, a VSDX file, a TMT file, an XML file, a JSON file, a PNG file, a JPEG file or any other file type which can represent a diagram.

The one or more mapping files may include a file correlating user-defined names of the second software diagram components with the threat model components.

The one or more mapping files may include a file correlating default titles of the second software diagram components with the threat model components.

For each of the subset of second software diagram components for which no corresponding threat model component is found using one of the one or more mapping files and the ML algorithm, the diagram interface may display a placeholder component indicative of a match not being found.

One or more mapping interfaces may be displayed on the one or more computing devices and may be configured to, in response to receiving user input, modify the one or more mapping files.

Threat modeling systems may include: one or more computing devices communicatively coupled with one or more data stores, the one or more computing devices including a first software application providing access to the one or more data stores, the one or more data stores including: a plurality of threats stored therein; and a plurality of threat model components stored therein, wherein each of the threats is associated with at least one of the threat model components through the one or more data stores; one of: one or more mapping files communicatively coupled with the one or more data stores, the one or more mapping files correlating the threat model components with visual diagram components of a second software application (hereinafter "second software diagram components"), and; a machine learning (ML) algorithm configured to select, for each second software diagram component, a corresponding threat model component; an import interface displayed on one of the one or more computing devices, the import interface configured to, in response to receiving user input, initiate reading of a data file by the one or more computing devices, the data file including a subset of the second software diagram components, the data file defining one or more relationships between the subset of second software diagram components; an interface configured to, in response to receiving user input, initiate, using one of the ML algorithm and the one or more mapping files, a determination of which threat model components correspond with the subset of second software diagram components; a diagram interface, displayed on the one or more computing devices, displaying a relational diagram of a computing network, using visual representations of the threat model components corresponding with the subset of second software diagram components, the relational diagram defining a threat model; and a threat report interface, displayed on the one or more computing devices, including a threat report displaying each threat that is associated through the one or more data stores with one of the threat model components included in the threat model.

Threat modeling systems may include one or more or all of the following:

A suggestions interface may display a list of suggested threat model components determined to be potential matches for one of the second software diagram components.

The suggestions interface may display, for each suggested threat model component, one of a weight and a percentage representatively indicating a confidence in a match between the suggested threat model component and the second software diagram component.

The one or more mapping files may include a file correlating user-defined names of the second software diagram components with the threat model components.

The one or more mapping files may include a file correlating default titles of the second software diagram components with the threat model components.

General details of the above-described embodiments, and other embodiments, are given below in the DESCRIPTION, the DRAWINGS, and the CLAIMS.

BRIEF DESCRIPTION OF THE DRAWINGS

Embodiments will be discussed hereafter using reference to the included drawings, briefly described below, wherein like designations refer to like elements:

FIG. 6 is an implementation of an interface of the system of FIG. 1;

FIG. 8 is an implementation of an interface of the system of FIG. 1;

FIG. 9 is an implementation of an interface of the system of FIG. 1;

FIG. 11 is an implementation of an interface of the system of FIG. 1;

FIG. 12 is an implementation of an interface of the system of FIG. 1;

FIG. 13 is an implementation of an interface of the system of FIG. 1;

FIG. 28 is an implementation of an interface of the system of FIG. 1;

FIG. 29 is an implementation of an interface of the system of FIG. 1;

DESCRIPTION

Figure 1:
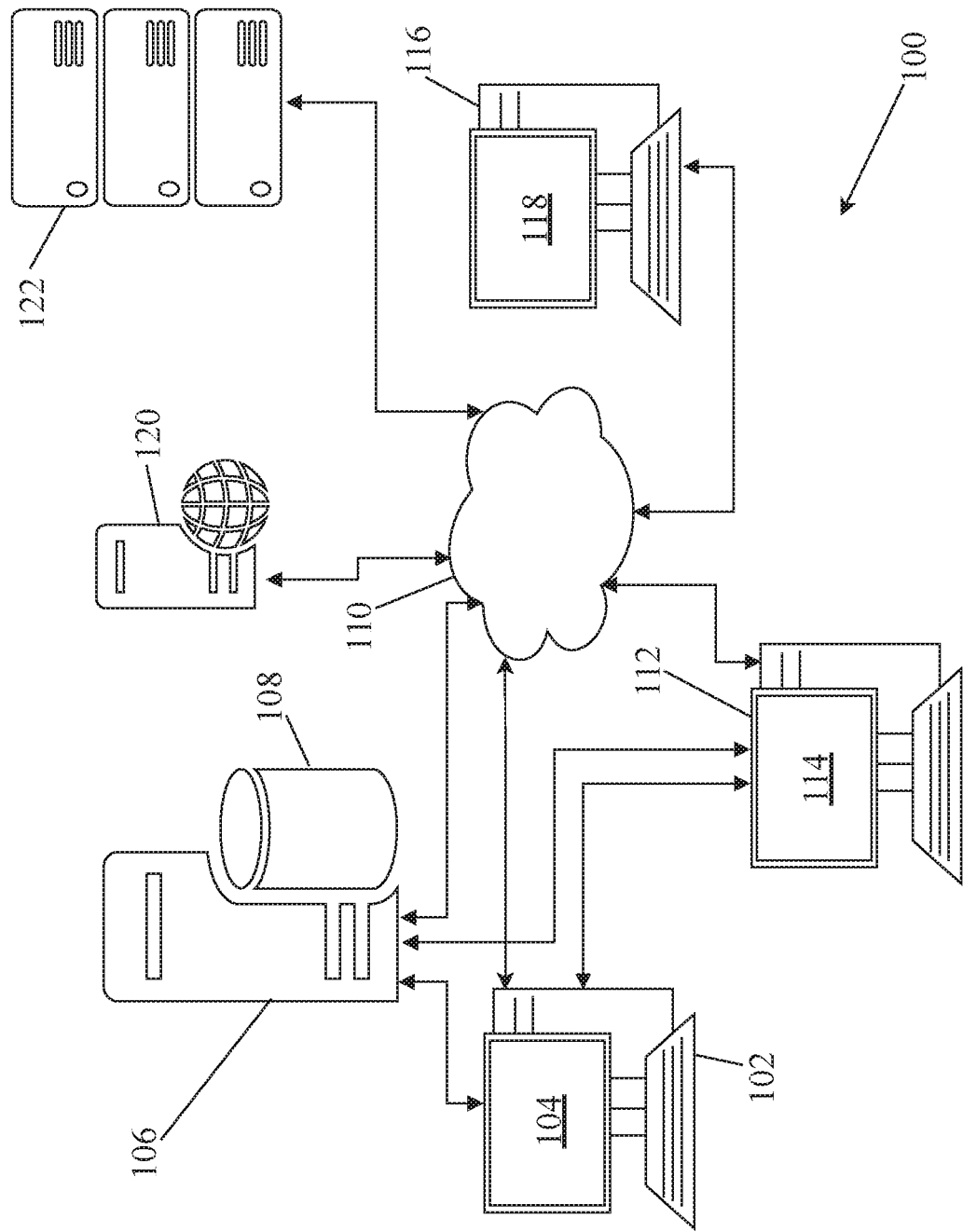
FIG. 1 is a diagram representatively illustrating an implementation of a threat modeling system (hereinafter at times called a "threat model chaining system," "attack simulation system," "system for automated threat model generation from diagram files," and "system")

Implementations/embodiments disclosed herein (including those not expressly discussed in detail) are not limited to the particular components or procedures described herein. Additional or alternative components, assembly procedures, and/or methods of use consistent with the intended systems and methods for automated threat model generation from diagram files (hereinafter called "threat model system(s)" and "threat model method(s)" respectively) may be utilized in any implementation. This may include any materials, components, sub-components, methods, sub-methods, steps, and so forth.

As used herein, the term "input field" includes a "selector." For example, a button or space on a user interface in which a user may move a cursor to and click to make a selection, and a checkbox field, and other similar fields, as well as alphanumeric input fields, are all "input fields" as used herein.

The term "compensating control" in implementations herein may be an alternative mechanism to a security requirement or standard issued by a standards-issuing body that is allowed by the standards-issuing body when the security requirement or standard as stated cannot be met by a party due to legitimate technical or documented business constraints.

In the payment card industry (PCI), as a non-limiting example, compensating controls were introduced in Payment Card Industry Data Security Standard (PCI DSS) 1.0 to give organizations an alternative to security requirements that could not be met due to legitimate technological or business constraints. According to the PCI Council, which was the standards-issuing body issuing the standard (jointly created by the four major credit-card companies VISA, MASTERCARD, DISCOVER, and AMERICAN EXPRESS), compensating controls in that industry must: (1) meet the intent and rigor of the original stated requirement; (2) provide a similar level of defense as the original stated requirement; (3) be "above and beyond" other PCI DSS requirements (not simply in compliance with other PCI DSS requirements); and (4) be commensurate with the additional risk imposed by not adhering to the original stated requirement. Examples of compensating controls for information technology may include: using audit trails and logs for payroll management instead of segregation of duties (having two individuals responsible for separate parts of payroll management); the use of database security applications and services, network access control (NAC), data leak prevention strategies, and email encryption in lieu of comprehensive encryption (i.e., in lieu of converting all electronic data into ciphertext and changing cryptographic keys periodically); two-factor authentication with a change of password every 60 days in lieu of long complex passwords; and so forth.

Notwithstanding the above, in implementations herein "compensating control" may have a more general definition. For example, in implementations a "security requirement" may be defined as a mechanism for stopping or closing a threat at the source of the threat, and a "compensating control" may be defined as a mechanism for stopping or closing a threat not at the source, but between the source and some protected component (i.e., preventing a threat emanating from a source from reaching a protected component). In other implementations a "security requirement" may be defined as a hardware solution and a "compensating control" may be defined as a software solution, such as a change in the code or software added to a system. In still other implementations a "security requirement" may be generally defined as any solution which is costlier or more time consuming and a "compensating control" may be defined as a solution which is not as secure or sure-proof as the relevant security requirement but which is less cost-prohibitive or time-prohibitive.

The threat modeling system and related methods discussed herein are implemented using computing devices and/or networks. Referring to FIG. 1, an implementation of a threat modeling system (threat model chaining system) (attack simulation system) (system) 100 is shown. FIG. 1 only shows a representative example, and there are many other contemplated systems that could be used to implement the threat modeling processes. System 100 includes a computing device 102 having a display 104. While the computing device is drawn as a desktop computer it could be a laptop, a mobile phone or tablet, or any other type of computing device. The same goes for all other computing devices shown in the drawings.

Device 102 is shown communicatively coupled with server 106 which is communicatively coupled with a database (DB) 108. The coupling may be direct, such as through a wired connection, or through a local area network (LAN), or remotely through telecommunication network 110 (which may be the Internet). In some systems the server and database could be housed on the same machine as the computing device 102 using virtualization. In implementations device 102 could be accessed by an administrator of the system to choose settings, add or remove users, add or remove items from the database, and so forth. System 100 only shows one computing device 102, though in implementations the number of computing devices 102 may be scaled up to any number. Likewise, only one server and database are shown, but these also may be scaled up to any number as needed.

Other computing devices may be included in system 100. Computing device 112 includes display 114 and is an example of a computing device which is communicatively coupled with device 102 both directly (such as through a hardwired or wireless LAN), and coupled directly with the server (such as through a hardwired or wireless LAN), and also may be coupled with the server and/or the device 102 through telecommunication network 110. System 100 is shown with only one device 112 but in implementations it could be scaled up to any number of devices 112.

Computing device (device) 116 is an example of a computing device that is not directly coupled with either device 102 or the server but is only coupled thereto through the telecommunications network 110. Nevertheless, device 116 may access the server and database through the telecommunications network. Although only one device 116 is shown, this may be scaled up to any number. Device 116 has a display 118, as shown.

Also shown are a web server 120 and a remote server (server) 122, each of which may be included in implementations of system 100. By non-limiting example, device 116 may access the server 106 and database through the web server 120, such as by navigating to a uniform resource locator (URL) and providing login credentials. Computing devices 102 and 112 could do the same. Although only one web server is shown, this may be scaled up to any number as needed.

None of the computing devices shown in FIG. 1 are directly coupled with remote server 122, which may by non-limiting example be a third party server, or multiple servers (such as a portion of a server rack) or any portion thereof. System 100 could, for example, exclude server 106, and utilize only remote servers 122 which have access to the database 108 (which may be stored on the remote servers), and each of the computing devices may access the database through the remote servers and through one or more described web servers such as through one or more user interfaces displayed on the displays of the computing devices when accessing correlated URLs.

In other implementations one or more application servers could be included in the system, the application server(s)

positioned relationship-wise between an end-user device and the database(s) to facilitate operation of the methods that will be later described.

As indicated, these are only examples of how to implement a threat modeling system, and many other layouts are possible. System 100 may also include many other elements which are not shown for brevity. In a small business or organization wherein only one computing device may be needed to do threat modeling, system 100 could be implemented using a single computing device 102 with a database 108 stored thereon, or with one computing device 102 coupled with a server 106 and database 108 through a local connection (wired or hardwired), or using a cloud-stored database that the users access through user interfaces through remote servers 122 and/or web servers 120. In an organization in which multiple computing devices may need to do threat modeling the system 100 could be implemented using a computing device 102 having the database stored thereon, or coupled through a local or Internet connection to a database 108 stored elsewhere within the organization's computing devices such as on a server 106 or remotely on remote servers 122 accessed via a web server 120, with other computing devices 112 and/or 116 coupled either directly with device 102 and/or 106 and/or through the telecommunication network 110. In implementations in which remote servers are utilized these may be scaled up to any needed number.

The threat modeling system and methods include the modeling of threats utilizing software which users access and interact with through a variety of user interfaces, some examples of which will be described hereafter, but a brief description of the processes facilitated by the software will now be discussed.

Figure 2:
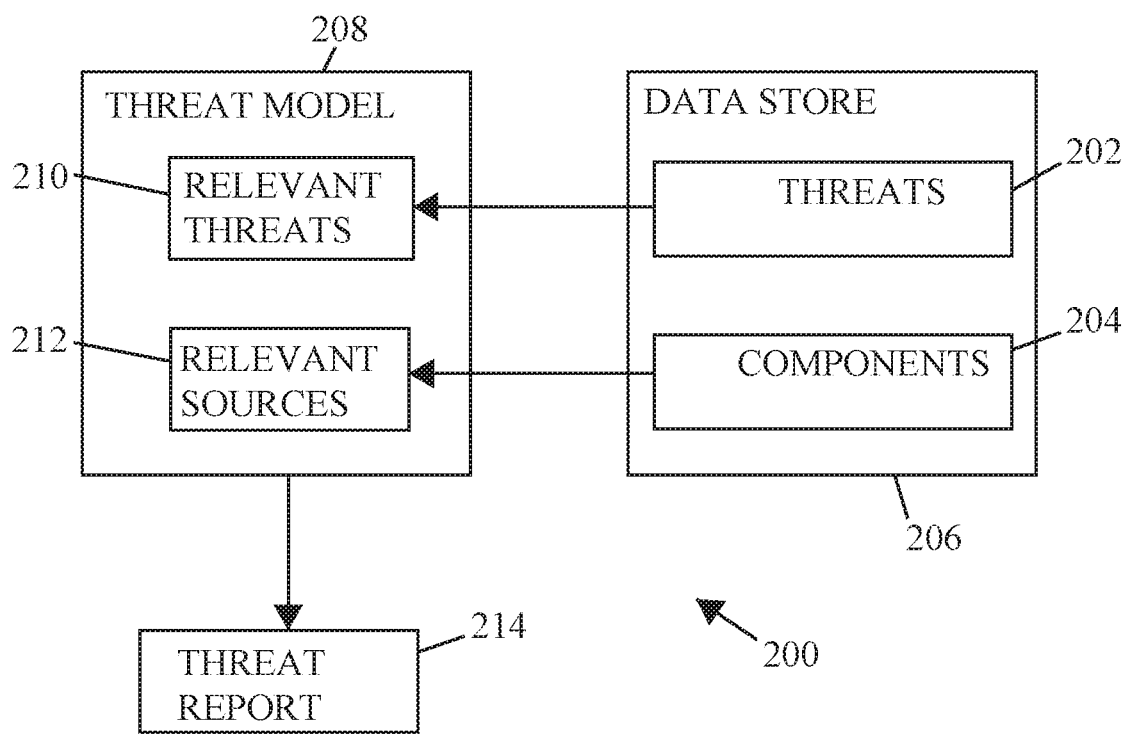
FIG. 2 is a block diagram representatively illustrating an implementation of a threat modeling method.

Referring to FIG. 2, a representative example of a threat modeling process (process) (method) 200 includes generating a threat model (model) 208 for any application, process, or system under consideration. By non-limiting example, this could include modeling the possible threats to commuting to work safely, modeling the possible threats to preventing the spread of an infectious disease, or modeling the possible attacks on a computer network (cybersecurity). Model 208 is used to generate an original threat report (report) 214 which in implementations includes identified threats, the status of identified threats (threat status), and the source(s) of identified threats, among other things.

As illustrated in FIG. 2, process 200 may include storing a plurality of threats 202 and threat model components (components) 204 in a data store 206. This may include, by non-limiting example, storing titles, definitions or descriptions, and/or associated images in the database 108 for each component and/or threat. The threats and components are used to create threat model 208.

Process 200 in implementations includes a user selecting from among the available components those components which are relevant to any given system, process or application. This is represented by the arrow between "components" and "relevant sources." The relevant sources 212 are relevant sources of threats that are determined by the system 100 either after, or while, the user is selecting the components that are involved in the specific application, system or process and defining relationships between and among the relevant components. The system also retrieves from the database relevant threats 210 that were previously correlated with the chosen components or combinations of components through the database, to form the threat model 208 (this is representatively illustrated by the arrow between "threats" and "relevant threats"). The threat model thus includes relevant threats and the relevant sources of those threats. The threat model is used to generate a threat report 214.

There may be some components with which no threat is associated (and they are therefore not relevant sources of threats), and there may be some threats that are dependent on one or more relationships between components. For example, when modeling a computing network some components may communicate with one another using a hypertext transfer protocol secure (HTTPS) protocol or instead with a transmission control protocol (TCP), and this relationship may determine whether there is a relevant threat to include in the model (or which relevant threat to include in the model). Although these relationships between components are communicative couplings and/or protocols in some instances, the relationships themselves may be considered "components" in a broad sense so that, in FIG. 2, the potential relationship types between components would themselves be considered components 204 that are stored in the data store and which the user utilizes to build a diagram of the system, application or process. Communication protocols may use conductive wires (electric signals), optic fibers (optic signals), wireless technologies (electromagnetic signals), and so forth.

FIG. 2 is a simplified diagram. Each component and each plurality of components is a potential relevant source for one or more threats. For example, one threat may be "Bluejacking" and one component, which would be correlated to this threat through the database, could be "BLUETOOTH port." Accordingly, if a user includes a BLUETOOTH port in a diagram of a computing system, the system 100 will identify that port as a relevant source for bluejacking in the associated threat model and threat report. The component in this example is a physical component of a computing device or system/network. In other implementations components/sources may not be physical components. For example, if one is modeling the threats involved in commuting to work safely one threat may be "freeway collision" and one component, which would be correlated with this threat through the database, would be "merging onto freeway." Thus, in this latter example "merging onto freeway" would be a relevant source for "freeway collision." In this example the component (and relevant source) is defined as an action or step, and not as a physical component.

Regardless of whether the threats and components/sources are physical elements or steps, actions, etc., the database allows for the correlation of any threat to any number of components and likewise, the correlation of any component to any number of threats. Accordingly, using the above example, the BLUETOOTH port may be defined as a relevant source for a Bluejacking threat, but it may not be the only relevant source (another source may be a BLUETOOTH device wirelessly connected with the system being analyzed). Similarly, Bluejacking may be defined as one threat that may occur due to vulnerabilities of the BLUETOOTH port, but there may be other vulnerabilities or threats that are present in the system due to the BLUETOOTH port.

Figure 3:
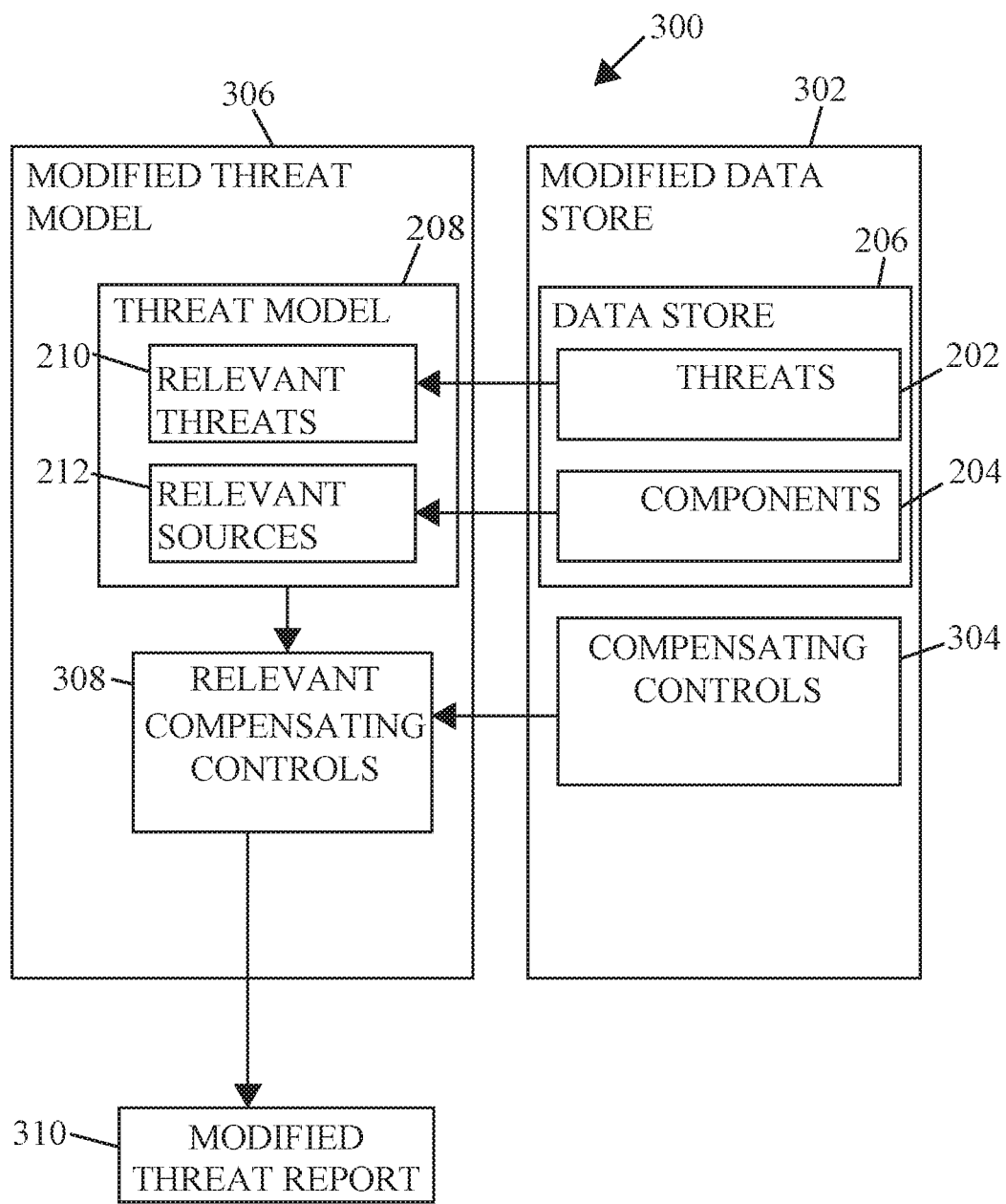
FIG. 3 is a block diagram representatively illustrating an implementation of a threat modeling method.

Referring to FIG. 3, another implementation of a threat modeling process (process) (method) 300 is shown. Method 300 includes the steps described above with respect to FIG. 2 but also includes additional steps. A modified data store 302 includes data store 206 but also includes compensating controls 304 stored in the database. The stored compensating controls include, by non-limiting example, a title, definition, image, and/or other items for each compensating control. Each compensating control may be associated with one or more threats and/or with one or more components and/or with one or more security requirements through the database (security requirements may in turn be associated with one or more components and/or one or more threats through the database). Method 300 includes user selection of one or more compensating controls (relevant compensating controls 308) from among all compensating controls 304 stored in the database, and the relevant compensating controls together with the threat model 208 previously discussed (in other words the relevant threats 210 and relevant sources 212) are included in the modified threat model 306. Modified threat model is used to generate modified threat report 310.

Figure 4:
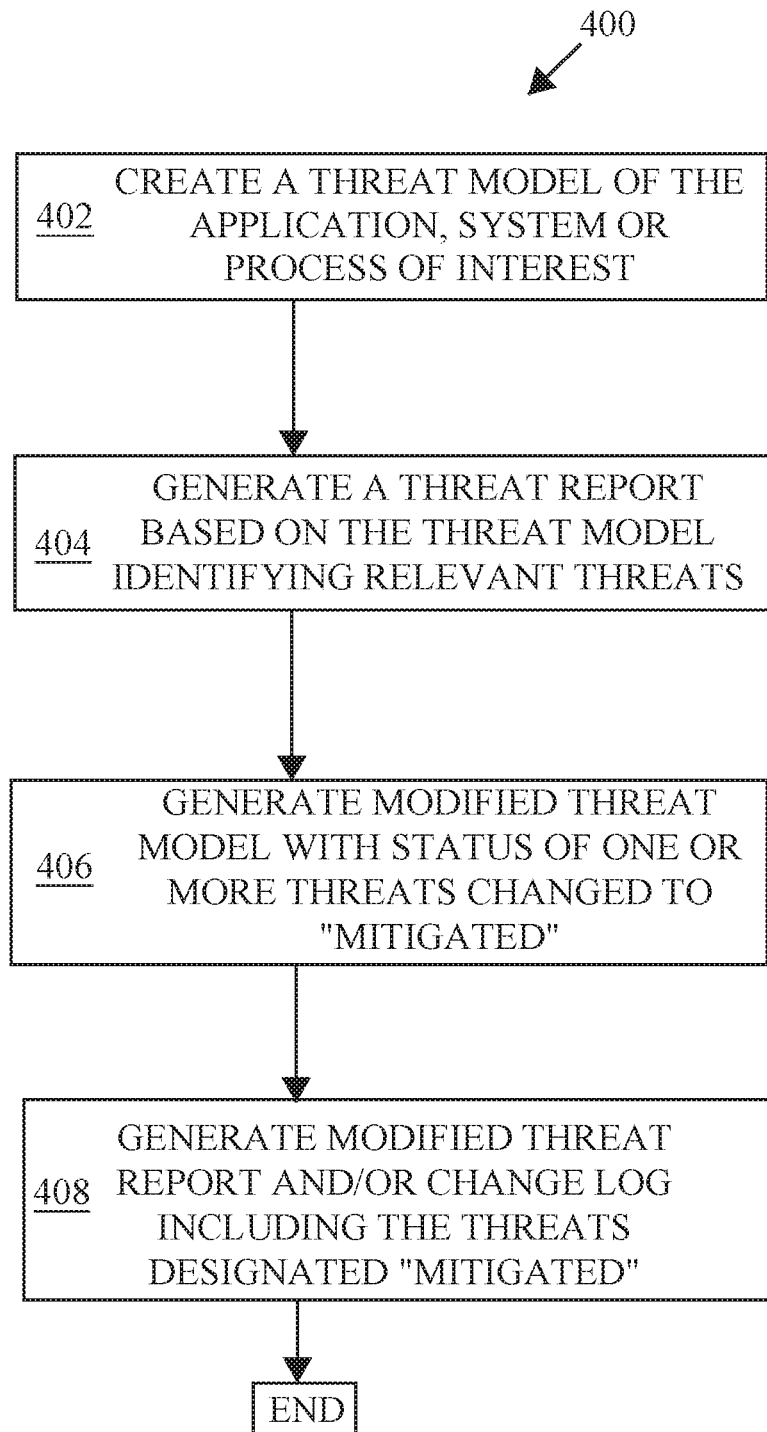
FIG. 4 is a flowchart representatively illustrating an implementation of a threat modeling method.

Referring now to FIG. 4, method 300 may include other steps and may be shown by threat modeling process (process) (method) 400 which includes creating a threat model of the application, system or process of interest (step 402), generating a threat report based on the threat model identifying relevant threats (step 404), generating a modified threat model with the status of one or more threats changed to "mitigated" using one or more of the relevant compensating controls (step 406), and generating a modified threat report and/or a change log including the threats designated as "mitigated" by the one or more relevant compensating controls (step 408).

Figure 5:
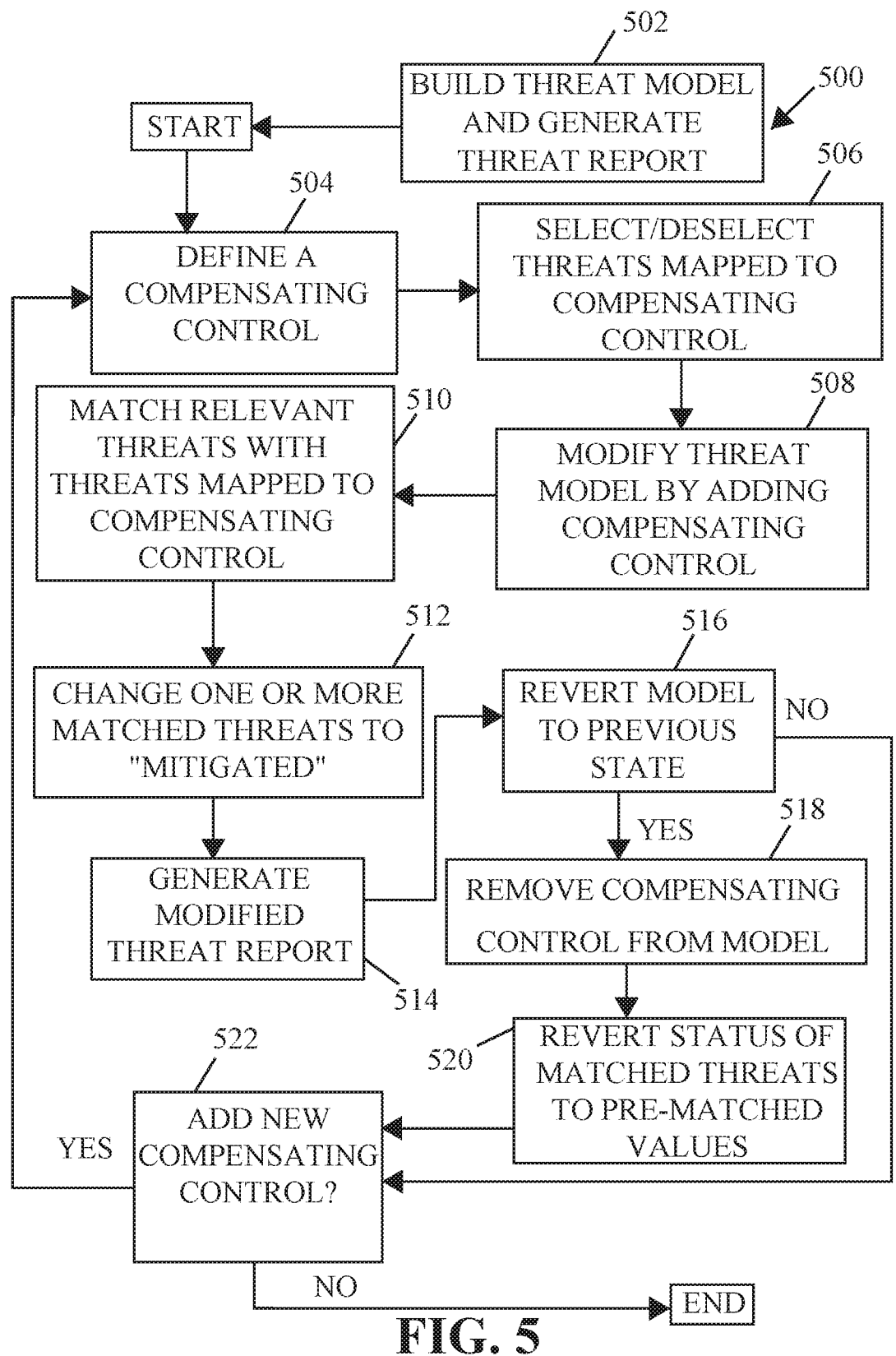
FIG. 5 is a flowchart representatively illustrating an implementation of a threat modeling method.

Referring now to FIG. 5, another implementation of a threat modeling process (process) (method) 500 is representatively illustrated. Method 500 includes cycling through the process of selecting/deselecting a compensating control (i.e., adding it to the threat model, or removing it) as often as the user chooses. After the threat model is initially built and the initial threat report is generated (step 502) the user may define a compensating control (step 504) (this step may also be done before the threat model has been built or the threat report generated). The user may select the threats mapped to the compensating control and/or deselect threats mapped to the compensating control (step 506).

The user may add the compensating control to the threat model and thereby modify the model (step 508). System 100 matches threats identified in the original threat model with those mapped to the selected compensating control (step 510). The user at this point may be able to further modify the threats mapped to the compensating control. The status of every matched threat may be changed to "mitigated" or some other status by the user (step 512). A modified threat report may then be generated (step 514). The user is then brought to a point at which he/she may select whether to revert the model to its previous state (step 516). If the user selects to not revert the model, the process skips to step 522, otherwise the compensating control is removed from the model (step 518) and the status of matched threats are reverted to their pre-matched values (step 520). The user then determines whether to add another compensating control (step 522) and if so the process cycles to step 504 again, otherwise the process ends.

Reference will now be made to several example user interfaces which may be utilized to accomplish the above general processes and other processes as will be described. It should be stressed that these are only examples, and that other user interfaces could be used to accomplish the methods. Similarly, although specific user interfaces are described with respect to specific functionalities (dropdown menus, buttons, fields, tags, text prediction, etc.), the practitioner of ordinary skill in the art will be able to mix and match these functionalities and/or use other functionalities with the user interfaces to make the user experience intuitive and easy. For example, in instances where a dropdown menu is present this could be replaced by a search field, or a radio button selection, and so forth. Nevertheless, the user interface implementations as depicted in the drawings are useful for a variety of reasons, as will be understood.

Figure 6:
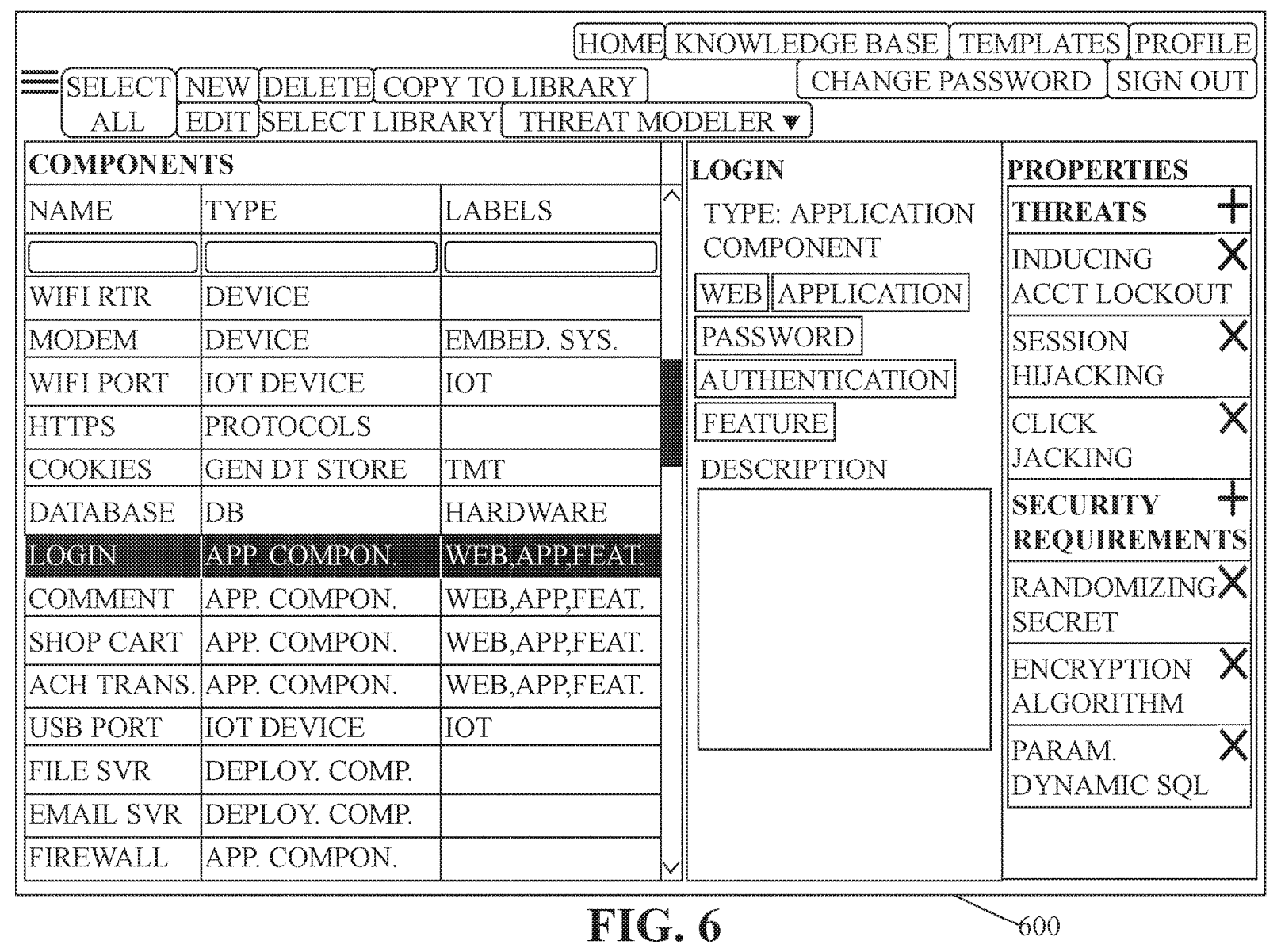

Referring now to FIG. 6, a representative example of a user interface (interface) 600 is shown. This interface is titled the "knowledge base" page and may be displayed on any of the displays of system 100 shown in FIG. 1, depending on the particular system setup. Interface 600 has a number of selectors or menu items near the top of the screen such as, by non-limiting example, a three-bar menu selector, a "select all" selector, a "new" selector, an "edit" selector, a "delete" selector, a "copy to library" selector, a "select library" dropdown selector, a "home" selector, a "knowledge base" selector, a "templates" selector, a "profile" selector, a "change password" selector, and a "sign out" selector. In implementations some of these selectors may be further organized into dropdowns so as to take up less space on the interface. Additionally, in implementations of system 100 some or all of the menu items may be present on other interfaces, such that they are permanent menu items at the top of those other interfaces as the user navigates from one interface/page to another.

This "knowledge base" interface is an interface where the user may view and edit "components" that are stored in the database. The title "components" is thus present at the left near the top of the screen, and below this are three columns for "name," "type," and "labels." Below the column titles are search boxes where a user may begin typing and predictive text will bring up a list of items that begin with the letters typed so far. Each row shows one component type, name, and labels (if any). The list is scrollable as indicated by the scroll bar, and only a small number of components are listed here. For example, the topmost item is a WiFi router (named WIFI RTR in shorthand, and this and any other text used in the system may be in some type of shorthand or may be spelled out in its entirety in various implementations), its type is "Device," and no labels are applied. Shown in FIG. 6 are the following types: device, IoT device (which represents "internet of things" device), communication protocols (such as HTTPS), generic data store, database, application component, and deployment component. Other available types not shown may include, by non-limiting example: cloud, external system, FTP server, generic external interactor, generic process, generic trust boundary, Modbus, perimeter control, third party software, third party library, transaction, WINDOWS application, WINDOWS OS, and so forth. These are only representative examples, and the user may define new types as desired and apply those types to a new component (or existing component), which will associate the type with the component name through the database. The rows may be organized in alphabetical order by any of the columns (name, type, labels) by clicking on the title of the column and may be organized in reverse alphabetical order by again clicking on the same column header (and toggled with continued clicking). The labels column may be useful for, among other things, searching for components that have a label applied. For example, if the user is looking for embedded system components, the user may search in the labels column for "embedded system" (or a shortened version if the system uses a shortened version) to find all components that have the embedded system tag applied.

A user may select any row by clicking anywhere in that row. The selected row will be highlighted, as representatively illustrated in FIG. 6 wherein the "login" row is highlighted. Once a row is highlighted any data associated with the component through the database is shown to the right. For example, in the middle of the screen the component name "login" and its type "application component" are shown. Below this the tags applied to this component are shown, which in this case include: web, application, feature, authentication, password. A description can be associated with the component through the database—in this case no description has been provided. If a user desires to edit the name, type, labels, or description the above "edit" selector may be selected and the user will be able to input new information for any of these fields, which upon pressing a "cancel" button will revert to the prior data or upon pressing a "save" button will write the new data to the database.

Interface 600 also shows a "properties" section to the right, which shows the threats and security requirements associated with this component through the database. The user may press the plus icons to add new threats or security requirements, as desired, or may use the "X" icons to remove threats and/or security requirements associated with the component through the database. In this example the login component has the following threats associated with it: inducing account lockout; session hijacking; and clickjacking. The security requirements associated with the component in this example are: parameterized queries—dynamic SQL; breach—randomizing secrets per request; and encryption algorithm (the first two only show a short description on the interface screen for ease of viewing).

The threats and security requirements associated with the component through the database will at least partially facilitate the later threat modeling when a user is depicting a specific system layout. For example, if a user is depicting a computer system layout and adds the "login" component to the system layout then one or more or all of the associated threats may become "relevant threats" to the overall system as previously described. In some systems 100 all the threats associated with this element would become "relevant threats" to the specific application, process, or system being modeled, and in other systems 100 some of these threats may be automatically dropped from "relevant threats" for the specific application, process or system being modeled if other components added to the system would inherently mitigate those threats (such as an HTTPS protocol instead of HTTP protocol being used between two components).

With regards to the other selectors, a user may select the "select all" option to select all components then listed (if the user has done a search this would limit to selecting all those components populated by the search), and the user may then press the delete selector to delete all of these components and their relationships (associated threats, security requirements, tags, descriptions, etc.) from the database. The user may instead, once all are selected, press the "copy to library" selector to copy the selected items to a default library set up by the user previously through another interface. The user may similarly select only one or a few components to delete or copy to the default library. The "select library" selector allows a user to display various libraries, here the "ThreatModeler" library is displayed but the user may create his/her own libraries, may view other built-in libraries or third party libraries accessible through the interface through a web server or other server which communicates with another third party database, and so forth.

The user may select the "new" icon to bring up a popup interface in which the user may define a new component, giving it a name, selecting the component type from a dropdown menu, adding an image to be displayed to represent the component (such as a lock for a security feature, a USB indicator for a USB device, etc.), and giving the component labels and a description, and may then select a "cancel" selector to cancel the new component or may select a "save" selector to write the new component information and relationships to the database, and selecting either save or cancel will also remove the popup interface and revert back to interface 600.

The home menu item at the top right of the screen will navigate the user to a home screen. The knowledge base icon will navigate to interface 600. The templates selector navigates to an interface similar to interface 1000 of FIG. 10 (hereinafter described) but with a blank canvas 1002 for creating a new template which may be used later for creating other relational diagrams (diagrams) 1004 (also described hereafter). The profile selector brings up a popup window which displays the current user's name, email, department, role (admin, etc.), and last login date/time as stored in the database, and a close button to close the window. The change password selector brings up a popup window to change the user's password with a "close" selector to cancel the change and a "save" selector to write the new data to the database. In implementations the home, templates, and knowledge base icons are permanently displayed at the top of all interfaces of system 100 and the profile, change password, and sign out selectors are available from a dropdown icon which is also displayed at the top of all interfaces of system 100. The sign out selector allows the user to log out of the system. Interface 600, as well as other interfaces of the system, may also include a refresh selector to refresh the page and a help icon to bring up a help menu. An icon displaying a title and/or logo of the software may also be displayed at the top of the screen (such as the top left) which when selected may navigate to the home screen.

Figure 7:
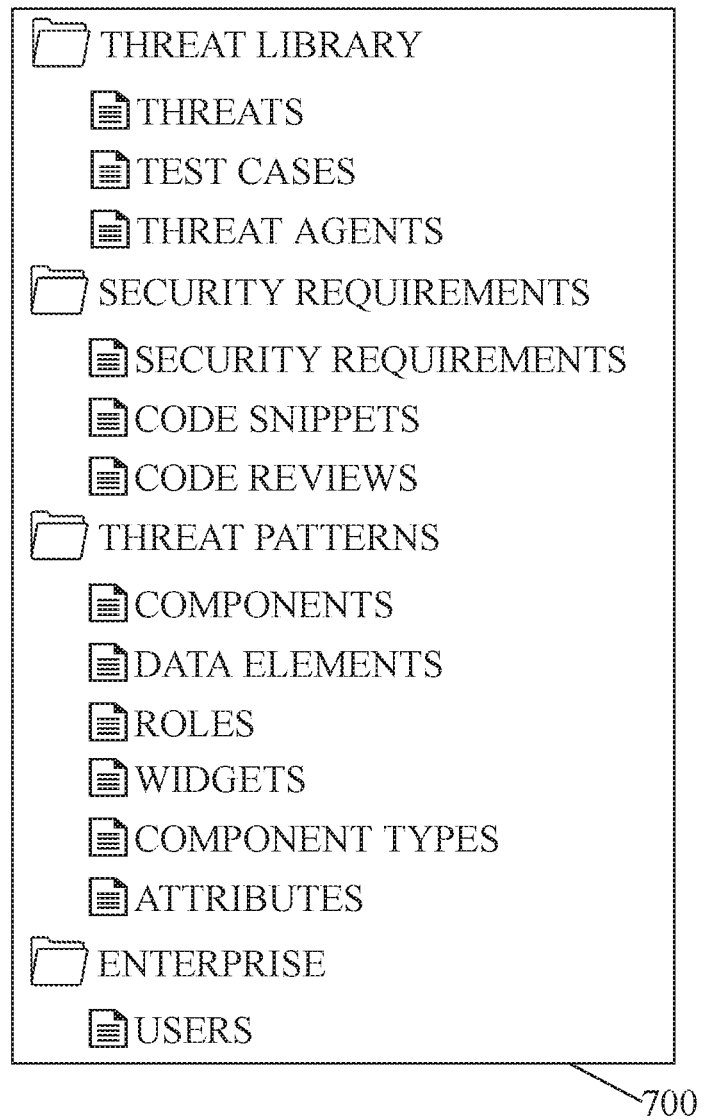
FIG. 7 is an implementation of an interface of the system of FIG. 1.

When the triple-bar menu icon is selected it brings up a popup expandable menu which, when all items are fully expanded, appears as interface 700 of FIG. 7. The "threat library" menu item includes the sub-menu items "threats," "test cases," and "threat agents," the "security requirements" menu item includes the sub-menu items shown, the "threat patterns" menu item includes the sub-menu items shown, and the "enterprise" menu item includes the sub-menu item "users." When any of the sub-menu items are selected an interface very similar to interface 600 is displayed.

For example, FIG. 8 shows interface 800 which is accessed by selecting the "threats" sub-menu item. The title "threats" is shown near the top of a list of threats which are organized into rows and columns showing each threat's name, risk level, and attached labels. Several threats are shown, and any column may be searched using the search box directly below the name, risk, or labels headers, which behaves similarly as described for FIG. 6, and the data may be organized alphabetically (or reverse alphabetically) by any column as described with respect to interface 600. The selected threat is highlighted, and its information is displayed to the right including the name, risk level, labels, and a description, which in this case includes a URL. The properties section includes threat agents which may be added, though none are added to this threat—but examples include things like "insider," "black hat," "hacktivist," "cyber terrorists," "authorized external user," and so forth which are threat agents that had previously been identified by the user. Threat agents may be added and removed. Test cases may also be added and removed; this threat has three test cases added which were previously entered into the database by the user. Security requirements may also be added by the user and, in this way, compensating controls may be associated with specific threats through the database—this is one of the ways the system facilitates step 506 of FIG. 5. Security requirements may be added to the database originally through another interface, described hereafter, and identified there as a compensating control, then added to a specific threat from interface 800. Such an association through the database facilitates the system displaying various compensating controls in a diagrammed system, method or application and the threats those compensating controls can mitigate.

The menu items at the top of FIG. 8 are the same commands/links as those shown in FIG. 6 but are shown here in icon format to give another representative example, where the select all selector is represented by a checkmark, the new selector is represented by a plus icon, the edit selector is represented by a pencil icon, the delete selector is represented by an "X" icon, the copy to library selector is represented by an icon of two documents, the home selector is represented by a home icon, the knowledge base selector is represented by a file folder icon, the templates selector is represented by a document icon, and the profile, change password, and sign out selectors are available by selecting a dropdown menu represented by a downward facing triangle icon.

Referring back to FIG. 7, if the "test cases" sub-menu item is selected an interface similar to interfaces 600/800 is displayed, but showing test cases, and allowing the user to add, edit, delete, copy, add labels, and so forth, similarly as previously described with respect to the "threats" sub-menu item. The threat agents, security requirements, code snippets, code reviews, components (already described with respect to interface 600 since the components interface is set as the default interface when the "knowledge base" selector is selected), data elements, roles, widgets, component types, attributes, and user sub-menu items all have similar functionality and bring up similar interfaces when selected. Data elements, which represent data elements that may be captured by any diagrammed system, application or process (such as credit card numbers, billing addresses, pins, phone numbers, email addresses, order history, birth date, medical history, insurance history, and so forth) may be associated with specific threats and with specific security requirements in the same way as those associations may be made for components.

If a user selects the security requirements sub-menu item an interface similar to interfaces 600/800 will be shown similar to interface 900 of FIG. 9, which allows the user to order security requirements alphabetically (or reverse) by name or label and search for specific security requirements. Selecting any security requirement will highlight it and display its name, description, labels, an indicator to indicate whether the security requirement is a compensating control, and any code snippets or code reviews (under a "properties" header) that have been associated with the security requirement (which may be added or removed from that interface similar to what is described with respect to the "properties" elements of interfaces 600/800).

Interface 900 is actually the interface visible when the user selects the "new" selector to create a new security requirement. From this window the user may add a name, add a description, check a box (or leave it blank) to indicate whether the security requirement is a compensating control, add any labels (which are previously input into the database by the user), and press cancel to abort the addition or press save to write the data to the database.

From any of the previously mentioned interfaces, if the user presses the home selector an interface similar to interface 1300 of FIG. 13 will be displayed, which lists all previously stored threat models by name and shows their version. Either column may be organized alphabetically or in reverse, and the PDF button will export the list to PDF. If any specific threat model is selected it will be highlighted and its associated threat report (threat report interface) 1302 will be displayed, which will be discussed hereafter. From the top menu items the user may select the new selector to create a new threat model, the edit selector to edit the name, version, risk level, an "internal" toggle, and labels associated with the selected threat model, a delete selector to delete the selected threat model, a diagram selector to view the diagram for the selected threat model, a report selector to export to PDF the threat report (which shows for each threat the threat name, source, risk level, status, and creation date), a threat tree selector to view a diagrammed threat tree, showing threats of the threat model, and other selectors already described.

If the threat tree selector is selected a threat tree is displayed in which threats are organized as sub-elements of data elements and/or components, and also displayed are mitigating security requirements or compensating controls that may be implemented to mitigate the threats and an indicator of whether each threat has been mitigated. Portions of the tree may be collapsed, expanded, or viewed in vertical tree or horizontal tree format. The interface showing the tree diagram has selectors to zoom in, zoom out, revert to 100% zoom, toggle on/off a thumbnail overview image in a corner of the display, save an image of the tree, open a legends window which shows the colors in which various elements are diagrammed (threat agent, widget, component, role, data element, security requirement, threat, protocol, node, and project), and a filter selector which allows the user to remove and add back in any of the aforementioned items from the tree. The tree may be dragged and moved in any direction for viewing any portion of it easier.

Continuing with FIG. 13, if the new selector is selected (which, as with all other selectors, could be implemented as an icon or logo absent any wording), a popup window appears allowing the user to enter a name, version, toggle an "internal" indicator, select a risk level from a dropdown (from among previously determined risk levels stored in the database), apply labels (which allow the user to type and populate a list of already entered labels stored in the database to select one, or to add a new label by typing a new item and selecting "add new"), or the user may select a "new from template" button to begin a new diagram from an existing diagram template, or a "new from features" button to begin a new diagram from user-selected features, or the user may select "import" to begin a diagram from a previously stored diagram (such as from an older version of the software), or the user may select "empty" to begin a diagram with a blank canvas.

Figure 15:
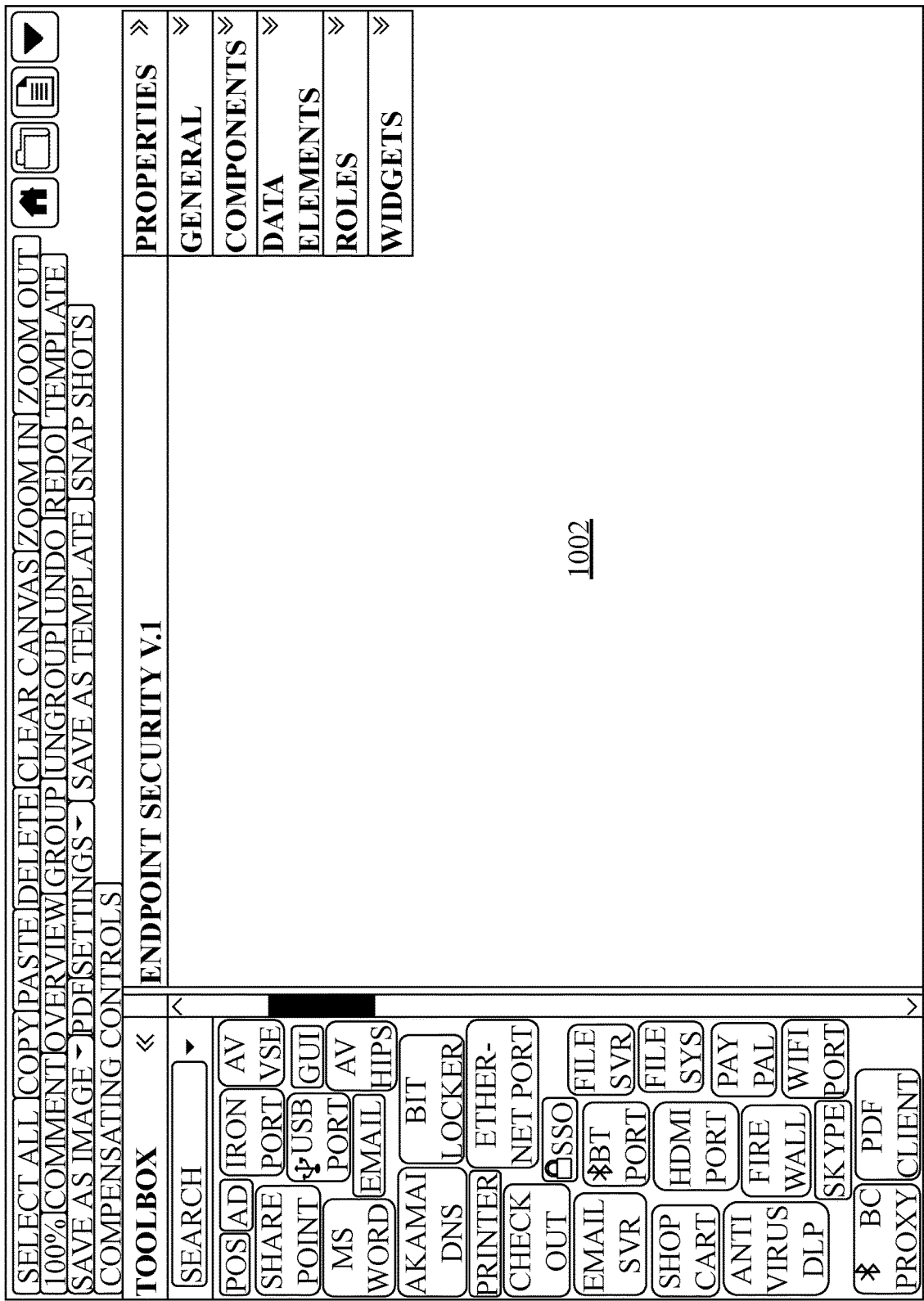
FIG. 15 is an implementation of an interface of the system of FIG. 1.

If the user selects "new from features" the diagram interface of FIG. 15 displays with a blank canvas 1002, and a popup selector (not shown) allowing the user to select "business requirement" features which are desired to be included in the model such as, by non-limiting example, authentication, funds transfer, credit verification, bill pay, or other features already stored in the database previously by the user, and after selecting the desired features, the blank canvas will populate with a node for each feature. The user can then modify and/or add components to the diagram as desired. In implementations each of these added "business requirements" will add a "component group" to the diagram and threat model, as will be described hereafter.

If the user selects "empty" the diagram interface (interface) 1000 of FIG. 15 will appear, showing the blank canvas 1002 as shown. To the left of the canvas is a toolbox module which may be minimized using the left facing double arrows and re-expanded by selecting the same arrows which will then be right facing. To the right of the canvas is a properties module which also may be minimized and expanded in similar fashion, along with sub-menu items "general," "components," "data elements," "roles," and "widgets" each of which may be expanded downward or minimized upward using the double arrows (in FIG. 15 they are all minimized).

The toolbox module is searchable, with the user able to begin typing and the system suggesting through a list populated just below the search box components which begin with the letters (or include the letters) typed by the user. The dropdown to the right of the search box may be used to allow the user to search from among all components (or a subset such as one or more specific component libraries as previously discussed, with ThreatModeler being an example component library) and/or one or more specific component types as stored in the database (and previously discussed with respect to FIG. 6). The user may also scroll down through the components using the scrollbar function.

Figure 10:
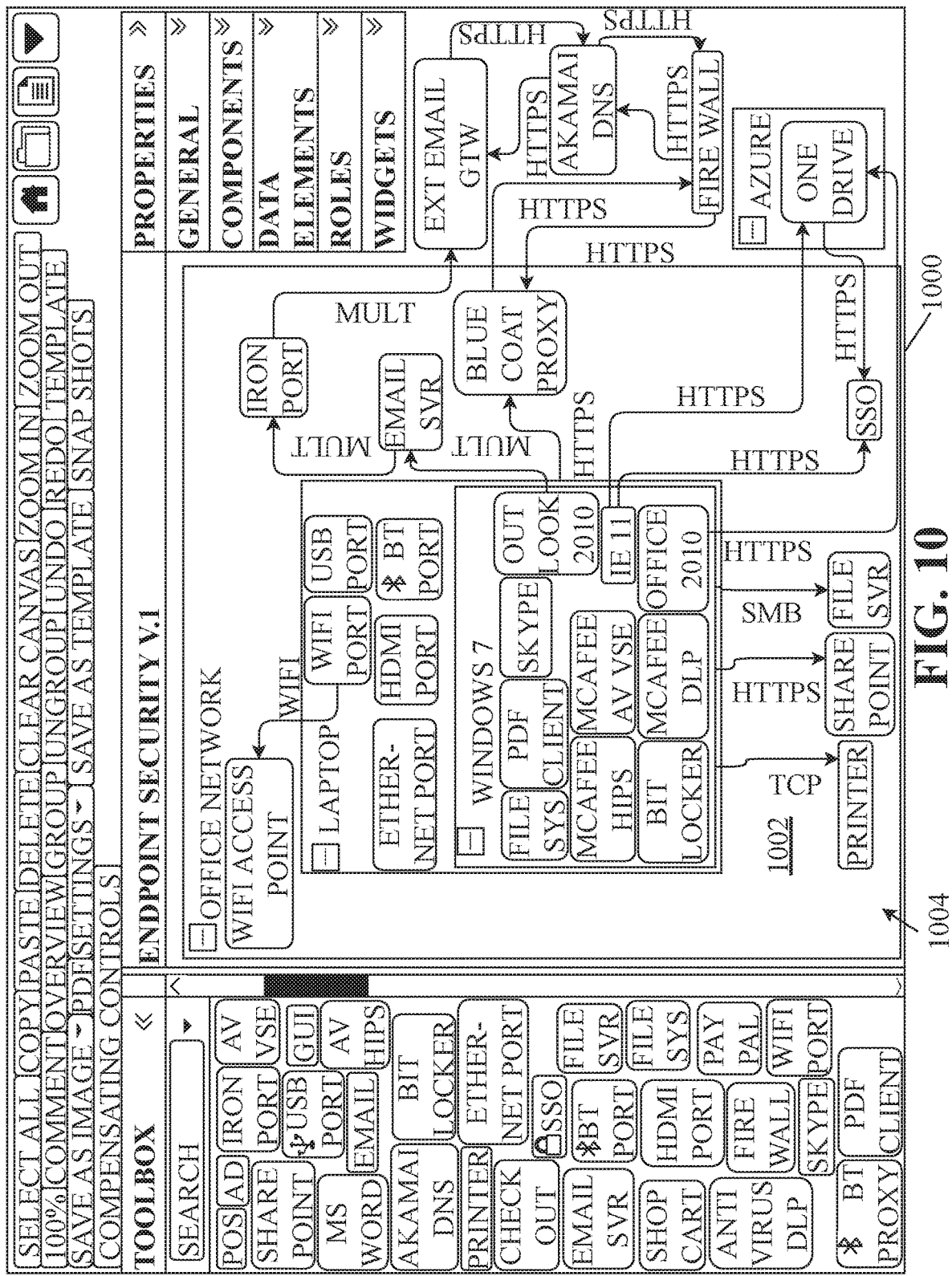
FIG. 10 is an implementation of an interface of the system of FIG. 1.

In the example of FIG. 10 the components in the toolbox are of varying sizes, but in implementations they may all be of similar sizes and shapes (or identical sizes and shapes). In implementations in which the system is deployed within a single organization with only a local library of components the components listed in the toolbox will be those that have been input by the user or that were previously loaded into the database during software installation. In implementations in which the system includes some remote communication with other libraries the toolbox may display components available from other parties, such as through cloud computing services, e.g., MICROSOFT AZURE or the like (in implementations the entire system and methods could be implemented using cloud computing in instances where a local software installation or local database are not desired).

The toolbox, as can be seen, includes components that were previously entered into the database through interface 600 as previously described. From interface 1000 the user may select a desired component and drag it to a desired location on the canvas, and by dragging multiple items the user may begin to add the components of a system, application or process to be modeled. By non-limiting example, FIG. 10 shows interface 10 with a relational diagram (diagram) 1004 already fully created by the user. As can be seen, the user has dragged multiple components onto the canvas 1002 and has defined various relationships between them. The user dragging components to the canvas is one way in which the user selects relevant components or relevant sources as described with respect to FIG. 2, and it is from these relevant components (relevant sources) that the system identifies relevant threats by identifying the threats that are associated through the database with those components.

In implementations a communication protocol (protocol) can be defined between components by clicking on a component and dragging the cursor to a second component. This will create an arrow, such as those shown on FIG. 10 between components on the canvas, and will display a default protocol (here the default protocol is HTTPS), but a user may right click the arrow to display a popup selector allowing the user to deselect HTTPS and/or select one or more other protocols (such as TCP, SMB, WiFi, 3G, 4G, AJAX, binary, BLUETOOTH, FTP, FTPS, HTTP, IMAP, MAPIRPC, SMTP, SMTPS, USB, etc.), and when any protocol is selected that protocol name will be displayed (or if multiple are selected then "multiple" or some term/icon meaning "multiple" will be displayed—in the image this is shown as "MULT" for short)—these protocol arrows will also be color coded by type (such as green for HTTPS, red for multiple, and so forth). Protocol arrows may also be deleted as desired. The alphanumeric descriptions are shown here next to the link arrows, but in implementations the wording may be superimposed over the link arrows. They are shown here next to the arrows for easier readability.

The components displayed in the toolbox of FIG. 10 are generally shown without icons. The USB Port, SSO (single sign on), BLUETOOTH PORT, and BLUETOOTH PROXY components are shown with icons as an example that all components may be shown in the toolbox with an icon if desired. It may also be seen that the user may input components that constitute branded software elements, such as PAY PAL, AKAMAI DNS, SKYPE, etc. In implementations all compensating controls will be displayed in the toolbox with a similar icon, such as the padlock icon shown for the SSO component of FIG. 10.

As a user adds components and links them together, the threat model includes the threats that are associated with the components/protocols. As previously described, each component, each protocol, and each data element may be directly associated with one or more threats through the database. Accordingly, each time a component is added to the diagram, or a new link is drawn between components and a protocol is selected, if there are any threats associated through the database with the component and/or protocol those threats are then included in the threat model. A user may at any time right click on a blank area of the canvas when no component/link is selected and a "threat report" item will be selectable which, when clicked, will generate a popup threat report which will include a list of all threats. In implementations this will look much like the threat report 1302 shown in FIG. 13, and will include a first "threats" tab list of all threats (and the number of threats), identifying the risk level of each threat, showing the threat status (open/mitigated), identifying the source of the threat (which is a component on the diagram), and having an actions column from which the user may display a description of the threat (previously associated with the threat through the database) (the description selector here shown with the letter "D" though the selector could instead show "description" or the like) and leave a comment to store to the database (the comment selector having the phrase "note" though in other implementations it could say "notes" or "comment" or the like). The user may organize the table by any column (alphabetically or reverse) and may also organize by column headers by dragging the column headers to the location indicated. For example, the user could drag the "status" header to the identified location and then drag the "risk" header to the right of it and the table would then be organized first by status and then by risk level. When this "dragging" is done a "ghost header" is dragged up to the identified location in the sense that the existing header remains in place. The organization may be reverted to an earlier state by deleting the ghost headers using an "x" icon.

The threat report displayed also includes a security requirement tab (showing number of security requirements) and displaying a table similar to the threats table. The security requirements table lists the security requirements that are associated with one or more of the identified threats in one column, lists a source in another column (which is the component associated with the threat), includes an "implemented" column indicating whether the security requirement has been implemented, an "optional" column indicating whether the security requirement is optional, and an "actions" column similar to the previously described actions column, this time the description giving a description of the security requirement and allowing the user to record a written note. This table may be organized similar to the previously described table.

With respect to the "implemented" column, in implementations this is a checkbox for each security requirement indicating whether the security requirement has been implemented. The user may manually check those security requirements that have been implemented and manually uncheck those that have not. This column may also have been previously populated with some "implemented" checkmarks based on mitigations that the user has selected for specific compensating controls, which will be discussed later with respect to FIG. 11. Further, the "optional" column may also include checkboxes which a user may manually toggle to indicate which security requirements are optional or not. This column also may be populated by the user selecting certain mitigations as will later be discussed with respect to FIG. 11—for example if there are two security requirements associated through the database with a specific threat, but only one needs to be implemented, then if the user selects one of those security measures as mitigating the threat the other security measure may populate on this list as being checked "optional."

The threat report further includes a "test cases" tab (showing the number of test cases) and displays a table listing test cases associated with the threats through the database. As previously described with respect to FIG. 8, each threat may have test cases associated with it. An example test case would be, for example, a "dictionary-based password attack" for a password-related threat. The test case tab would list this test case and have an "actions" column which, when an icon is selected, pops up a description, which in this case states "use a password cracking tool that will leverage the dictionary to feed passwords to the system and see if they work" and further lists techniques like setting the test to try all words in the dictionary, common misspellings, and combinations of words and common misspellings of combinations. The test case tab/table thus offers tests that the user may try to test against the threats both before and after security requirements are implemented. This table may be organized and sorted similar to the previously described tables.

The threat report further includes a "code reviews" tab (showing the number of code reviews) and displays a table listing the code reviews that are associated with the security requirements through the database (as previously shown with respect to FIG. 9). An example code review would be, for example, an "Authentication: Weak Password" code review. The code review table would list this code review and have an "actions" column which, when an icon is selected, pops up a description, which in this case states "Password strength should be enforced upon a user setting/ selecting one's password" and gives examples of code that may be used to set up such an enforcement. The code review tab thus offers sample code that the user may use to implement measures against threats which may complement or work together with implemented security requirements. This table may be organized and sorted similar to the previously described tables.

Multiple selectors are shown at the top of interface 1000 in addition to the permanent selectors that are available on several interfaces. The "select all" selector selects all components on the canvas (the user may then deselect some, if desired, for example for grouping some or all the components as later described). The "copy" selector copies selected components and the "paste" selector pastes the copy onto the canvas (this may also be done with keyboard shortcuts, and shortcuts may in implementations be used for all other selectors described herein for system 100). The "delete" selector deletes the selected components from the canvas and the "clear canvas" selector deletes all components from the canvas. The "zoom in" and "zoom out" and "100%" zoom in and out of the canvas and revert to a 100% zoom, respectively. The "comment" selector populates an empty comment box on the canvas in which the user may type a comment which will remain on the canvas until later removed (though it may appear in minimized or icon format until hovered over or opened). The "overview" selector displays a thumbnail overview of the entire diagram in a corner of the canvas.

The "undo" selector undoes the last action (or multiple last actions if selected multiple times) and the "redo" selector does the opposite. The leftmost "templates" selector pops up a menu from which one or more previously saved business requirement "features" may be selected to add to the canvas (these may be nodes and/or component groups, for example, and may be the same nodes/component groups that are described above when the user uses the "new from features" function when generating a new model). The "save as image" selector has a dropdown and allows the user to save an image of the diagram as then displayed in one of various formats such as PNG, SVG, etc., or to take a "snapshot" which saves the diagram at the present state to the database. The "PDF" selector generates a PDF of the threat report based on the current configuration of the diagram components (the threat report described to some extent above). The "settings" dropdown selector allows the user to toggle between straight or curved link lines (protocol lines/arrows), showing or hiding the link wording (in FIG. 10 the lines are curved and the link wording is shown), making the diagram public or non-public, and showing or hiding comments (the comment function described above).

The "save as template" selector allows a user to save the entire diagram as either a threat model or a business requirement "feature" (in other words saving it as a component group) and in either case the user may give it a name, add labels, and select the type as either threat model or business requirement, then press cancel to cancel or save to store the new template to the database. The "snapshots" selector populates a list of previously saved snapshots, any one of which may be opened from the list or deleted.

The "group" and "ungroup" selectors allow the user to create a group containing multiple components or to delete a group (but not the included components). As seen in FIG. 10 for example, there is a "WINDOWS 7" group which includes file system, PDF client, SKYPE, OUTLOOK 2010, MCAFEE HIPS, MCAFEE AV VSE, IE11, BIT LOCKER, MCAFEE DLP, and OFFICE 2010 components. There is also a Laptop group containing the WINDOWS 7 group and further containing WiFi port, USB port, ethernet port, HDMI port, and BLUETOOTH port components. Finally, there is an Office Network group which includes the Laptop group and also includes file server, SHAREPOINT, printer, WiFi access point, IRONPORT, email server, BLUECOAT proxy, and SSO (single sign on) components. Then there are other components (external email gateway, AKAMAI DNS) which are not part of any group. A group may be formed from any one or more components, and the AZURE group is seen containing only a single component: ONEDRIVE.

When a group is formed the user may, using the right-side "general" dropdown, add a custom display name, select a container type (from container, trust boundary, collection, or some other option stored in the database previously by the user), select a component (for example for the WINDOWS 7 component, the "WINDOWS machine" component is selected, which shows that some components stored in the database may include other components), select other display choices such as title and background/border color, and select a Common Platform Enumeration (CPE) identification from among a list previously stored in the database (for example in this case a CPE ID indicating a version of WINDOWS 7 is selected) (the list of CPE IDs may be searched using filters to easily find the appropriate one), and the user may also add notes.

As further examples, the WINDOWS 7 group is identified as a container group, a WINDOWS machine, and a specific WINDOWS 7 operating system version is identified. The Laptop group shown in FIG. 10 is listed as a container group and no CPE ID is selected. The Office Network group is identified as a trust boundary group type and no CPE ID is selectable. The AZURE group is identified as a trust boundary group type and no CPE ID is selectable.

Each grouping of components, however, could be diagrammed separately as an independent threat model and then saved as a component so that it may be imported into another threat model/diagram. When a user adds any of these component groups to a blank or existing diagram/threat model the threat model of the component group is added to (and/or nested within) the threat model of the existing diagram/threat model. In this way the user can modify a threat model by incorporating previously defined threat models. This ability is generally termed "threat model chaining" herein and is a useful mechanism for allowing a user to diagram complex systems/processes without having to repeatedly build common elements among the systems/processes.

Each component group may thus be redefined as a discrete "component" and may then be included as a single icon in the toolbox menu. By non-limiting example, referring to FIG. 10, the WINDOWS 7 component group could be defined as a component, then the user could, in another diagram (or the same diagram), select and add a WINDOWS 7 component to the diagram to import into the diagram and associated threat model the threats associated with the WINDOWS 7 threat model. The same could be done for the LAPTOP component group. Accordingly, a component group and associated threats added to a diagram may in turn already include other nested/chained threat models therein, so for example if a user defined a laptop component group such as that in FIG. 10 as a "WINDOWS LAPTOP" component then, when a user later adds a WINDOWS LAPTOP element to a diagram/threat model by selecting a WINDOWS LAPTOP component from the toolbox and dragging it onto the diagram, the threats associated with the laptop itself, as well as the nested/chained threats associated with the included WINDOWS 7 threat model, are automatically included in the threat model for the then displayed diagram.

Referring back to FIG. 10, the "compensating controls" selector may be selected to display a popup similar to compensating control report (report) 1200 of FIG. 12. This report is populated from previous relations stored in the relational database. As indicated previously with respect to FIG. 6, each component may be associated with one or more threats and one or more security requirements through the database using interface 600, and as described with respect to FIG. 8 each threat may be associated with one or more security requirements through the database. As further indicated with respect to FIG. 9, each security requirement may be identified through the database as a compensating control. Accordingly, based on these relationships and selections the list populated in FIG. 12 shows all possible compensating controls that could be implemented to mitigate threats that are present in the diagrammed system, application or process.

By non-limiting example, the threat of "physical theft" is associated with the component "laptop" through the database, but no security requirements are directly associated with the laptop component. Nevertheless, the "physical theft" threat is associated with the security requirements "MCAFEE FRP" and "BITLOCKER" through the database, both of which security requirements are identified through the database as compensating controls (MCAFEE FRP being a USB encryption tool and BITLOCKER being a disk encryption tool). Accordingly, when a user adds the laptop component to a diagram, if the user selects the "compensating controls" selector this list will then include both MCAFEE FRP and BITLOCKER as compensating controls for the physical theft threat. If the user removes the laptop component from the diagram (deletes it) then the MCAFEE FRP and BITLOCKER compensating controls will no longer appear in the list (unless they are also associated as compensating controls for some other threat present in the diagram). In implementations the list populated will also show compensating controls which are directly associated with a component that is added to the diagram. In other words, in the above example there are no security requirements directly associated with the laptop component, but if a third security requirement were directly associated with the component through interface 600, and if the third security requirement was identified through the database as a compensating control, then that third compensating control would also populate in the list of interface 1200.

Referring again to FIG. 10, it may be seen that this diagram includes the MCAFEE DLP, BITLOCKER, MCAFEE HIPS, and MCAFEE AV VSE components grouped in the WINDOWS 7 group. The user may, for example have modeled the WINDOWS 7 group, then used the compensating controls selector at the top of interface 1000 to identify that there are certain threats that these components would mitigate. The user may then add those components to the WINDOWS 7 group by dragging them from the toolbox to a location within the group outline to add them to that group. Then, upon right clicking on any specific security requirement component, the user may select a "mitigations" selector which pops up mitigations interface (interface) 1100 as shown in FIG. 11. The user could add one of these components at a time and model the mitigations, generate a new threat report, then either remove that component or add another compensating control, and in this way test out various compensating controls. This is one way in which the system facilitates steps 512, 514, 516, 518, 520, and 522, among other steps, of FIG. 5.

Interface 1100 displays a table which lists all threats and their associated sources (components associated with the threat), risk levels, and status, and highlights the listed threats which the security requirement is configured to mitigate as identified previously through the database through interface 800 (these threats are "mitigatable" by the selected security requirement). The user may deselect highlighted threats and/or may highlight other threats, then may select "close" to cancel or may select "mitigate" to toggle those threats to mitigated through the database. Once this is done, for example, the threat report as seen in FIG. 13 (or popup shown from the diagram interface) will list the mitigated threats as "mitigated" and the compensating controls list shown in FIG. 12 will also show the mitigated threats as mitigated.

The threat report of FIG. 13 allows a user to manually change the risk level and threat status directly from the home menu using the "change risk" and "change threat status" dropdowns once a threat is selected by clicking on any row. Changing the risk level of a threat from this interface will only change the risk level for this specific threat model. Threat statuses that may be used include, by non-limiting examples: open, closed, mitigated, fixed, not applicable, needs more details, not tested, secure usage practice, and so forth.

The systems and methods described herein may also be used for analyzing an attack surface of a complex system or process, which will be described now. In implementations the attack surface of a system or process is comprised of the sum of all open and unmitigated potential threats to an "asset" identified through threat modeling.

As described herein, a modeled system or process may include a modeled deployed or contemplated computing network, which could include by non-limiting example: one or more applications; one or more on-premises infrastructures; one or more cloud-based infrastructures; one or more hybrid infrastructures; serverless architectures; microservices; one or more embedded devices; one or more IoT devices; one or more mobile devices; one or more Industrial Control Systems (ICS); one or more cyber-physical systems (CPS); one or more third party systems; one or more organizational networks or intranets; non-cyber elements interacting with a cyber system such as, by non-limiting example tangible assets, intangible assets, property(ies), plant(s), equipment, liquid assets, brands, reputation, residential structures, real property, utility services, unattached removable items and assets; an infrastructure system, such as a transportation infrastructure, an electrical grid, a telecommunications network, and so forth, all in implementations accessible and utilized through a highly interconnected network of intranets, wireless networks, and the Internet.

All such components of a modeled process or system may include potential threats which, if discovered and exploited by an adversary, may yield one or more attack vectors to one or more assets of the system or process. The "asset" may be any item selected by a user to be identified as an asset. The modeled "attackers" included in any threat model may be actually modeled as a person in implementations, though in other implementations may be simply modeled as an entry point or device included in the process or system which an attacking person may use to cause harm.

It may be pointed out that increased interconnectivity of a computing system with other systems (such as the Internet, third party systems, end user systems, etc.) may increase economic value and efficiency though these may also increase organizational risk due to the increase in adversarial actors and a constantly evolving threat landscape. The threat modeling chaining and attack simulation systems and methods described herein allow organizations to manage threats at a comprehensive organizational level notwithstanding an ever-changing threat landscape.

A modeled "attack" as used herein is a modeled attempt by an adversarial entity to traverse the modeled system or process from an attack surface to one or more assets within the system or process. The routes from all potential attackers to a selected asset are the "attack vectors" or attack paths to that asset.

Figure 14:
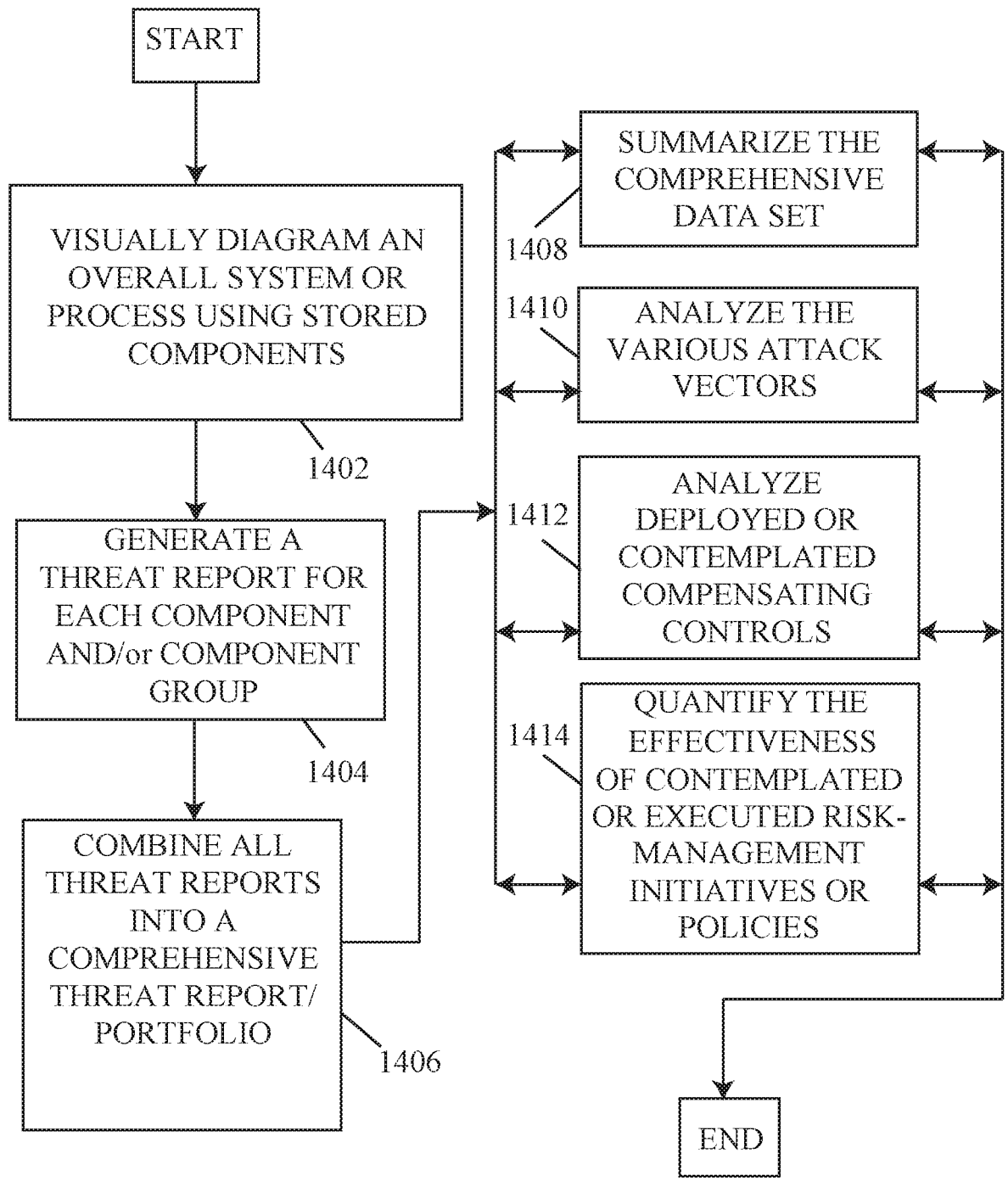
FIG. 14 is a block diagram representatively illustrating an implementation of an attack simulation method.

Referring now to FIG. 14, a block flow diagram illustrates steps that may be included in a general attack surface analysis. Step 1402 includes user generation of a diagram of a system or process, as has been described previously with respect to FIG. 10. Step 1404 includes system generation of a threat report for each component or component group and step 1406 includes system combination of the individual threat reports into a comprehensive threat report for the overall diagrammed system/process (this would include, for example, including threat report elements for nested or chained threat models, as has been explained above), and then steps 1408-1414 include steps which may occur in any order. In step 1408, once a user has selected an asset to analyze, the system summarizes data to show all attack vectors associated with threats which may compromise that asset. At step 1410 the user analyzes the various attack vectors to determine what compensating controls may be included to protect the asset. At step 1412 the user adds or removes compensating controls to/from the diagram and/or toggles compensating controls between ON/OFF states. At step 1414 the user determines the effectiveness of the compensating controls or other risk management methods (such as changing communication protocols, changing the relative location of the asset within the modeled environment, adding non-compensating control elements between the asset and attack locations, and so forth).

Figure 16:
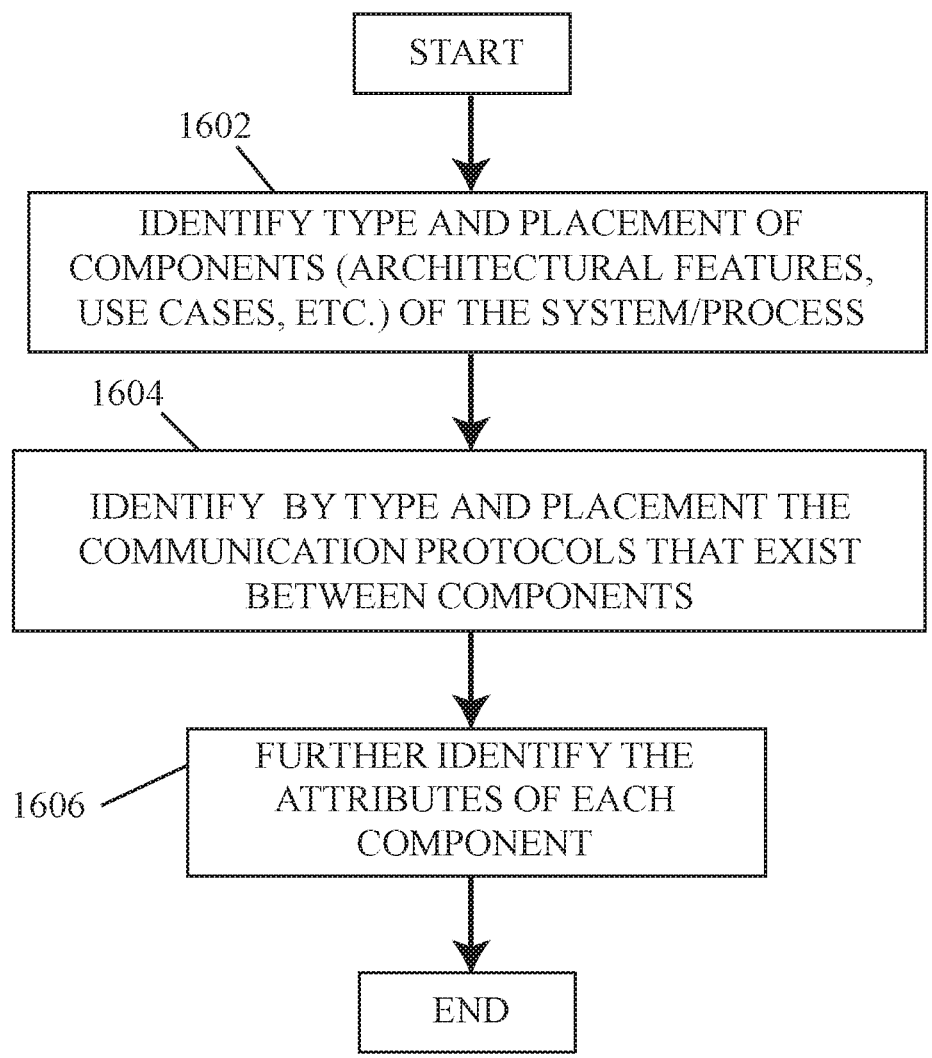
FIG. 16 is a flowchart representatively illustrating an implementation of a threat modeling method.

FIG. 16 further breaks down step 1402. At step 1602 the user identifies the components of the system or process and chooses their relative placement within the diagram, at step 1604 the user identifies the type and placement of any communication protocols between components, and at step 1606 any other attributes of components (including protocols) may be further designated (this step may be excluded in some methods, and these steps may be done in any order in implementations).

Figure 17:
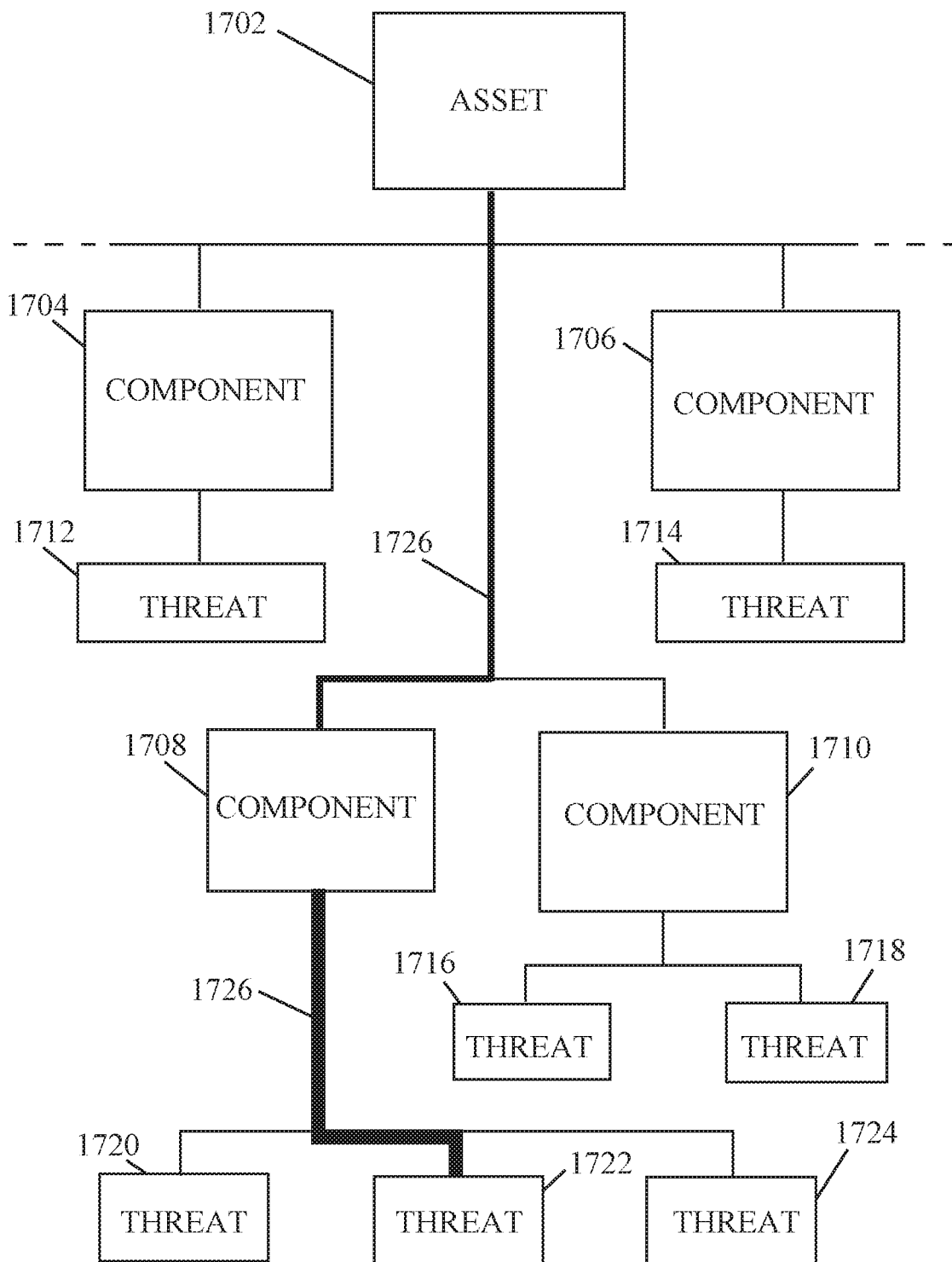
FIG. 17 is an attack tree diagram representatively illustrating an attack path of a threat of a threat model.

FIG. 17 shows a tree diagram that representatively illustrates a method of determining an attack vector for a selected asset. After a system or process is modeled using the diagram interface, described above, then in the diagram interface or in another interface either an asset is selected or an associated component is selected and relevant threat attack paths illustrated. For example, in the topmost node of FIG. 17 an asset 1702 is shown, and the attack tree or threat tree shows that the asset is associated through the database with four components. Components 1704, 1706, 1708, and 1710 are each associated with threats (i.e., the threats that are associated with each component through the database). Accordingly, threats 1712, 1714, 1716, 1718, 1720, 1722, and 1724 are shown. It may be seen that the system then determines that threat 1722, through component 1708, is a threat to asset 1702, and thus attack vector 1726 (shown by lines of heavier weight) is shown between threat 1722 to asset 1702. The diagram of FIG. 17 may be shown on an interface of the system, though in implementations FIG. 17 simply models the method the system is utilizing behind the scenes to show the attack vector(s) in the diagram interface, as in some implementations (such as those shown in the drawings) the threats are not explicitly shown on the diagram interface(s). FIG. 17 shows an attack vector by which an adversarial entity may target the asset, i.e., by exploiting threat 1722 of component 1708. It should be noted that the asset may be a sub-component within a diagrammed component, or it may be an element that is somehow associated with the component (for example the component may be a database, and sensitive client information may be stored within the database—in that instance the asset could be defined broadly as the database, or it could be defined narrowly as the sensitive information within the database, other information in the database not being included in the definition).

It is noted that each asset could have any number of threats that could threaten to compromise it. Accordingly, the system identifies all threats which may compromise the asset in order to visually diagram attack vectors for the user. Some assets may be threatened by only a single threat, some may be threatened by two or three threats, or more, and so forth. Along these same lines, it is pointed out (as has been discussed to some extent above) that each individual component (or grouped set of components) of a threat model could, itself, be associated with its own threat model through the database. Because of this, the overall threat model that is shown (for instance in FIG. 13) in implementations could be called a threat model portfolio as it includes all sub-threat models and nested threat models. For example, an overall threat model A could include components B, C, and D. Component B could be a single component, component C could be a previously modeled group of components having its own threat model, and component D could be a previously modeled group of components having its own threat model that also includes therein a nested threat model for a component group E. Accordingly, the threat model A would include all threat models associated with components and component groups B, C, D, and E, including all nested threat models. As described above, this "threat model chaining" may allow for quick and simple building of process/system models without having to recreate commonly included system/process elements.

In implementations one or more interfaces of system 100 may be utilized to list the top potential threats (such as the top ten potential threats), the top most vulnerable components, the composition of threats by risk type, the composition of threats by status (mitigated, unmitigated, open, etc.), and so forth. The data may of course be organized and displayed in many other ways. In implementations an interface could list each threat, list each threat risk level, and list the source(s) for each threat. In implementations each threat source listing may include a component and an underlying source, so for example one component may be associated with multiple sources of a threat. An example would be an online banking interface which is shown on a diagrammed threat model as a component, and a threat may be a virus being introduced to the bank's environment through a breach in the banking interface, and one source of the threat may be a legitimate user who unwarily exposes the ATM to a virus on his/her computer, and another source of the threat may be an individual hacker seeking to introduce the virus to the banking environment, and another source of the threat may be a state-sponsored entity with high-end mechanisms to seek to introduce the virus to the banking environment.

In implementations an interface of the system may list the most vulnerable components in ascending/descending order, along with the risk level for each listed component, the number of total threats to that component, and the number of open or unmitigated threats for that component. In implementations an interface of the system may list multiple data elements associated with components (for example user names, social security numbers, financial info, credit card numbers, employee ages, etc.) (in this case the component likely being a database housing the data), a data classification for each data element (such as confidential, restricted, public, etc.) and an exposure level for each data element (such as very high, high, low, etc.). In implementations an interface of the system may break down the risk levels by percentage, such as 45% very high risks, 25% high risks, 15% medium risks, and so forth. In implementations an interface of the system may break down risk status by percentage, such as 45% open threats, 25% closed threats, 30% mitigated threats, etc. In implementations an interface of the system may visually illustrate the number of threat introductions plotted versus time, such as the number of threat introductions by month.

Any of the interfaces discussed herein may, as would be expected, change (and in implementations may change dynamically) as edits are made to the diagram (for example when a compensating control is toggled between ON/OFF states, this may change many or all of the interface displays accordingly by varying percentages, mitigating threats, etc. Thus when a compensating control is introduced and/or turned on or off, the threat model, threat report, mitigations interface, compensating control report, and so forth may all change accordingly to reflect the updated configuration.

It is pointed out that any threat model of the system may be subjected to an attack vector analysis. So, for example, an attack vector analysis may be performed on a simple two-component diagram, or an attack vector analysis may be performed on a hundred-component diagram that includes the two-component diagram as a nested sub-threat model.

In implementations an interface of the system may show a display similar to FIG. 17 except mapping all components/assets vulnerable from a single threat. In other implementations an interface of the system may show a display of all threats affecting a single component or asset. In the latter case the visual display may show attack vectors branching outwards from the asset, tracing communication protocols and extending through multiple components as far back as the locations/sources of the underlying threats. This is representatively illustrated in FIG. 18, which shows a type of display that may be shown on an interface of the system.

Figure 18:
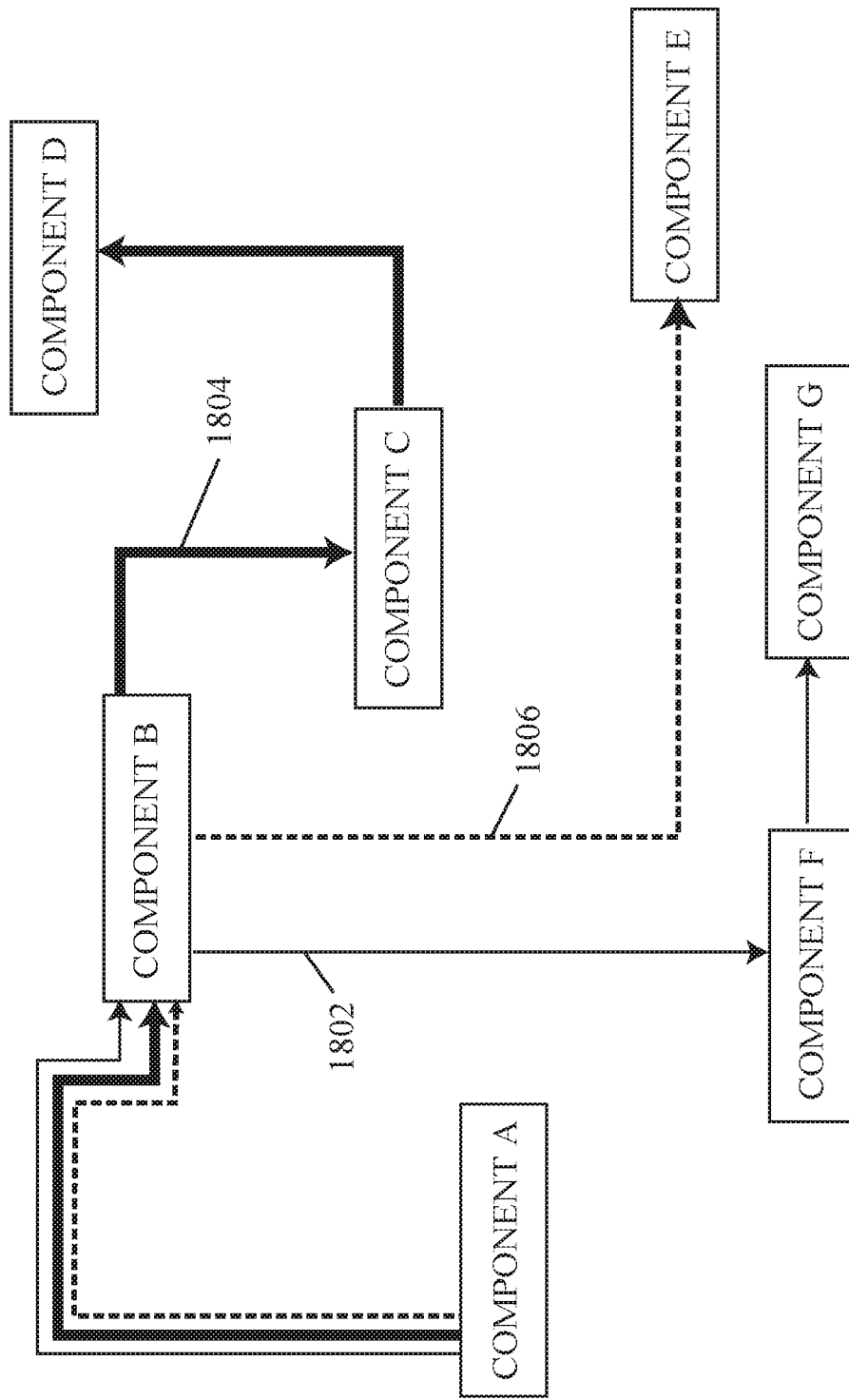
FIG. 18 is a block diagram representatively illustrating attack paths of multiple threats of a threat model.

FIG. 18 shows components A-G. Component A has been selected as an asset, and the attack vectors of all threats threatening the asset (component A) are diagrammed using arrows. The arrows in FIG. 18 are shown in different formats so that they can be distinguished from one another. In other implementations they may all have the same appearance. The arrows are also shown pointing away from the asset, but in other implementations this may be reversed so that arrows point towards the asset from the underlying threats. It may be seen that a threat emanating from component G threatens to compromise component A (or the asset within or associated with component A), the attack vector 1802 passing through component F and component B to reach component A. A threat emanating from component E also threatens to compromise component A, the attack vector 1806 passing through component B to reach component A. A threat emanating from component D also threatens to compromise the asset, the attack vector 1804 passing through component C and component B to reach component A.

Figure 19:
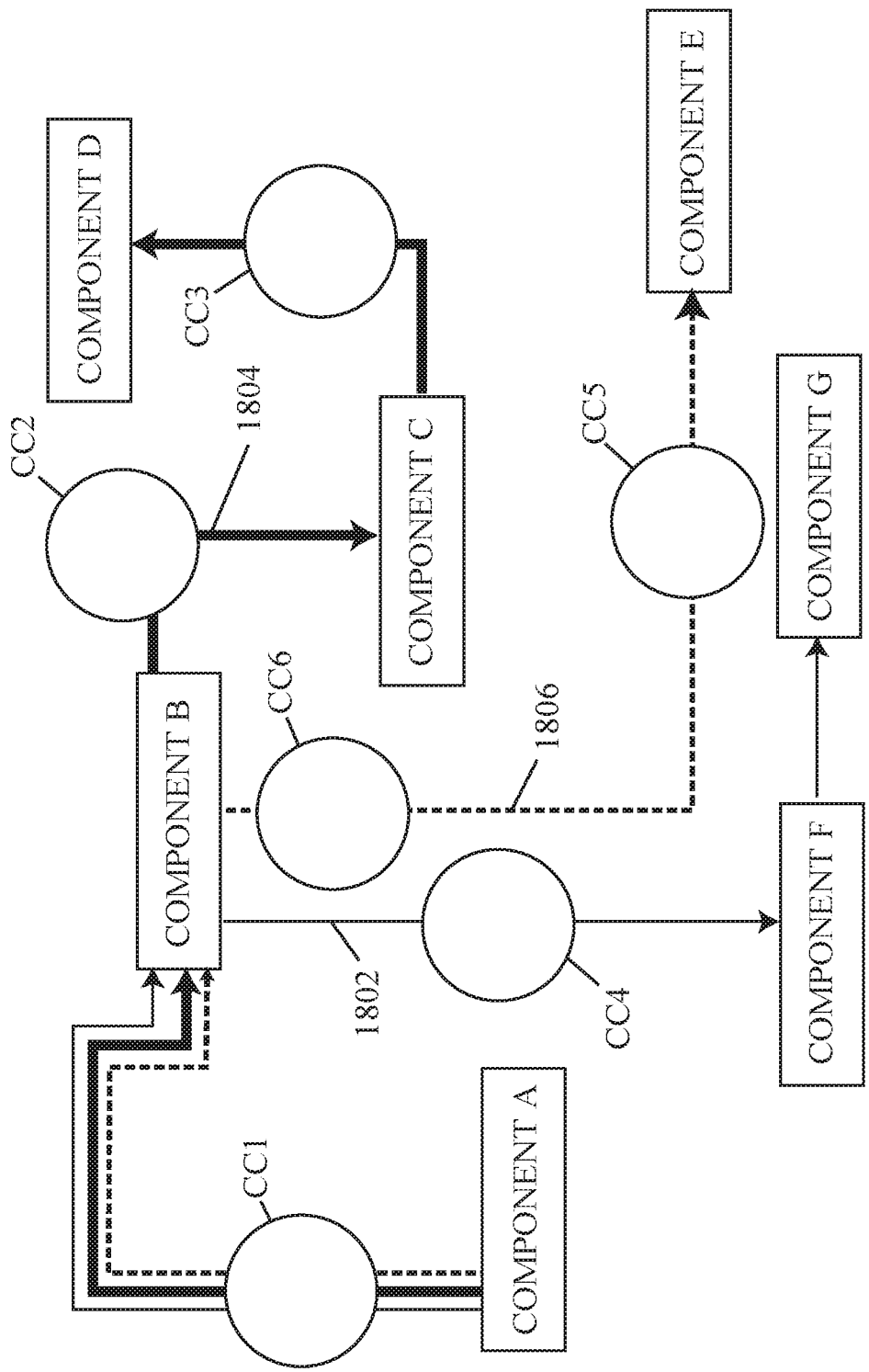
FIG. 19 is the block diagram of FIG. 18 with compensating controls added to the diagram.

The attack vector displays may be modified based on contemplated compensating controls. FIG. 19, for example, shows the diagram of FIG. 18 but modified to include six compensating controls (each labeled "CC"). These compensating controls may mitigate different threats emanating from different components. Compensating control 3 (CC3) may mitigate one or more threats from component D. CC2 may mitigate one or more threats from components C and/or D. CC5 and CC6 may each mitigate one or more threats from component E. CC4 may mitigate one or more threats from components F and/or G. CC1 may mitigate one or more threats from components B, C, D, E, F, and/or G. Using such a modeled attack vector diagram, the user may be able to alter compensating controls and make decisions about where in the system to deploy compensating controls. The user may determine, for example, that CC1 may mitigate many threats more efficiently than several compensating controls deployed elsewhere in the system. Or it may be determined that the asset is better protected by some other combination of compensating controls.

The elimination of any threat of course protects downstream components. Accordingly, for example, if CC3 eliminates or mitigates one threat emanating from component D, then the downstream effects of that threat to components C, B, and A are all mitigated. On the other hand, if CC1 eliminates or mitigates the same threat, it would only eliminate or mitigate the threat for component A, not for components B or C. Accordingly, there are security advantages to having compensating controls further upstream.

Changing the compensating controls in such a diagram could also change the other displays on other interfaces, for example the listing of top threats, listing of top ten most vulnerable components, other top ten listings, composition of threats by risk, composition of threats by status, composition of threats by source, composition of threats by other criteria, the overall threat model, the mitigations interface, the compensating control report, and so forth. This dynamic change of all interfaces allows the user to do "what if" analyses by adding/removing any compensating control and/or toggling any compensating control between ON/OFF states and then seeing how all the aforementioned displays/ reports etc. change accordingly. The change may, for example, illustrate one or more threats as mitigated or closed instead of open or unmitigated, reduce the total number of open or unmitigated threats, reduce exposure levels of data elements, alter the percentages of threats by risk level (very high, high, medium, low, very low, etc.), alter the percentages of threats by status (open, closed, unmitigated, mitigated), or the reverse of all these, on any of the interfaces or reports of the system.

The term "asset" as it is used herein may refer to anything that has value to a user or organization, and therefore requires security measures to protect it from theft, manipulation, destruction, compromise, or other forms of abuse. Attackers are an active population of computer environment users and vary in the skills, toolsets, opportunities, financial backing, and other attributes required for a successful attack on an asset. Most security measures to protect a computer system-related asset may be categorized into one of two categories: (1) defensive and/or monitoring mechanisms to inhibit attacks in progress or mitigate the effects thereafter, and; (2) reducing the number of potential threats through which attacks may be initiated to begin with. The latter can in many cases be less costly overall, and the ability of the systems and methods described herein to test and retest various configurations, including modeling the use of compensating controls, allows users to focus efforts on this method.

In implementations threat modeling and/or attack simulation methods may include the following steps: (1) generally defining a threat model (including model type, outputs to be generated, and overall objectives for different stakeholders); (2) visually diagramming a system/process using database-stored components (including communication protocols and compensating controls); (3) classifying one or more data elements within a component (or associated with a component), and/or one or more components themselves, as assets; (4) identifying and enumerating potential threats to the assets based on the diagrammed components; (5) analyzing the identified threats (threat analysis); (6) identifying and analyzing potential attackers based on the threat analysis; (7) analyzing the effectiveness of deployed or contemplated compensating controls to mitigate the potential threats; (8) analyzing a threat model and attack surface as modified by compensating controls; and (9) measuring and quantifying the effectiveness of the model and/or method relative to the desired outputs and objectives previously determined. This is just one example of steps included in such methods, and other methods may exclude some of these steps, or include other steps, and so forth. In an implementation of the above steps, step (6) interrupts step (5), and in an alternative implementation step (5) is allowed to be completed without interruption. Furthermore, in implementations steps (7) and (8) may be iteratively bounced between during any given implementation, so that a user adds a compensating control then checks the outcome, toggles the configuration of the compensating control then checks the outcome, removes a compensating control then checks the outcome, moves a compensating control to a new location then checks the outcome, etc., before moving to step (9).

Referring to step (1), different stakeholders may have different threat model output needs, so different model types can be built using system 100 and the methods described herein. For example, software application developers, operations teams, embedded system teams, IoT device teams, cloud deployment and architecture teams, ICS system or cyber-related system teams, and so forth, may create different threat model types. Architects may model threats to a residential structure, structural engineers may model threats to occupants, neighborhood planners may model supporting infrastructures needed for developments, and so forth. Home decorators may model occupant flow and so determine the most secure places for expensive home décor. In noncomputing systems/process that are modeled, the protocols may represent things other than communication—for example in the home décor example the protocols may represent methods of moving an occupant between rooms. In implementations a user may select one of many model types to begin with (to populate the proper predefined components with which to diagram the model). This could be selecting, by example, from among examples such as the following: application threat model; operational threat model; cloud threat model; embedded threat model; IoT threat model; cyber-physical system threat model; and so forth. A user may still access all components in the diagram interface by searching for them but selecting the proper model may allow the most relevant components to populate at the top of the list.

Still referring to step (1), a user may in implementations also select role-based threat model outputs (such as with yes/no selectors) such as: secure coding requirements; operational checklists; executive metrics; executive reporting; security metrics; security reporting, and so forth, and these may also affect the position of components within the toolbox list on the diagram interface. In other implementations these selections (and the selections in the above paragraph) may only be used for record-keeping purposes. The input may also include the name of the model, the version, the name of the model creator, the date created, the update person, the update date, comments, desired objectives by development/operations/security/executives/business leaders, and others, and notes or toggle elements to indicate whether those objectives are met, in progress, or in some other state (and any or all of these features may be included on one or more of the already-described interfaces).

Figure 20:
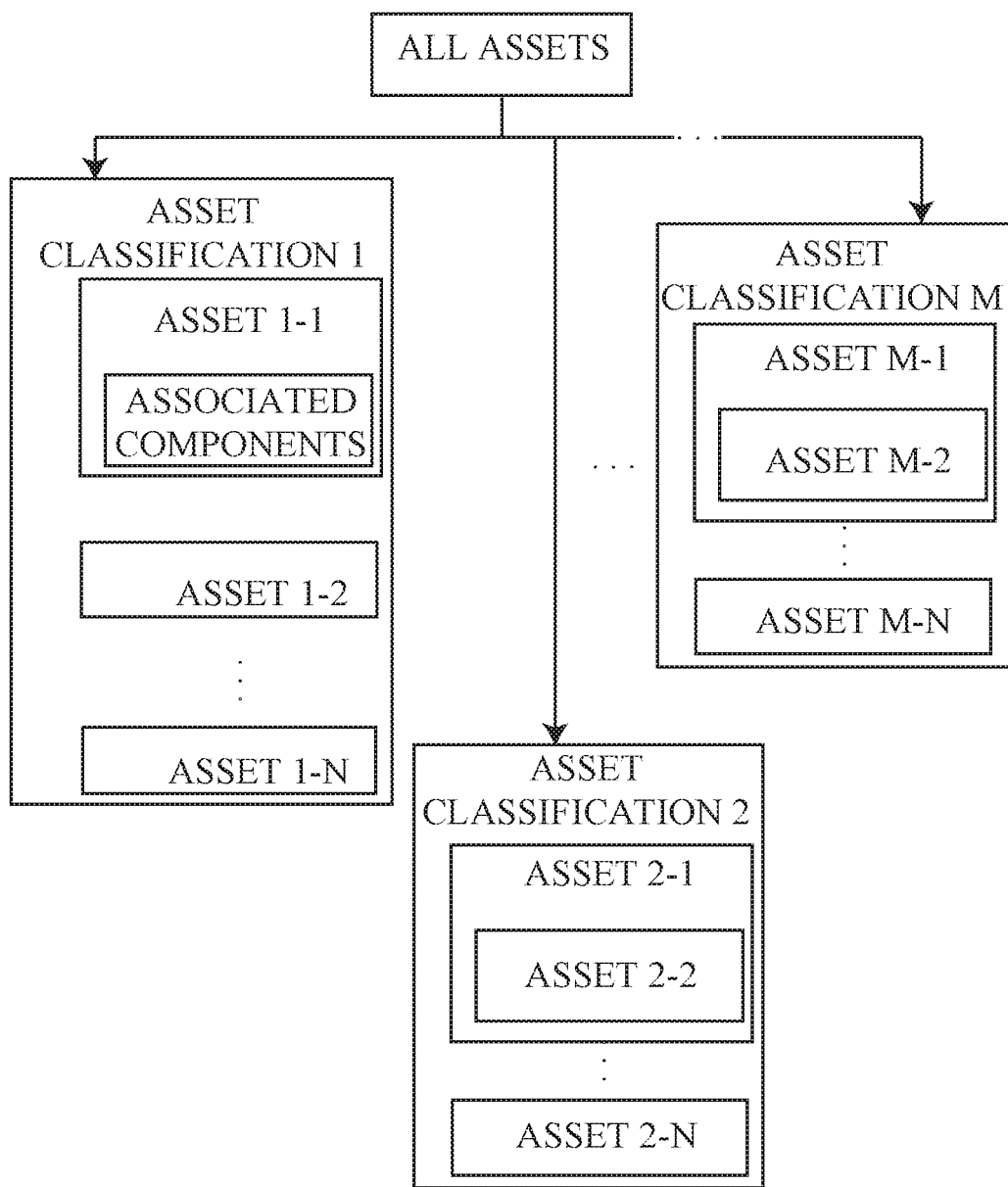
FIG. 20 is a block diagram of an asset classification method of an attack simulation method.

A representative example of the aforementioned step (3) is illustrated in FIG. 20, which may involve the classification of assets which may be associated with, located nearby or relevant to, or utilized by diagrammed components. In implementations the asset classification for each asset includes: an asset class; an asset, and; an associated component. In implementations the asset classification may be used as an input for analyzing potential attackers by providing insight to possible purposes attackers may have in targeting the asset. As an example, in implementations of cybersecurity modeling the assets may be classified as: non-confidential data; confidential consumer data; confidential corporate data; system capabilities (such as electronic funds transfers); non-digital assets (such as infrastructure or IT-system controlled equipment, and so forth. In a residential security model the classification could be: lightweight valuables; heavy valuables; personal information; life and health of occupants; residential structure/utilities; home security (entry keys/codes), etc.

Step (5) has already been described to some extent previously with respect to FIG. 17 with the creation of an attack tree (a partial attack tree is shown in FIG. 17—a full attack tree would include all assets as topmost nodes, and in implementations the attack tree may be similar or identical to the "threat tree" shown in FIG. 14 of the '021 Application). Referring to FIG. 17, the attack vector connects the asset with the component from which the threat emanates, and this association was determined by the previous classification step. In implementations the attack/threat tree may be simplified by only showing one topmost node (one asset) and only its associated components and threats. In implementations the attack tree only shows three levels—the topmost level being the assets, the middle level being components, and the bottom level being threats. This model can be simplified further to have only two levels—the topmost level includes asset/component pairings, and the bottom level shows the threats. In this simplified model the attack tree may show the asset identified as being nested within a component or otherwise attached or coupled with it (in implementations the topmost level would then show, for example, component 1 including asset 1 in level 1, component 2 including asset 1 in level 1, component 3 including asset 1 in level 1, etc., with level two (the bottom level) showing the threats coupled with the components). As a representative example, the asset could be jewelry, the components could be a front door, a back door, and a window, and a threat to the front door could be a bump-key, and since an attacker may use a bump-key to enter the front door, the bump-key is a threat to the asset.

Step (5) includes a second part, which is analyzing the identified threats. In implementations this involves various stages. One stage includes creating a profile for each threat. This may include utilizing real-world threat intelligence to provide attributes to said threats, and the attributes may include defined technical means to exploit the threat. A numerical value may be assigned to this means attribute (a high value indicating a higher level of technical means required to exploit the threat). This means attribute may also include the requisite skill, toolset, social network, financial backing, etc. the attacking entity would need to utilize the threat and traverse the corresponding attack vector. As examples, the technical means for the aforementioned bump-key against the front door is relatively low, whereas the technical means to alternatively burrow through the home's foundation to bypass other security controls is relatively high.

Another threat attribute is the access required to carry out the attack. A number is assigned to the access attribute, with a high number indicating a higher required level of access. A low access attribute may for example be attached to a lower level employee's alphanumeric password (which may be known by an immediate supervisor), while a high access attribute may be attached to biometric signatures for key personnel (which may require high access levels such as a privileged system administrator).

Another threat attribute is a defensive distance, or number of security controls and their effectiveness, between a threat and the asset. A high numerical value indicates a greater number of effective security measures in between. Another threat attribute is the potential impact if the threat is realized—a high value indicates a high technological or business impact in the event the threat is realized.

The second stage involves analyzing the attacker population. Two methods are disclosed herein. In one method (the preferred method), potential attackers are analyzed based on the identified threats and identified associated assets. The other method allows users to adopt existing threat intelligence about known attackers who have utilized existing threats (for example data of a 30% chance of a home invasion in any given year compared with a 1 in 20 million chance of a terrorist attack at the home). In the preferred method objective attributes and characteristics of attackers are provided even where such intelligence is not known.

The third stage involves determining a likelihood of a threat being realized. When the above preferred method is utilized this includes three sub steps of determining a subset of the attacker population with the sufficient means, sufficient motivation, and sufficient opportunity to exploit the threat, to determine the probability of an attacker subset coming from the attacker population (this discards attackers who would be unable to exploit the threat for whatever reason) (if the other method is used the statistically-provided probability is used). A determination is then made of whether the asset is attractive to the attacker, if not the likelihood of threat exploit is set to a minimum value, but if it is attractive the likelihood of threat exploit is the product of an attacker coming from the attacker population and the level of attraction. The next step calculates the product of the impact should the identified threats be realized and the likelihood of the threats being realized for each threat. Each threat is then prioritized according to some scheme (e.g., critical, high, moderate, etc.).

Step (6) involves analyzing attackers using means, motive, and opportunity (as identified above, in the preferred embodiment this occurs partway through step (5)—but if real world intelligence is used this step is obviated and skipped). If the attacker lacks either sufficient means, or sufficient motivation, or sufficient opportunity to conduct an attack, the attacker is disregarded, whereas if the attacker has all three the attacker is included in the organizational attacker population. These determinations could be done, for example, by any known or discovered method to assign a meaningful and relevant value to each category, and if the value of the attacker's technical means meets or exceeds the above set technical means value (and similarly for a motivation value compared with the above identified access level value and an opportunity value compared with the above identified defensive distance value) then the attacker is included in the organizational attacker population, otherwise not.

Step (7) has previously been described with respect to FIG. 5.

Step (8) includes reviewing the threat report after all of the above steps have been done. Step (9) involves comparing the outputs obtained from the threat model and process relative to the desired outputs and desired objectives indicated in step (1). In implementations steps (1) and (9) may be done through system interfaces. In other implementations they may simply be done manually. In still other implementations they may both be excluded.

Figure 21:
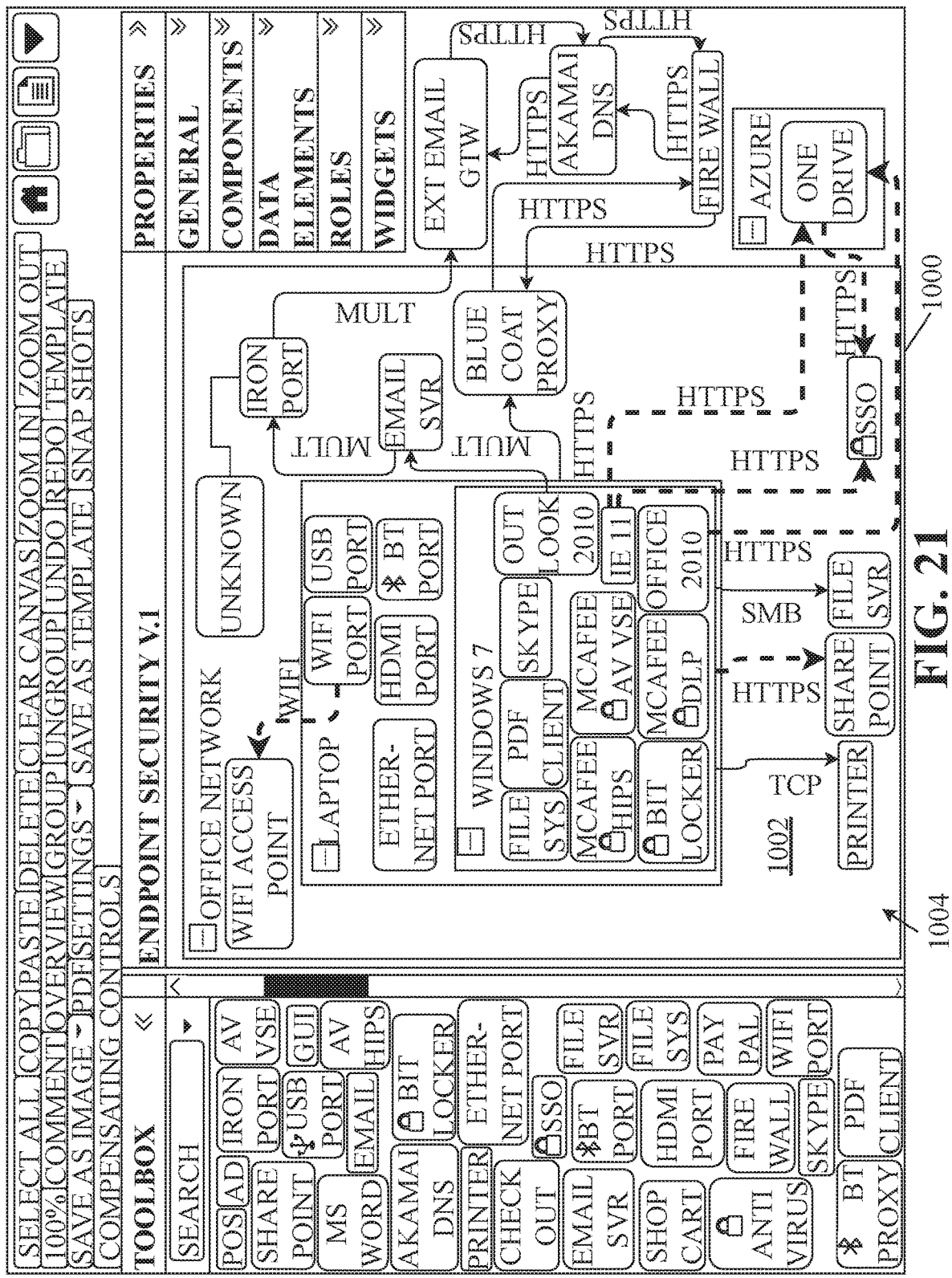
FIG. 21 is an implementation of an interface of the system of FIG. 1.

Referring now to FIG. 21, a representative example of attack simulation methods is shown. FIG. 21 shows the methods illustrated using the diagram interface 1000, though in other implementations the methods may be implemented using a separate interface that takes the components diagrammed in any given threat model and displays them in a separate interface just for the purpose of illustrating attack vectors. In FIG. 21 it is to be understood that the user has previously identified, through the database, the ONE DRIVE element as an asset. In other implementations the asset could be linked to the ONE DRIVE component but could be displayed as its own separate component—for example a "client info database file" shown next to or within the ONE DRIVE component (though in such a case the "asset" itself would be a "component" as that term is used herein). In the shown implementation the ONE DRIVE component itself is identified as the asset.

A number of dashed protocol lines are shown in FIG. 21. These are shown in this fashion after the user has selected the ONE DRIVE component and made a selection to show all threats that could compromise the component. For example, this could be done in implementations by right-clicking on the ONE DRIVE component and selecting a selector such as "Show Attack Paths," though the attack paths may be shown using other methods that the practitioner of ordinary skill in the art may determine. Once the selection is made, all threats reaching the ONE DRIVE component are highlighted in some manner. In the representative example they are highlighted by showing dashed and "moving" arrows, meaning an animation which shows the dashed portions of the lines as moving in one direction or another. In some implementations this animation could show the dashes moving in the direction towards the asset, which may assist the user to trace attack paths back to the outermost threats. In other implementations the arrows could be reoriented when the attack paths are shown so that the arrow tips all point downstream towards the asset, which may also assist the user to trace attack paths back to outermost threats. In implementations the attack paths are shown in a different color and/or using a greater line thickness than other protocol lines. In implementations the attack paths are shown in bright red and using thick lines while non-compromised paths are shown in thin black lines.

It can be seen that there are threats associated with the WIFI ACCESS POINT and with the SHARE POINT components, and that these threats reach the ONE DRIVE component through OFFICE 2010 and IE11 components. There are a number of potential compensating controls in the diagrammed system which may be utilized to mitigate these threats. For example, the laptop component group is shown including the MCAFEE HIPS, MCAFEE AV VSE, BIT LOCKER, and MCAFEE DLP compensating controls, and there is also an SSO compensating control diagrammed between the IE11 and ONE DRIVE components. All compensating controls in this diagram are shown as having an icon of a padlock on them so that the user can easily view the compensating controls to modify the threat model and the attack simulation (the compensating controls in implementations do not introduce any new threats but only mitigate threats).

Figure 22:
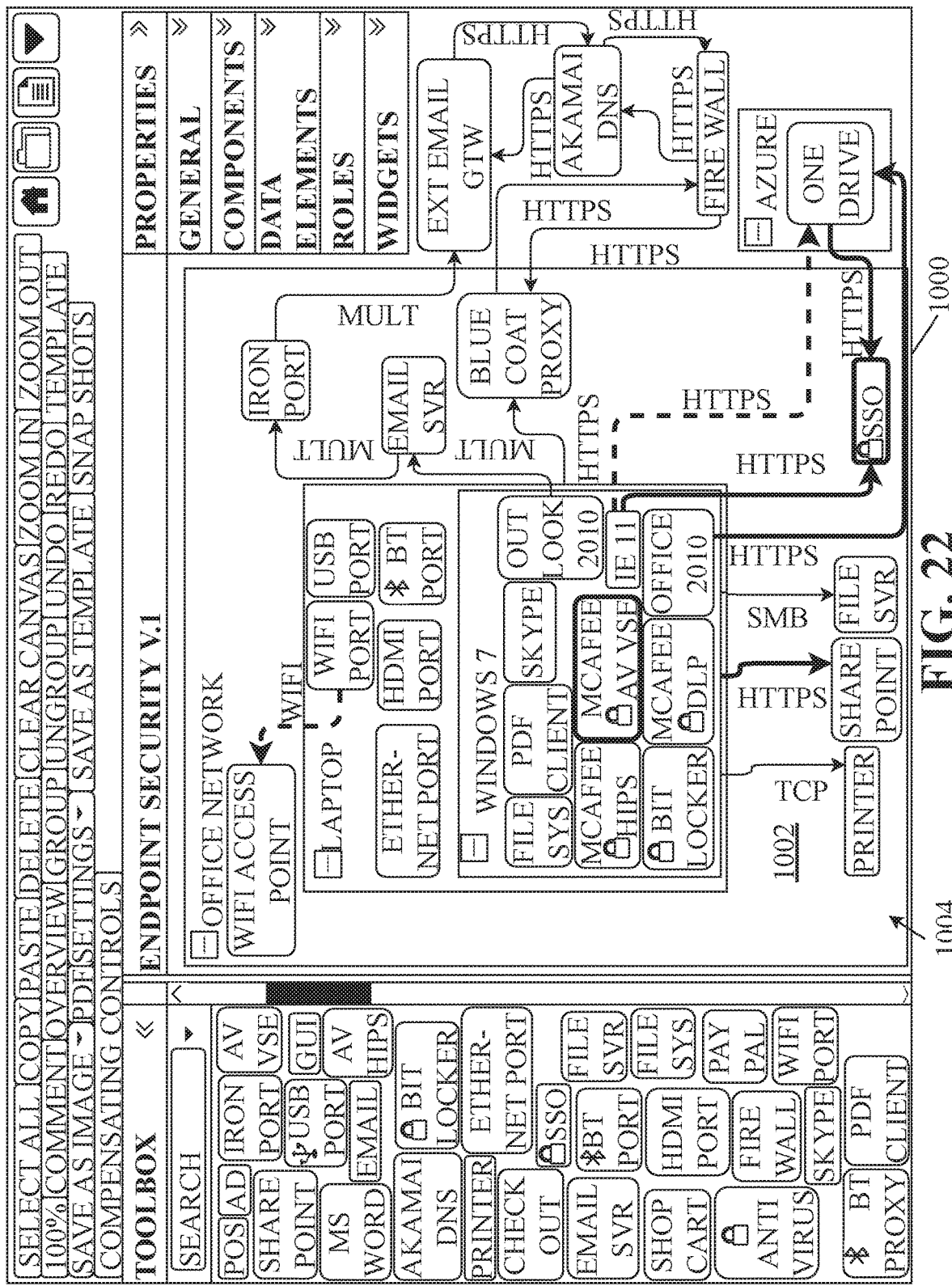
FIG. 22 is an implementation of an interface of the system of FIG. 1.

Referring now to FIG. 22, in this screen the user has toggled the MCAFEE AV VSE and SSO elements to an ON configuration. In implementations this is done by right-clicking each component and selecting "BLOCK" from a menu, which then changes all attack paths that are mitigatable by the selected compensating control to a mitigated display state (in some implementations the user may be able to select which attack paths are mitigatable from this interface). In FIG. 22 these compensating controls are highlighted by outlining them in a thicker line to show that they are turned on (though this display may be excluded in other implementations). The attack paths that are mitigated by the compensating controls that have been toggled to an ON state (or to a blocking state) are now shown as solid lines again, while those that are not mitigated are still shown in dashed format. In implementations the mitigated attack paths are shown in a thick green line. The user may reselect the compensating controls and select unblock to revert the threat model to the previous state. The user may also delete any given compensating control from the diagram altogether, and this will have the effect of changing any attack paths that were mitigated by that compensating control to an unmitigated display state.

While the mitigated display state for attack paths are described herein as green and bold and the unmitigated display state for attack paths are described as dashed, red, bold and animated, the practitioner of ordinary skill in the art could select other visual techniques to differentiate attack paths from non-attack paths and mitigated attack paths from non-mitigated attack paths. When a user toggles a compensating control to an ON state this may have the effect of dynamically changing the threat report, the compensating control report, the mitigations interface, and so forth by toggling relevant threats to mitigated (and toggling the same compensating control to the OFF state or removing it altogether from the diagram may have the opposite effect). In implementations one or more of the user interfaces (such as those of FIGS. 21-22) may allow user selection of certain threat sources and deselection of others, so as to only show attack paths of threats associated with a selected subset of the diagrammed components. The threats are shown in FIGS. 21-22 as emanating from outermost components (and the system/method may default to checking for threats at all outermost nodes), but in implementations they could emanate from internal sources (such as a USB port in an internal system administrator computer being a threat source for a virus). An attacker could be visually displayed at each threatened component, for example an "attacker" component could be placed on the diagram coupled with the WIFI ACCESS POINT and SHAREPOINT components to indicate the presence of an attacker. In other implementations the attacker need not be displayed in this way, but the user may understand that an attacker is reaching for the asset through the end points from where the threats are shown emanating on the diagram. From these end point components, or from an actual "attacker" component, the user may edit an attack profile (such as to indicate along a spectrum from a low funded individual hacker all the way to a state-sponsored team of skilled and well-funded hackers) and this may modify the attack paths. For example, if the latter profile is identified then certain compensating controls may not mitigate the threats (for example the SSO element may not be effective, and another compensating control would be needed instead), and accordingly when the profile is changed one or more of the attack paths may change to a mitigated or unmitigated display state in response. The identification of hacker type may be done, for example, through dropdown lists, checkmark items, and so forth that had been previously set through the database by the user, and the ability of a compensating control to mitigate threats by lower-end attackers but not higher-end attackers may also be defined/set through the database in the input interfaces previously described (though using selectors not shown—but which the practitioner of ordinary skill in the art will know how to implement).

In implementations another interface may allow the user to get a list of all threats which may compromise the asset and all attack paths associated with those threats. The asset has been described above as being anything of value to the user, it could for example be a database, a financial asset, a trade secret (or files related to trade secrets), and so forth.

One more comment is made here with respect to threat model chaining. The user may select a sub-component or component group (for example the user could right click the WINDOWS 7 component in FIG. 22) and select an "open in new window" selector to open a new diagram interface showing the diagram just for that component group. The user may then view just the threats associated with the component group, using previously identified methods, and/or may identify assets within the component group (for example OUTLOOK 2010) to show attack paths related just to this component. In implementations a user may right click or otherwise select a component group on an existing threat model by selecting a box outlining the component group and then select a "show threats" or other menu item to treat the entire component group as an asset and to show all attack paths thereto.

In implementations the designation of a component as an asset is done as simply as clicking on any component and selecting a "show threats" or similar menu item from a list. In other implementations a component may be designated as an asset by another mechanism and/or using another interface. The asset may be selected and its features edited, as well, as detailed to some extent above (for example some of the asset classification may be done here, though this may alternatively be done using one or more other interfaces). The attack simulation systems and methods herein allow a user to obtain a thorough understanding of threats and risks to multi-faceted systems/processes, and the impact to relevant assets, should potential threats be realized.

Although the examples of computing system models have been described in detail, system 100 may be utilized to model other threats. For example, referring to a disease epidemic threat model, the threats may be sources or ways the disease may spread, the security requirements may be methods or elements to reduce the effects of those sources, such as sterilizing surgery instruments, washing hands, using air filters, breathing masks, gloves, and the components may be steps or interactions that occur with respect to persons who may be infected, such as admitting them, dealing with infected clothing, performing medical operations on them, etc. In such a scenario the threat model may have no components, threats, or security requirements that relate directly to computing devices or systems, though the threat model may be modeled on system 100 which utilizes computing devices. The same may be said for the aforementioned threat model of commuting to work. Numerous other threat models, involving any of myriad types of threats, could be modeled using system 100. Other types of threat models could include: modeling physical and technology threats to airplanes, smart homes, smart TVs, an electric grid, and so forth.

Accordingly, the system and interfaces described herein allow a user to model a variety of systems, applications, and processes to determine threats and to mitigate those threats. The user may, at any time, delete any security requirement component (which may be a compensating control component) from a diagram and then generate the threat report again to revert to the threat statuses prior to mitigation by any particular component. This is one way in which step 518 of FIG. 5 may be accomplished, since removing the mitigating component will revert the mitigated threats back to the open status (except for threats which are also mitigated by another mitigating component). In implementations there may be other ways to "roll back" the threat report to an earlier status, such as with one or more selectors on the threat report itself to revert to an earlier configuration, or one or more "back" selectors on the diagram interface, and so forth.

Utilizing the methods and systems described herein an organization or individual can quickly and efficiently model deployed or contemplated systems, applications and/or processes and assess relevant threats to determine a mitigation strategy. The user may assess new threats to the entire attack surface of a system, application or process as the new threats arise and accordingly develop modified mitigation strategies with minimal disruption to existing operations. Additionally, the methods and systems described herein allow users to study the ability of a compensating control to block new or existing threats without penetration testing (pen-testing), which can be resource-intensive, slow, and not as thorough as desired. The systems and methods also allow assessment of future compensating controls which have not yet been implemented (and accordingly where penetration testing is not yet an option). Any of the threat modeling described herein may utilize existing threat modeling methodologies including STRIDE, P.A.S.T.A., TRIKE, OCTAVE, and/or VAST methodologies, which may include modeling the system, application or process as a data flow diagram (DFD) or a process flow diagram (PFD). The methods and systems herein integrate well with agile and DevOps development environments, and allow a threat modeling process which is simple enough to allow non-security experts to participate in the threat modeling process and to benefit from the outputs of the system/method.

In implementations a compensating control record in the database may include a definition or details which include: an articulation of the rigor and intent of a prescribed security requirement which the compensating control is meant to satisfy; a defensive level of the compensating control; security and defensive capabilities of the compensating control, and; additional risk imposed by not adhering to the prescribed security requirement.

Systems and methods described herein may have other features that have not been described in detail. Users may be able to access the interfaces of the system through a web page, as described, and may be able to register using user accounts, with login credentials (the web page having functionality for retrieving lost passwords), etc. Individual users may be able to import custom libraries and other elements into the database including custom components, threats, threat agents, test cases, security requirements, code snippets, code reviews, data elements, roles (developer, customer, user, admin, etc.), widgets, component types, attributes, templates, threat models, and the like. In implementations widgets may be a subset of components and may include reusable modular components that may be included in some components. Some examples of widgets may be, by non-limiting example: forms, cookies, banners, embedded video, RSS feeds, SMS functionality, SILVERLIGHT, secure hardware token, file upload, XML parser, and so forth. Widgets may be associated with threats through the database, using an interface similar to interface 600 (but accessible by selecting "widgets" from interface 700), and may be added to any diagram in the same way that components are added, which may include defining communication protocols between the widget and other components/widgets. Widgets may in implementations comprise identifying information about a component, user roles which can interact with a component, and the means by which the component receives, transmits, or stores data elements.

In implementations a software installation on one or more computing devices to implement the systems and methods may include storing default libraries in the database, (such as over six hundred and fifty threats), a number of standard or default definitions for components, default risk levels to choose from (though the user may set up custom threats and associations through the database—which essentially sets up custom risk algorithms), custom risk levels to choose from, and so forth, as described above. The ability of the user to diagram a system, application or process visually allows for non-security experts to analyze threats using a threat model. In implementations, previously generated diagrams may be able to be imported into the system using a PDF, XML, TMT, JSON, PNG, JPEG, or VISIO drawing (VSD, VSDX).

In implementations the system is configured to interface with third party software applications and libraries (including software as a service (SAAS) services), by communicating with the third party software/library using its application programming interface (API). This may be used, for example, to store standards from standards-issuing bodies in the database and to associate them with security requirements and/or compensating controls through the database. This may assist a user to determine when a component added to a diagrammed threat model would qualify as a compensating control as defined by the standards issuing body. The system may be said to include a "contextual threat engine," which includes the underlying database relations allowing the system to dynamically update the threat model each time a component is mapped onto the canvas, or connected with another component using a communication protocol, or when a protocol is changed or deleted, or a component removed, etc. The systems and methods described herein facilitate comprehensive enterprise-level attack surface analysis. Different users may use different interfaces within an organization in some implementations. Information technology (IT) professionals may define the actors, threats, components, etc. specific to an organization, non-IT professionals may map out systems using the canvas, executives may review the high-level threat details included in the home page or threat model, and so forth (though in other organizations any user may use any interface).

In implementations the interfaces of FIGS. 6-13, 15, and 21-29 may be shown using one or more first software applications which provide access to one or more data stores, and one or more user inputs may be used using one or more of those user interfaces to import a threat model or diagram from a second software application or database into the system. The second software application could be a software provided by a third party, though it could also be a separate software application created or provided by the same party as the first software application. Accordingly, the phrases "second software application," "second software program" and "second software" as used herein are simply meant to convey that the diagram or threat model being imported was created using a separate software application. This may involve, by non-limiting example, importing a diagram or threat model from a second software application that has a different schema or the like relative to the first software application, so that some translation, matching, or interpretation is needed to determine which threat model components stored in the one or more data stores of system 100 correspond or correlate with the components/elements of the imported diagram or threat model.

When the importation is done an administrator may map components or elements of the imported threat model to stored components of the system so that the relevant threats and etc. will be included in the imported threat model. Along these lines, it is pointed out here that both end users and administrators are "users" of the system as that term is used herein. Accordingly, when the claims refer to "one or more user inputs" these inputs may be carried out by an end user and/or they may be carried out by an administrator, such as an administrator maintaining a cloud database which several different end users are accessing to implement different deployments of the method/system.

Figure 23:
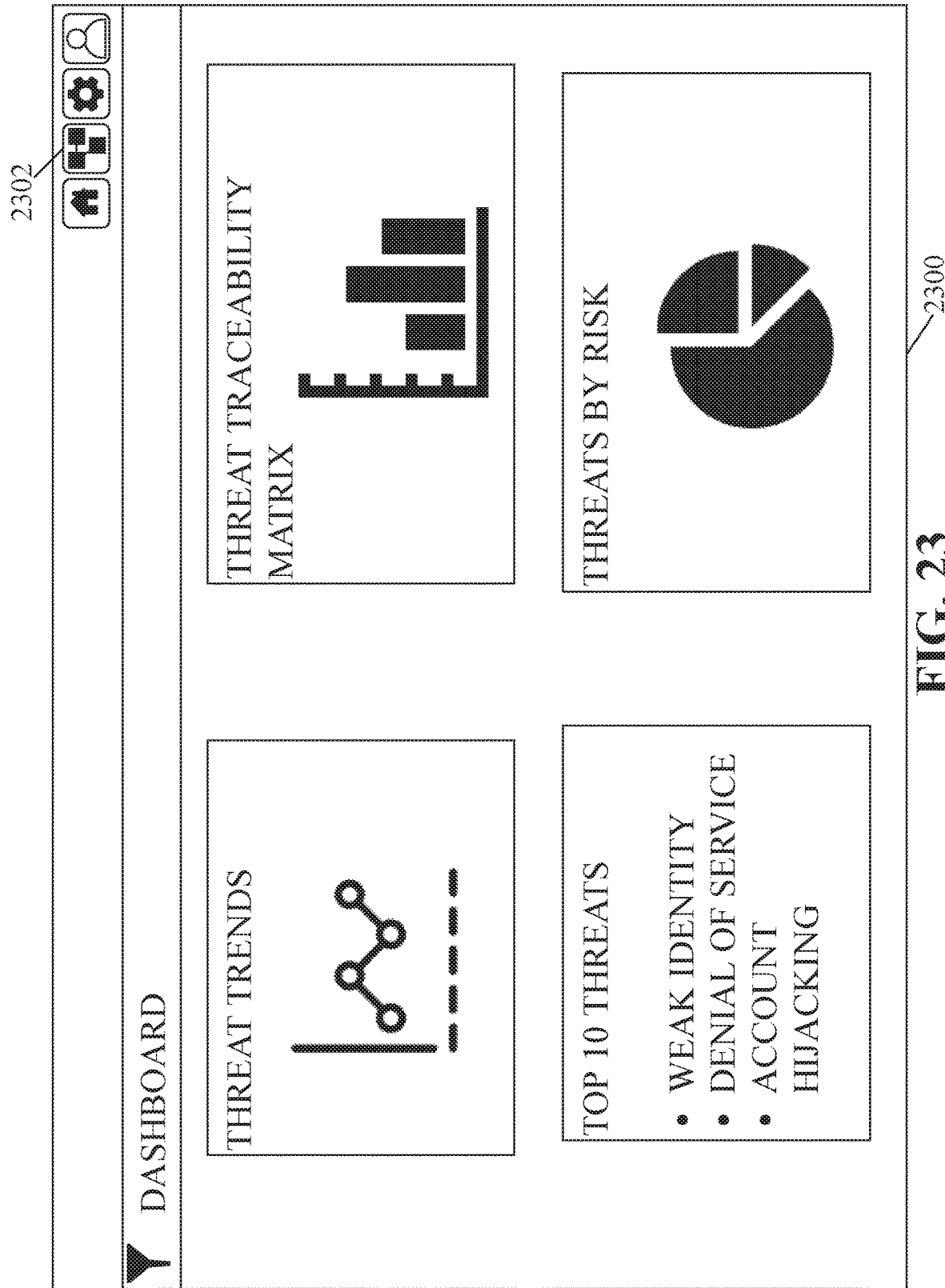
FIG. 23 is an implementation of an interface of the system of FIG. 1.
Figure 24:
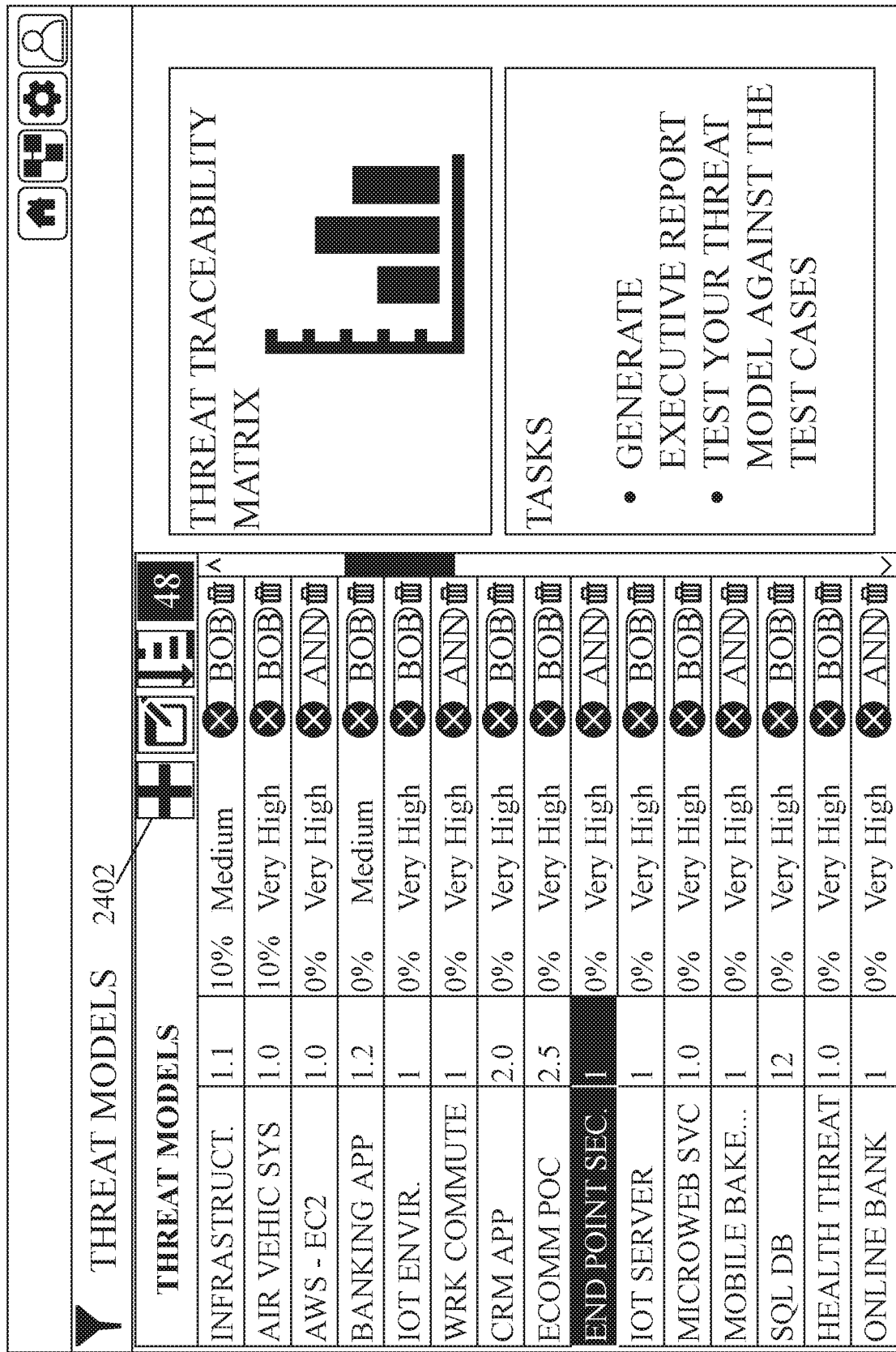
FIG. 24 is an implementation of an interface of the system of FIG. 1.

Referring now to FIGS. 23-29, various representative examples of systems and methods for automated threat model generation from diagram files will be described. As far as systems for automated threat model generation from diagram files, the system 100 previously described may be used for this, with some additional user interfaces that will be described shortly. FIG. 23 shows a dashboard interface (interface) 2300 which may be displayed on one of the computing devices of system 100 (such as an end-user computer) and may allow a user to view information and/or navigate to different interfaces or windows as desired by the user. For example, the dashboard interface shows a THREAT TRENDS area, a THREAT TRACEABILITY MATRIX area, a TOP 10 THREATS area, and a THREATS BY RISK area. These may show information and/or may be selected to navigate to an interface/window with more information, and are only representative examples that will not be described in great detail. A filter icon is also seen at the top left which may allow a user to filter the items shown on the screen in various ways. At the top right a threat model selector 2302 may be selected to navigate to a threat model interface (interface) 2400, a representative example of which is shown in FIG. 24. Interface 2300 could be a home page for the software.

Interface 2400 is seen to list threat models by name and to include a version number (1.1, 1.0, etc.). These may be all threat models that have been created by a specific organization or end user of the system and methods. Also listed are a percentage (indicating a completion percentage of the threat model), an overall threat risk of the model (Medium, Very High, etc.) as assigned by a user using interface 2500 (described later), who created or last worked on the model, and a trash icon for deleting the model. A filter selector at the top left allows a user to apply various filters to search for a specific threat model. On the right are shown THREAT TRACEABILITY MATRIX and TASKS areas which show further information and which may operate as selectors to navigate to further information. The user is seen to have selected the END POINT SEC. threat model, so that it is highlighted. Additional selectors include a new selector (selector) 2402 which may be used to begin a new threat model, an edit selector which may be used to edit a threat model or the aforementioned descriptive information, a number indicator (48) indicating the total number of threat models in the one or more databases (or the total number responsive to the filter request), and other selectors. In implementations a user could double-click on any given threat model to navigate to another interface, such as the diagram interface of FIG. 21 or the threat report interface of FIG. 13.

Figure 25:
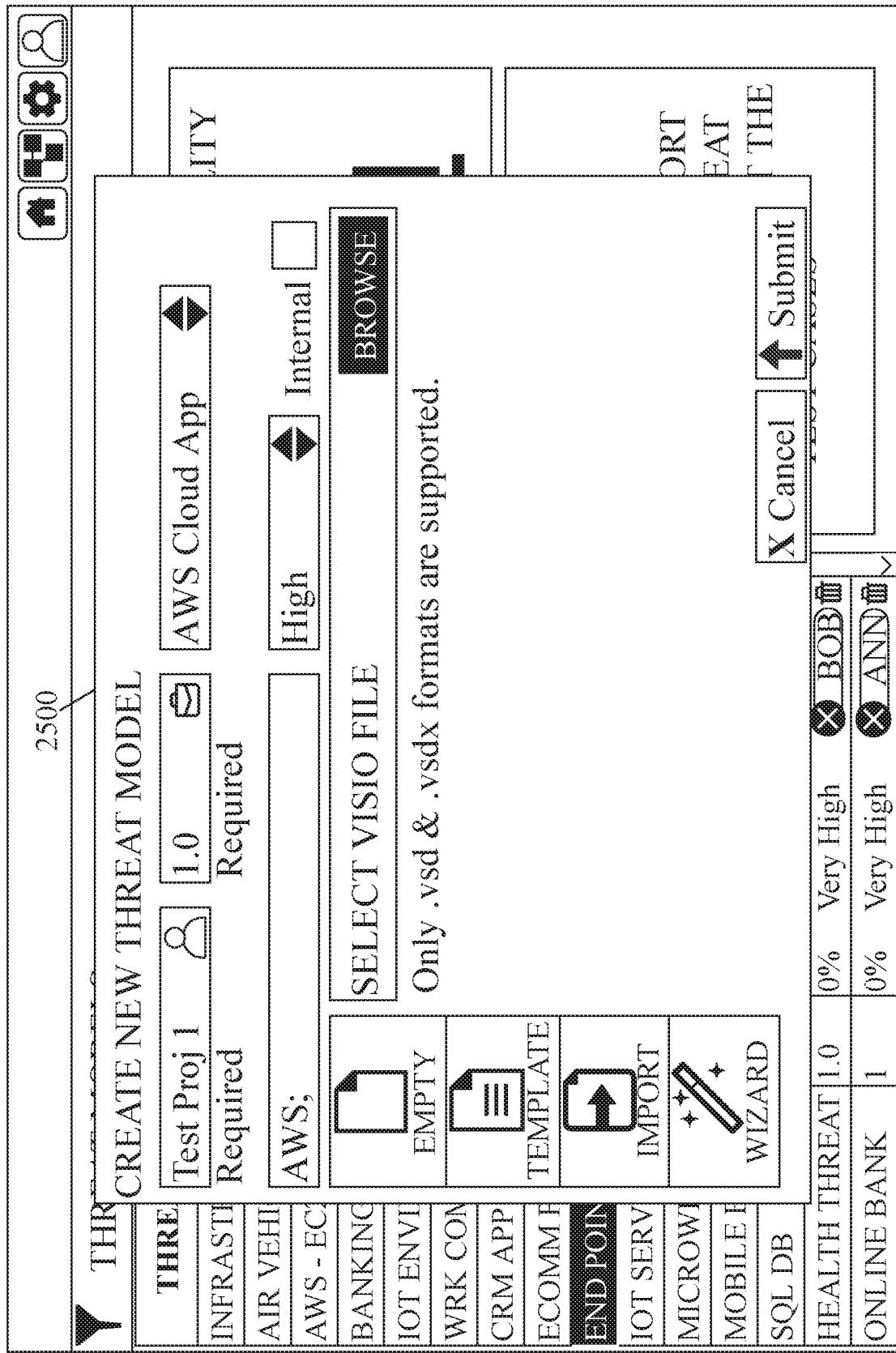
FIG. 25 is an implementation of an interface of the system of FIG. 1.

In the representative example the user may select the new selector 2402 to bring up import interface (interface) 2500 as shown in FIG. 25. This interface includes a number of fields for the user to fill out, including a threat model name (here the user has input "Test Proj 1"), a version number (the user has input "1.0"), and a selector to select a type of threat model (here the user has selected "AWS Cloud App" from a dropdown menu which was previously populated in the database, in other implementations other options could include, by non-limiting example, AZURE Cloud Application, Mobile Application, ICS Application, Web Application, Web Service, Computing Network, Banking Network, Communications Network, and so forth). Interface 2500 also includes a field for the user to add tags or labels to the model, here the user has added the AWS tag to this model. These tags may be used for more easily finding this threat model later such as when using filters on the aforementioned interfaces. Other representative examples of labels could be, by non-limiting examples: Hardware, Firmware, JAVA, JIRA, INI, Certificates, PII, Trial, IoT, BLUETOOTH, Banking, SSO, Privacy, Input Validation, Password Policy, CAPEC, Log Files, OWASP, Embedded System, MIDAS, CAPEC-100, CAPEC-14, CAPEC-24, CAPEC-433, CAPEC-45, CAPEC-47, CAPEC-8, CAPEC-9, CAPEC-101, WASC-36, OWASP A1-Injection, OWASP A2—Broken Authentication and Session Management, and so forth.

A dropdown menu also allows a user to select an initial threat level for the model, here the user has selected a "High" threat level. A checkbox indicator allows the user to select whether the model is of a system, application, etc. external or internal to the organization. Any of the text fields of interface 2500 (as with all other interfaces of the systems and methods described herein) may include predictive text and/or most-used suggestions so that text often used or predicted by the system as being likely to be used in this instance is suggested to the user, with the user being able to select the text to insert it into the field instead of typing it out in full.

On the left of interface 2500 are selectors. An EMPTY selector allows the user to begin a new threat model from scratch. The TEMPLATE selector allows a user to begin a new threat model by starting with one or more templates previously stored in the one or more databases. The WIZARD selector allows the user to answer questions and indicate some parameters to begin a threat model. The IMPORT selector allows a user to use a preexisting data file from a second software application/program to generate a threat model. As indicated above, the second software application could be a software provided by a third party, though it could also be a separate software application created or provided by the same party as the first software application, and the phrase "second software application" simply conveys that the diagram or threat model being imported was created using a different software application than a first software application which provides user interfaces (or interacts with users using user interfaces) such as the user interfaces shown in FIGS. 6-13, 15, and 21-29. By non-limiting example, in implementations a user may import a MICROSOFT VISIO file in VSD and/or VSDX format, a file in PDF format, an XML file, a GLIFFY file, TMT file, JSON file, PNG file, JPEG file, or a number of other file formats.

In the representative example shown in FIG. 25, the system is configured only to import VSD and VSDX file formats. The VISIO file imported by the user would be a VISIO diagram file on which the user has previously diagrammed a system, application, or process and now wishes to generate a threat model using that same diagram.

On the preexisting diagram the user will have used visual diagram components (hereinafter "second software diagram components" or "VISIO diagram components" in the case of a VISIO file) to diagram the system, application or process. These second software diagram components may have default titles for various components. For example, VISIO may have a component titled "INTERNET GATEWAY" which the user could add to a VISIO diagram. However, the user may also add a custom name (user-defined name) to a component in the second software application (which may be a diagramming software application). Or, in implementations, some software may allow a user to replace a default title with a user-defined name for any given component. In VISIO a user may select an element or component that has been placed on a diagram and type text to give the component a user-defined name that is then displayed on the diagram and associated with the component. Either or both of the user-defined name and the default title may be used by the system to determine how to generate a threat model using the second software diagram.

Figure 30:
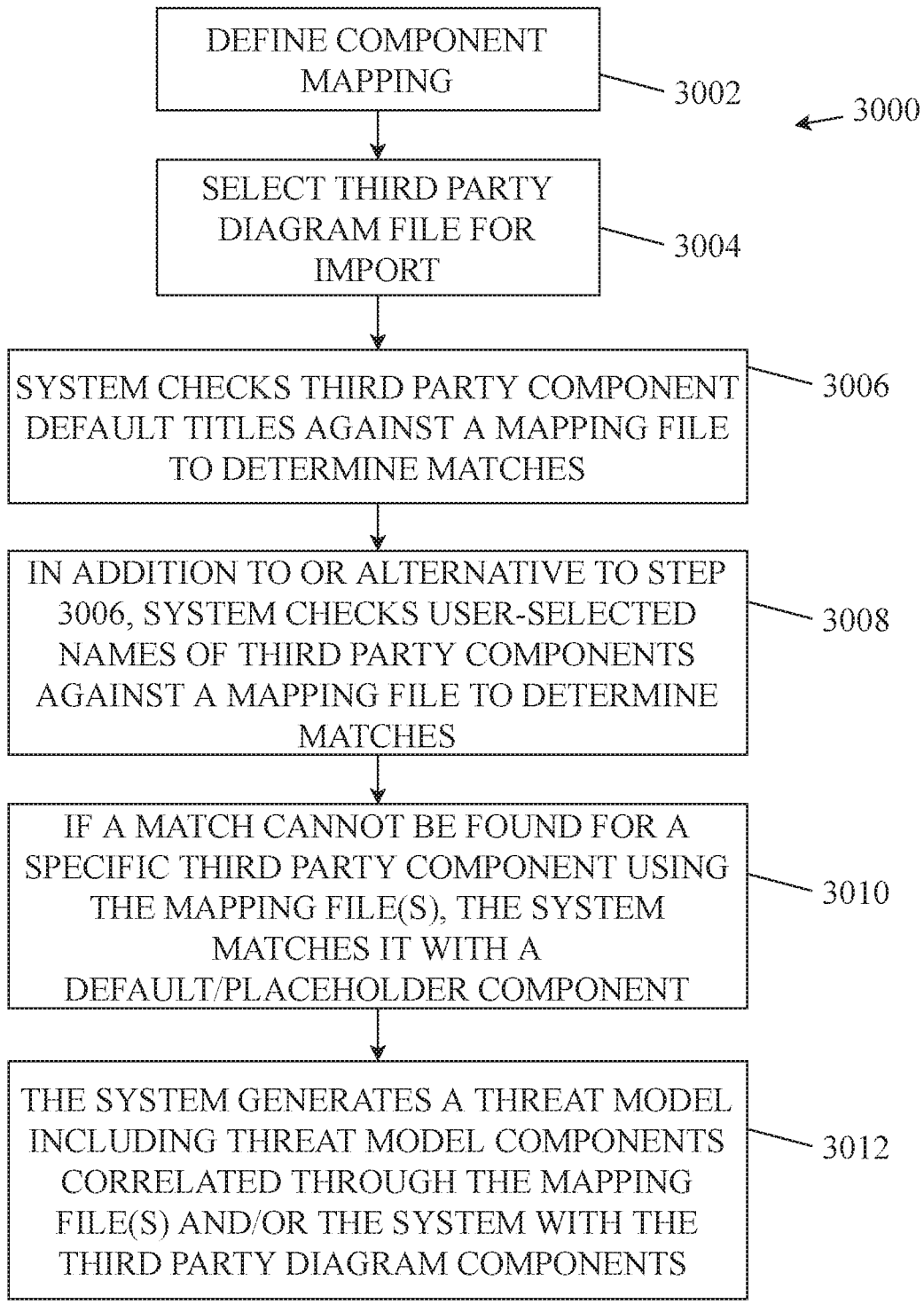
FIG. 30 is a flowchart representatively illustrating a method of threat model generation using the system of FIG. 1.

Referring to FIGS. 28 and 29, interfaces 2800 and 2900 show comma separated value (CSV) files (mapping files) that may be used by the system to correlate second software diagram components with threat model components previously stored in the one or more databases. Interface 2800 shows a CSV file which includes a table listing, for each listed item, a name given by an administrator, a value (which is the default title assigned to a component in the second software application), a comment (if any), and a global unique identifier (GUID) which is associated with a specific threat model component through the one or more databases. In this way any component of the second software application may be mapped to (correlated with) a corresponding threat model component stored in the one or more databases. So, for example, if the user's VISIO file includes a component that has the default title in VISIO of INTERNET GATEWAY, when the VSD or VSDX file is imported using interface 2500 the system 100 may include a corresponding threat model component (i.e., an "INTERNET GATEWAY" threat model component previously defined in the system and stored in the database(s)), so that in a threat model diagrammed on the diagram interface 1000 after importing the file an INTERNET GATEWAY threat model component is located exactly or approximately where the INTERNET GATEWAY second software diagram component was located on the VISIO diagram. Additionally, the INTERNET GATEWAY threat model component would have previously been configured to match the details/properties of the INTERNET GATEWAY second software diagram component. The step of defining component mapping, as described above, is representatively illustrated by step 3002 of flowchart 3000 in FIG. 30. This may be done by an administrator or, in implementations, by an end user. FIG. 30 also representatively illustrates step 3004 of selecting a file for import, which will be described hereafter with respect to the import interface 2500 of FIGS. 25-27.

Interface 2900, as indicated, illustrates a CSV mapping file that is based on default titles within the second software application, and the table has similar elements to the table of interface 2800 except the "value" column is populated with potential user-defined names. In other implementations the tables may be organized differently, for example the "name" columns of interfaces 2800 and 2900 could be the default titles and potential user-defined names, respectively, instead of the "value" column. Interface 2900 illustrates a CSV mapping file that is based on user-defined names for elements. Referring to FIG. 29, if a user defines an element within the second software diagram as an AIRPLANE or an ATM the import function can pick the appropriate threat model component, either an AIRPLANE or an ATM threat model component, for the generated threat model. In implementations the system may be configured to use one of these first and the other as a backup, for example the system may be configured to first use the user-defined name, so that if a match is found in the first mapping file (interface 2900) that determines the threat model component that is used, but if a match is not found then the default title of the component in the second software application is checked against the second mapping file (interface 2800), and if a match is found there that determines the threat model component that is used. In implementations this could be reversed, and in implementations a single file could be used instead of two files (for example all user-defined names and default titles included in one list and the system simply selecting the first match that is found). In other implementations the system may find a match in the first mapping file but may also check the second mapping file to verify that the match is correct. The steps of checking components of the imported second software file against the mapping files is representatively illustrated by steps 3006 and 3008 of flowchart 3000 in FIG. 30.

In implementations if no match is found a placeholder or default component could be used, and shown on the diagram interface 1000 in a way that indicates to the user that a match was not found for the second software diagram component. As an example, FIG. 21 shows an UNKNOWN component coupled with the IRON PORT component, indicating to the user that the system could not find a match for the user-defined name or the default title of that component during the import. This could be termed "matching" the second software diagram component with the placeholder component. In other implementations, if a matching element is not found then the second software diagram component could be ignored so that, for instance, a blank area is left in the threat model diagram where the component would be. The step of using a placeholder component is representatively illustrated by step 3010 of flowchart 3000 in FIG. 30.

File formats other than CSV files could be used for the mapping file(s). In implementations one or more tables in the database(s) could include the same information and could be used for mapping. In the implementation in which separate files, not in the database(s), are used, they could be stored on the one or more computing devices that comprise the system 100 (including user computers, servers, and so forth). In implementations in which one or more tables of the database are used for the mapping file(s), each table is, for the purposes of this disclosure, a "file."

Figure 26:
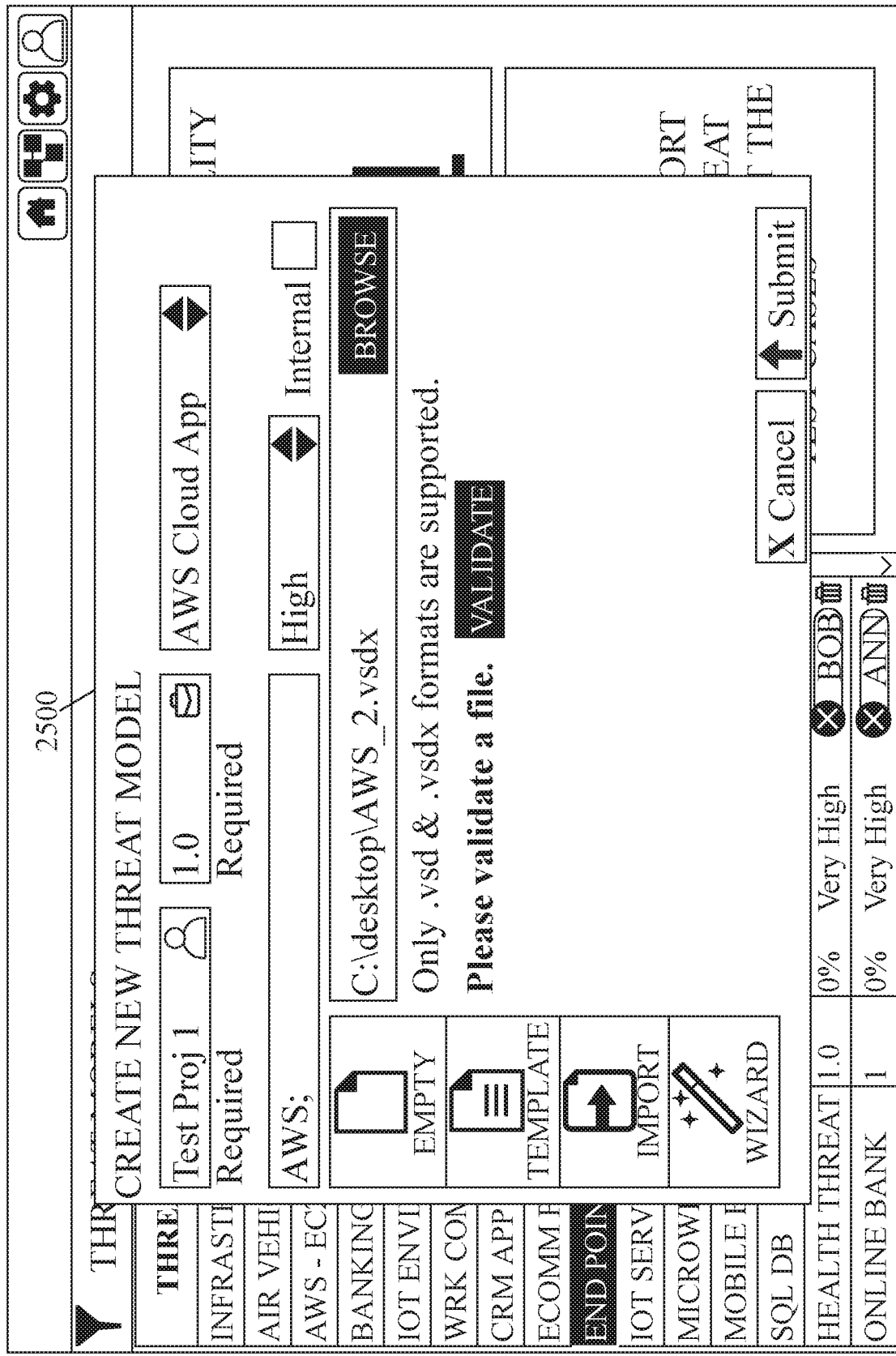
FIG. 26 is an implementation of an interface of the system of FIG. 1.
Figure 27:
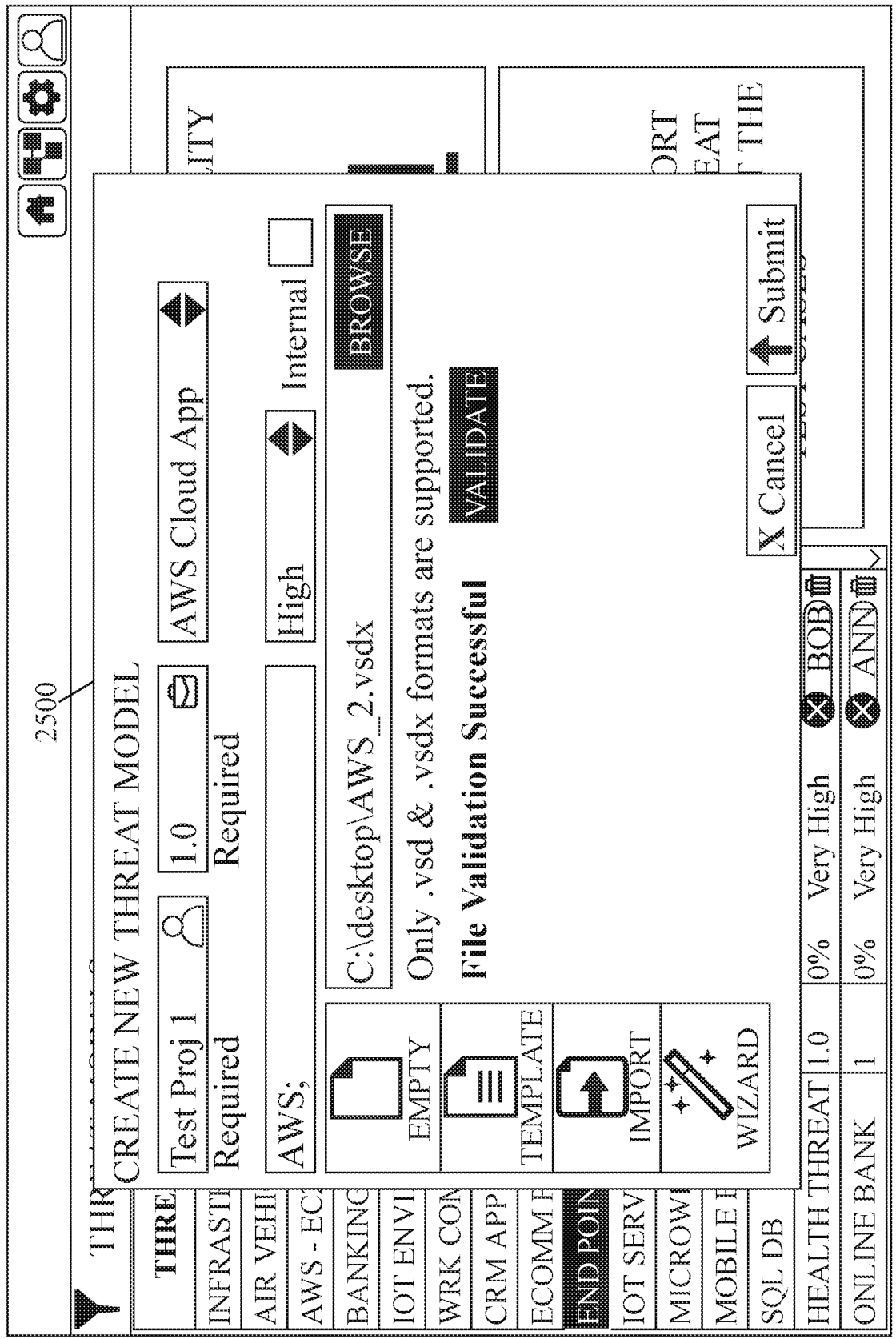
FIG. 27 is an implementation of an interface of the system of FIG. 1.

In FIG. 26 it is seen that the user has used the BROWSE selector to navigate to and select a desktop VSDX file and that a VALIDATE selector is now selectable. Upon selecting the VALIDATE selector the interface 2500 then either indicates that the file validation was successful, as in FIG. 27, or that the validation was unsuccessful. This validation step may include an actual import of the VSD or VSDX data file to the one or more databases or to memory of one of the one or more computing devices. It may also or alternatively include a simple check that the file is one of the supported formats. In the implementation shown in FIG. 27 the validation function simply validates that the file was successfully uploaded to the database(s) or one or more of the computing devices/servers of the system. The step of selecting a file for import (a VISIO file or other type of file) is representatively illustrated by step 3004 of flowchart 3000 in FIG. 30.

While the terminology "import" is used herein, the system could function in a variety of ways. Naturally if the second software file itself is uploaded to computing devices or databases of the system this is an "import" in the natural sense of the word, but in other implementations the VALIDATE or SUBMIT selectors could simply initiate a reading of the file locally on the computing device that is being used by the user to use the interface 2500, and then only uploading to the database(s) or other computing devices (including server(s)) of the system 100 mapping data that is used to create the threat model, without uploading the actual underlying second software file. Either way, whether the second software file is only stored locally on a computing device, or is uploaded to other devices or database(s) of the system, the file is at some point read to do the mapping of the second software diagram components to threat model components by referencing the mapping file(s). This may be done using executables and code which will be understood by the practitioner of ordinary skill in the art without further explanation herein, so that a detailed discussion of the code and/or executable(s) used to read the second software file and determine the threat model components correlated in the mapping file(s) with the second software diagram components is not given herein.

As has been previously described, in the database(s) the communication protocols may be stored as threat model components. In the second software diagram the lines connecting elements may or may not include communication protocol information (they may just be lines). If no communication protocol information is included these connectors may simply be represented as lines in the generated threat model, so that the user could later select the communication protocol(s) for any given connector. In some cases though a user may have given a user-defined name which indicates a communication protocol (such as HTTPS), or the component in the second software may have a default title indicative of a communication protocol, and the system 100 may use this to represent the connector as a specific communication protocol once the threat model is generated.

Referring back to FIG. 27, at any point the user may select the CANCEL selector to cancel the creation of a threat model. After file validation the user may select the SUBMIT selector to generate a threat model based on the second software diagram in the second software file. Again, the specific details of how the system performs this are not included because they may be accomplished in a variety of ways, but in the implementation shown when selecting the SUBMIT selector initiates a process of determining, based on the uploaded file, which threat model components (including communication protocols if possible) correlate with the second software diagram components, and thereby generating a threat model including the correlated components. The step of generating a threat model is representatively illustrated by step 3012 of flowchart 3000 of FIG. 30, and may include displaying interfaces 1000, 1100, and 1200 previously described, as well as other interfaces/elements. Generating the threat model may include using the system to determine threats, threat sources, threat risk levels, threat statuses, security requirements, compensating controls, threat mitigations, and so forth—associated with the system/method or the like that was diagrammed in the second software and imported to generate the threat model—and displaying these to the end user. After selecting the SUBMIT selector the diagram interface 1000 may automatically be displayed showing the visual diagram of the threat model, as in FIG. 21. From this interface the user may edit the threat model using any of the methods previously described. At any point the user may navigate to the threat report interface 1300, as described previously, to see the threat report showing the threats associated with the generated threat model. The threat report interface and its functionality, and the threat report generally, are described in detail above.

In some implementations of system and methods for automated threat model generation from second software diagram files, an admin or the like may provide default database data, such as one or more libraries of threat model components, threats, mapping files, software for local installation to view and use the interfaces described above, and the like, so that the importing and automatic threat model generation at the user's end is very simple. In other implementations (or as determined by the end user based on their expertise) the end user could modify the threat model components and threats, create new threat model components and threats, modify the mapping files, and so forth. For example the end user could open a standalone mapping file such as one of the above-described CSV files and make edits to it, or replace it with another CSV file, for the mapping and correlation of second software diagram components with threat model components. In implementations in which the mapping files are one or more tables stored in the database(s) there may be another interface (not shown in the drawings) at which the user may edit mapping tables.

In many implementations the diagram of the second software may have been used to diagram a computing network or environment, so that the resulting threat model will model a computing network. By computing network is meant any networked system of components which includes computing devices in the general sense—for example an ATM is a computing device so that a system including an ATM would be a computing network. Nevertheless, in implementations the automated threat modeling systems and methods may be used to model processes, systems, applications, and a variety of other things as has been described previously.

The mapping files may include a large number of second software diagram components (for example it could include likely user-defined names and default titles for the entire component library of the second software program), and any given data file of the second software application that is imported would normally include only a subset of those components, so that the system is only finding the threat model components which correlate with the subset to generate the threat model. The data file of the second software would also generally define relationships between elements, for example at least lines connecting one element or component with another. As previously described, these may be more detailed (such as including communication protocol information) in the second software data file, or they may be less detailed, only being lines or connectors. Either way, when two elements are connected in the second software data file this is a "relationship" between those elements as used herein, as it generally indicates some connection or coupling of the elements, so that the second software data file "defines" relationships between the elements. Since the data file may define relationships in more detail, i.e., HTTP, HTTPS, or other communication protocols, in those cases the system and method can determine threat model components that are correlated with the second software diagram relationship definitions (such as determining that an HTTP communication protocol threat model component correlates in the mapping file with a connector line in the second software diagram for which the user has given a user-defined name of "HTTP"). The second software diagram data file, such as VSD or VSDX file, will generally include data related to each component, such as location of the component, which other components it is connected to, the default title of the component, any user-defined name for the component, etc. The system 100 and methods described herein use that information to create the threat model.

Since the one or more mapping files may be stored on one or more computing devices communicatively coupled with other elements of the system, or may be stored in the database(s) directly, in either case they are communicatively coupled with the database(s). They may be accessed using one or more of the servers or other computing devices of the system to perform the functions described herein.

As has been described with respect to interface 2500, in implementations a single interface initiates, in response to user input, both reading of the second software data file by one or more computing devices of the system and, additionally, a determination of which threat model components are correlated (in the one or more mapping files) with the subset of second software diagram components that have been read. For example the VALIDATE selector may initiate reading of the file and the SUBMIT selector may initiate the correlation determination. But in other implementations a single user input on a single user interface could do both, for example the VALIDATE selector could simply upload the file and the SUBMIT selector could initiate both reading of the file and the correlation determinations (which could be done sequentially or to some extent simultaneously). In other implementations two or more selectors on separate interfaces could be used, but in the claims where "an import interface" is described and, thereafter, an interface for initiating the correlation determination, in implementations these may be the same interface (as with the example in the drawings, where the import interface initiates both functions in response to user input).

In most if not all cases, before the threat model is generated by the system 100, the second software data file does not include a threat model as that term is used herein. While the second software may allow for the creation of a diagram of a system, application, or process, the systems and methods described herein allow the user to then generate, using that diagram, a threat model to almost instantaneously assess threats to the system, application or process using the threat report.

Although a mapping file specifically correlating threat model components with VISIO diagram components is not shown in the drawings, the practitioner of ordinary skill in the art will know how to create such a mapping file without specific illustration simply by reference to interfaces 2800 and 2900 and the above description. Where the above description applies generally to second software diagram components, subsets of second software diagram components, and the like, it may also apply to specific software components (for example VISIO diagram components, PDF diagram components, subsets of VISIO diagram components, subsets of PDF diagram components, XML diagram components, subsets of XML diagram components, TMT diagram components, subsets of TMT diagram components, JSON diagram components, subsets of JSON diagram components, PNG diagram components, subsets of PNG diagram components, JPEG diagram components, subsets of JPEG diagram components, and so forth.

In some implementations the mapping of the mapping files could be one-to-one, for example each potential second software diagram component has a single matching element in the list. In other implementations the matching could be multiple to one—for example a FILE SERVER or a SQL SERVER in a second software diagram both being matched to a single SERVER element with the mapping file. But in cases where there are different properties between different potential second software diagram components—for example a SQL SERVER having different properties than a generic FILE SERVER, the mapping file(s) will generally include different threat model components and map to the specific language, so that for instance a FILE SERVER in the second software diagram would be mapped to a FILE SERVER threat model component, a SQL SERVER in the second software diagram would be mapped to a SQL SERVER threat model component, and so forth. In instances where an element is just called a SERVER in the second software diagram it may be mapped to either a separate SERVER threat model component or the FILE SERVER component, etc. The mapping files accordingly allow flexibility in how a user may apply correlations between second software diagram components and threat model components.

In implementations the systems and methods for automated threat model generation from second software diagram files may include machine learning to learn, through repeated user interaction, for example, what users usually change a specific second software diagram component to in the generated threat model. For example, if a component in a VISIO diagram has no match in the mapping file(s), so that a placeholder is used, but users generally change the placeholder to a ROUTER threat model component, the system may automatically update the mapping file(s) so that the VISIO component is mapped to the ROUTER threat model component. Alternatively or additionally, the placeholder component may, when hovered over or clicked on by a user, show suggestions which may be dictated by machine learning. For example if users in the past changed the second software diagram component to one of five threat model components, those five components may be suggested to the user. The suggestions could be listed in order of their frequency of use/selection for that component. The machine learning aspect may allow some of these features to occur without administrator input as the system learns from user behavior.

Similarly, if the system does map a specific second software diagram component to a specific threat model component, and users generally change the component to a different threat model component once the threat model is generated, the system may through machine learning suggest that the component may need to be changed (such as by a color or flag near the component or some other audio or visual notification) or, if enough or most users change the component the system may automatically update the mapping file(s) to reflect the more accurate mapping. Additionally, the system may learn how users increase the specificity of components. For example, if in VISIO users often use a generic DATABASE component, but when that component is coupled with a specific other component then in the generated threat model users generally select the more specific SQL DATABASE, the machine learning may allow the system to suggest that the generic DATABASE in the generated threat model be changed to SQL DATABASE, or if enough or most users make the change the system may update the mapping file(s) so that, when the generic DATABASE component in the second software diagramming software is next to the indicated component, it is mapped as a SQL DATABASE. In such implementations the mapping file(s) would be more complex than what is shown in the drawings, for instance IF/THEN logic may need to be used so that if the second software diagram component is a SERVER then in the mapping file a SERVER listing may be found and then the system may determine if the server is coupled with an indicated component, and if so to represent it as a SQL SERVER threat model component in the generated threat model, otherwise to represent it as a SERVER threat model component in the generated threat model.

In implementations of systems and methods for automated threat model generation from second software diagram files the method may allow a user to check some of the mapping in-situ before the threat model is generated, though in other implementations the threat model is generated without any in-situ checking and the user may make any needed modifications thereafter. In implementations there may be a one-to-many mapping so that, for example, one second software diagram component could be mapped to multiple threat model components and the decision of which threat model component is selected may depend on any user-defined names, any default titles, and the relationships between the various second software diagram components (such as described to some extent above in the SERVER vs. SQL SERVER example).

In implementations the systems and methods may be able to take any diagram, in any file format type, and convert it into a threat model.

As described above, in implementations after the user imports the diagram the system 100, using the names of the shaped or diagram components of the second software application, determines and/or selects the closest matching threat model components. This may be done using a mapping file and/or using a machine learning (ML) algorithm (which may also be called a machine learning engine). For each component of the second software diagram the system may, using the mapping file and/or the ML engine, return/select a threat model component with a highest probability of corresponding to the second software diagram component. The ML algorithm or mapping file may use the names of the second software diagram components and/or the image of the second software diagram itself to match the second software diagram components with threat model components. The system may assign probability weights to candidate threat model components and may display them to the user in order of highest to lowest probability weight (which weights may be displayed to the user). Such weights could be determined/assigned by the ML engine during training of the ML engine/algorithm, and representatively indicate a confidence in a given threat model component being a good match with a given second software diagram component.

In implementations the system could use both a mapping file and an ML algorithm to find threat model components that correspond with the second software diagram components. For example, the system may first check a mapping file to see if there is a correlation between a specific second software diagram component and a threat model component listed in the mapping file and, if so, may select/use the listed/correlated threat model component. If there is no correlation listed in the mapping file the ML engine may then, using probability weights, determine the highest probability threat model component and use/select it. The ML engine and mapping file may interact with one another—for example the ML engine may be configured to update the mapping file with correlations between threat model components and second software diagram components, such as when a probability (or percentage) of their matching rises above a specified threshold. As users manually correct a threat model component (that was determined using the mapping file) to a different threat model component, the system may accordingly remove or update a correlation from/in the mapping file. If a correlation is removed from the mapping file the determination of which threat model component corresponds with a given second software diagram component may fall back to the ML engine.

In implementations the ML engine itself may include or may use a mapping table or mapping file or the like. This could, in implementations, be only a temporary or transient file, that is stored in system memory only temporarily. In implementations an ML engine or algorithm may be stored and/or may be executed using any of the system servers and/or computing devices and/or may use data from the one or more data stores to perform its functions.

Figure 31:
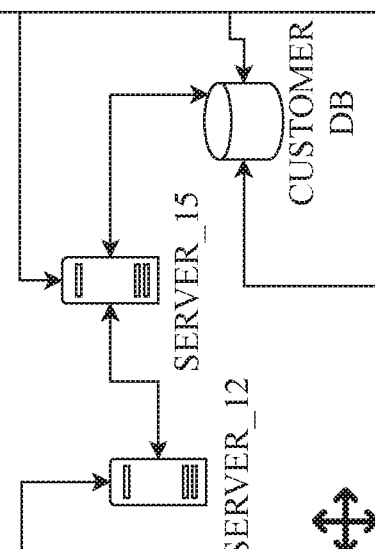
FIG. 31 is an implementation of an interface of the system of FIG. 1.

In implementations, once the system has selected threat model components corresponding with the second software diagram components, the user may have the option of either accepting the threat model components or reviewing the other threat model components that were assigned lower weights by the ML algorithm. In implementations the user could do this by, as a non-limiting example, right clicking on any given diagrammed threat model component to view a list of potential matches ordered from highest to lowest weight. For example, in implementations (after the second software diagram has been imported and a threat model has been diagrammed), if a user right-clicks on a diagrammed threat model component an interface such as the suggestions interface 3100 of FIG. 31 is displayed. In other implementations the list of potential matches (which may be called suggestions) are presented to the user in-situ as the diagram is building, so that at certain points the system pops up an interface 3100 to have the user review a list and determine if the threat model component selected by the ML algorithm is indeed the proper threat model component. The system could do this for every element or the system could, in implementations, be configured to proactively present the user with this list only in instances where the highest-weighted match is below a certain probability/percentage threshold, or where the difference in probability/percentage between the highest and next-highest component is below a certain amount, as examples.

Once the user is presented with the list of suggestions and/or weighted threat model components, such as on interface 3100, the user may select any threat model component from the list. The list of suggestions may show to the user the original second software diagram component (such as an image and/or name of the second software diagram component), as illustrated in FIG. 31, to help the user determine which is the proper threat model component to match it with. Based on user selection from the list of suggestions, the ML engine may be retrained, incorporating the new information. In this way the ML engine may continue learning, iteratively, as the system is used and occasionally corrected by users.

In the example interface 3100 it is seen that on the left-hand side where the original component (from the second software application) is shown, the original name of the component in the second software application (SERVER_15) is given, and a portion of the original diagram itself is displayed and is centered on the relevant component. This visual display is simply an example and may be omitted in some instances. In instances in which it is included, the user may be able to drag the image, zoom in, and/or zoom out to get a contextual idea of how the original second software diagram component relates to other components of the second software diagram, to help the user determine which threat model component may be the best match. In other implementations the visual display on the left-hand side may be static and/or not movable.

On the right-hand side of FIG. 31 the potential matching threat model components are listed, along with visual representations of the threat model components. In FIG. 31 the user is hovering a cursor (not shown for ease of viewing other elements) over the second-listed option and the second-listed option is displayed differently than the other options to indicate this. The user may left-click to select the second-listed threat model component to use it as the threat model component for the original component (or may select any other listed threat model component in like fashion). The user may revert to the prior-selected (or originally-selected) threat model component (which may be, for example, the highest-weighted threat model component) by selecting it. The user may minimize, expand (to full screen), or close interface 3100 using the top-right controls/selectors. In implementations after a user selects a different threat model component than the previous selection the user may be presented with an option to save the new state/selection or revert back to the previous state/selection. In implementations different methods may be used to select one of the listed threat model components, such as using keyboard controls, checking a box, using a mouse scroll wheel, etc.

On the right-hand side of interface 3100 it is seen that the potential threat model components are listed in order of decreasing weights or percentages of potential match with the original component, and the weights or percentages themselves are shown. The first-listed threat model component is seen to have a weight or percentage of 98.89%, the next has a weight or percentage of 82.17%, the next has a percentage of 74.02%, and the last has a weight or percentage of 41.15%. The weighted list of interface 3100 is presented in part based on the ML engine/algorithm determining the most likely threat model components to match with the given second software diagram component (original component), and the weights or percentages will update as the ML engine learns from user selections on interface 3100. The list on the right-hand side may be scrollable and may include, in implementations, all potential matches, or all matches above a certain weight or percentage, and so forth.

While the portion of the original second software diagram (on the left-hand side of FIG. 31) is shown in FIG. 31 as including visual representations of the original components (server images and a database image), this is only an example, and in implementations the original diagram (and the visual representation of it in FIG. 31) may include only generic shapes such as squares, rectangles, boxes, circles, polygons, etc., and the system 100 may nevertheless be able to match the second software diagram components with relevant threat model components using the ML engine/algorithm and/or the mapping file, using the names of the original second software diagram components and/or using context of where each component resides within the original second software diagram in relation to other components, and so forth. In implementations in which the original second software diagram includes visual representations of the components that are more standard (such as a server image, a cylinder for a database, etc.) the ML engine/algorithm and/or other elements of the system may use each visual representation to assist in determining the proper matching component.

The ML algorithm may be more complex than simply determining a one-to-one relation between second software diagram components and threat modeler components. For example, the ML algorithm may determine that when a system includes a plurality of grouped servers a firewall is generally needed, and so may suggest the same even if the second software diagram includes no diagrammed firewall.

In some implementations the ML algorithm may determine what threat model components to add to the diagram and a mapping file may be used just for determining naming conventions for the threat model components.

The examples below discuss methods of training/retraining an ML algorithm/engine.

Manual Keyword Pairings: keywords for second software diagram components could be mapped manually to existing threat model components using system 100. This mapping may be fed to the ML engine as initial seed data. Any given keyword could be mapped to multiple threat model component depending on factors such as context, environment, network, etc. These mappings are fed into the ML engine with the relevant details/context. The context helps the ML engine predict the correct component and probability with better accuracy. The continuously updated/new data is used to re-train the ML engine, the ML engine updating probabilities based on the manual keyword/threat model component mappings.

Manual Probability Adjustments: a user may manually search for a particular second software diagram component using an interface of system 100 (with the ML engine/algorithm providing a list of potentially matching components in descending order of probability—this list can also be shown after import of a second software diagram file, as discussed above). In implementations the user may manually increase/decrease the probability for any given match, and this will be used to re-train the ML engine. In other implementations the user may simply select the appropriate match, and the ML engine may increase the probability of the selected match and/or decrease the probabilities of other listed potential matches.

ML Training During Manual Diagram Building: as a user manually builds a diagram (threat model) using system 100, the user may give names to the threat model components. These user-applied names for the threat model components may be fed back to the ML engine/algorithm for re-training. For example, if the user later imports a second software diagram, and the second software diagram includes some of the names that the user had earlier used for a specific threat model component, that threat model component may be listed and shown to the user or otherwise selected and/or given a high/er probability of being a match.

Image File Mapping: a user may import an image file (JPG, TIFF, etc.) using an interface of system 100 and may manually map threat model components with the individual components shown in the image. From these manual user matches the ML engine may be trained/retrained to recognize certain components shown in image files and adjust the probabilities of potentially matching threat model components.

Importing Second Software Diagrams: as discussed above, the user may import a diagram from a second software application (VISIO is just one example). The system 100 may use mappings in the existing ML engine/algorithm to create a diagram using threat model components. The user may be prompted make selections when the system cannot determine with certainty a given component (discussed above), and/or the user may manually remap some second software diagram components to other threat model components. The user selections may be used to train/retrain the ML algorithm/engine.

Machine learning algorithms/engines for matching threat model components with second software diagram components may utilize any elements, features, and methods discussed in "Introduction to Machine Learning," Ethem Alpaydin, MIT Press (Mar. 17, 2020), the disclosure of which is hereby incorporated entirely herein by reference.

In places where the description above refers to specific embodiments of systems and methods for automated threat model generation from second software diagram files, one or more or many modifications may be made without departing from the spirit and scope thereof. Details of any specific embodiment/implementation described herein may, wherever possible, be applied to any other specific implementation/embodiment described herein.

What is claimed is:

1. A threat modeling method, comprising:
providing, using one or more servers, a first software application;
providing one or more data stores, the one or more data stores being accessible using the first software application, the one or more data stores comprising:
a plurality of threat model components stored therein; and
a plurality of threats stored therein, wherein each of the threats is associated with at least one of the threat model components through the one or more data stores;
providing one of:
one or more mapping files correlating the threat model components with visual diagram components of a second software application ("hereinafter second software diagram components"), and;
a machine learning (ML) algorithm configured to select, for each second software diagram component, a corresponding threat model component;
in response to receiving one or more user inputs, using one or more user interfaces displayed on one or more computing devices communicatively coupled with the one or more data stores:
using the one or more computing devices, reading a data file generated by the second software application, the data file comprising a subset of the second software diagram components, the data file defining one or more relationships between the subset of second software diagram components;
determining using one of the ML algorithm and the one or more mapping files, for the subset of second software diagram components, corresponding threat model components;
displaying on the one or more user interfaces a relational diagram of one of a system, an application, and a process, using visual representations of the threat model components corresponding with the subset of second software diagram components, the relational diagram defining a threat model; and
generating, using the one or more computing devices, and displaying, on the one or more user interfaces, a threat report displaying each threat that is associated through the one or more data stores with one of the threat model components included in the threat model.

2. The method of claim 1, further comprising displaying, on the one or more user interfaces, a list of suggested threat model components determined to be potential matches for one of the second software diagram components.

3. The method of claim 2, further comprising displaying, for each suggested threat model component, one of a weight and a percentage representatively indicating a confidence in a match between the suggested threat model component and the second software diagram component.

4. The method of claim 1, wherein the data file comprises one of a VSD file, a VSDX file, a TMT file, an XML file, a JSON file, a PNG file, and a JPEG file.

5. The method of claim 1, wherein determining, for the subset of second software diagram components, corresponding threat model components, comprises first determining whether a user-defined name for one of the subset of second software diagram components has a match in the one or more mapping files and, if no match is found, then determining whether a default title for the second software diagram component, as defined by the second software application, has a match in the one or more mapping files.

6. The method of claim 5, further comprising, if no match is found for the default title, matching the second software diagram component with a placeholder component and displaying the placeholder component on the relational diagram to indicate that no match was found.

7. The method of claim 1, further comprising determining, for the one or more relationships defined by the data file, corresponding threat model components as defined in the one or more mapping files.

8. A threat modeling system, comprising:
one or more computing devices communicatively coupled with one or more data stores, the one or more computing devices comprising a first software application providing access to the one or more data stores, the one or more data stores comprising:
a plurality of threats stored therein; and
a plurality of threat model components stored therein, wherein each of the threats is associated with at least one of the threat model components through the one or more data stores;
one of:
one or more mapping files communicatively coupled with the one or more data stores, the one or more mapping files correlating the threat model components with visual diagram components of a second software application (hereinafter "second software diagram components"), and;
a machine learning (ML) algorithm configured to select, for each second software diagram component, a corresponding threat model component;
an import interface displayed on one of the one or more computing devices, the import interface configured to, in response to receiving user input, initiate reading of a data file by the one or more computing devices, the data file generated by the second software application, the data file comprising a subset of the second software diagram components, the data file defining one or more relationships between the subset of second software diagram components;
an interface configured to, in response to receiving user input, initiate, using one of the ML algorithm and the one or more mapping files, a determination of which threat model components correspond with the subset of second software diagram components;
a diagram interface, displayed on the one or more computing devices, displaying a relational diagram of one of a system, an application, and a process, using visual representations of the threat model components corresponding with the subset of second software diagram components, the relational diagram defining a threat model; and
a threat report interface, displayed on the one or more computing devices, including a threat report displaying each threat that is associated through the one or more data stores with one of the threat model components included in the threat model.

9. The system of claim 8, further comprising a suggestions interface displaying a list of suggested threat model components determined to be potential matches for one of the second software diagram components.

10. The system of claim 9, wherein the suggestions interface displays, for each suggested threat model component, one of a weight and a percentage representatively indicating a confidence in a match between the suggested threat model component and the second software diagram component.

11. The system of claim 8, wherein the data file comprises one of a VSD file, a VSDX file, a TMT file, an XML file, a JSON file, a PNG file, and a JPEG file.

12. The system of claim 8, wherein the one or more mapping files includes a file correlating user-defined names of the second software diagram components with the threat model components.

13. The system of claim 8, wherein the one or more mapping files includes a file correlating default titles of the second software diagram components with the threat model components.

14. The system of claim 8, wherein, for each of the subset of second software diagram components for which no corresponding threat model component is found using one of the one or more mapping files and the ML algorithm, the diagram interface displays a placeholder component indicative of a match not being found.

15. The system of claim 8, further comprising one or more mapping interfaces displayed on the one or more computing devices and configured to, in response to receiving user input, modify the one or more mapping files.

16. A threat modeling system, comprising:
one or more computing devices communicatively coupled with one or more data stores, the one or more computing devices comprising a first software application providing access to the one or more data stores, the one or more data stores comprising:
a plurality of threats stored therein; and
a plurality of threat model components stored therein, wherein each of the threats is associated with at least one of the threat model components through the one or more data stores;
one of:
one or more mapping files communicatively coupled with the one or more data stores, the one or more mapping files correlating the threat model components with visual diagram components of a second software application (hereinafter "second software diagram components"), and;
a machine learning (ML) algorithm configured to select, for each second software diagram component, a corresponding threat model component;
an import interface displayed on one of the one or more computing devices, the import interface configured to, in response to receiving user input, initiate reading of a data file by the one or more computing devices, the data file comprising a subset of the second software diagram components, the data file defining one or more relationships between the subset of second software diagram components;
an interface configured to, in response to receiving user input, initiate, using one of the ML algorithm and the one or more mapping files, a determination of which threat model components correspond with the subset of second software diagram components;

a diagram interface, displayed on the one or more computing devices, displaying a relational diagram of a computing network, using visual representations of the threat model components corresponding with the subset of second software diagram components, the relational diagram defining a threat model; and a threat report interface, displayed on the one or more computing devices, including a threat report displaying each threat that is associated through the one or more data stores with one of the threat model components included in the threat model.

17. The system of claim 16, further comprising a suggestions interface displaying a list of suggested threat model components determined to be potential matches for one of the second software diagram components.

18. The system of claim 17, wherein the suggestions interface displays, for each suggested threat model component, one of a weight and a percentage representatively indicating a confidence in a match between the suggested threat model component and the second software diagram component.

19. The system of claim 16, wherein the one or more mapping files includes a file correlating user-defined names of the second software diagram components with the threat model components.

20. The system of claim 16, wherein the one or more mapping files includes a file correlating default titles of the second software diagram components with the threat model components.

* * * * *